(12) United States Patent
Poon et al.

(10) Patent No.: US 8,600,919 B2
(45) Date of Patent: Dec. 3, 2013

(54) CIRCUITS AND METHODS REPRESENTATIVE OF SPIKE TIMING DEPENDENT PLASTICITY OF NEURONS

(75) Inventors: Chi-Sang Poon, Lexington, MA (US); Joshua Jen Choa Monzon, Somerville, MA (US); Kuan Zhou, Scarborough, ME (US)

(73) Assignee: Massachusetts Institute of Technology, Cambridge, MA (US)

( * ) Notice: Subject to any disclaimer, the term of this patent is extended or adjusted under 35 U.S.C. 154(b) by 379 days.

(21) Appl. No.: 13/058,754

(22) PCT Filed: Aug. 25, 2009

(86) PCT No.: PCT/US2009/054881
§ 371 (c)(1),
(2), (4) Date: Feb. 11, 2011

(87) PCT Pub. No.: WO2010/025130
PCT Pub. Date: Mar. 4, 2010

(65) Prior Publication Data
US 2011/0137843 A1    Jun. 9, 2011

Related U.S. Application Data

(60) Provisional application No. 61/096,479, filed on Sep. 12, 2008, provisional application No. 61/092,554, filed on Aug. 28, 2008.

(51) Int. Cl.
*G06N 3/00*     (2006.01)
(52) U.S. Cl.
USPC .......................................................... 706/33

(58) Field of Classification Search
None
See application file for complete search history.

(56) References Cited

U.S. PATENT DOCUMENTS

| 6,507,828 | B1 | 1/2003 | Leonard et al. | |
|---|---|---|---|---|
| 6,687,686 | B1 | 2/2004 | Nervegna et al. | |
| 7,047,225 | B2 | 5/2006 | Poon | |
| 2005/0137993 | A1 | 6/2005 | Poon | |
| 2009/0292661 | A1* | 11/2009 | Haas | 706/33 |
| 2012/0232862 | A1* | 9/2012 | Geerts et al. | 703/2 |

OTHER PUBLICATIONS

Lee, Kinetic Modeling of Amyloid Fibrillation and Synaptic Plasticity as Memory Loss and Formation Mechanisms, Jun. 2008.*
Keller et al, Calmodulin Activation by Calcium Transients in the Postsynaptic Density of Dendritic Spines, Apr. 2008.*
Lee, Kinetic Modeling of Amlyoid Fibrillation and Synaptic Plasticity as Memory Loss and Formation Mechanisms (title page), 2008.*
Notification Concerning Transmittal of International Preliminary Report on Patentability and Written Opinion PCT/US2009/054881.
Bartolozzi et al., "Synaptic Dynamics in Analog VLSI," Neural Computation, vol. 19, 2581-2603; 2007 Massachusetts Institute of Technology.
Huo et al., "The Role of Membrane Threshold and Rate in STDP Silicon Neuron Circuit Simulation," W. Duch et al. (Eds.): ICANN 2005, LNCS 3697, pp. 1009-1014; 2005.

(Continued)

*Primary Examiner* — Jeffrey A Gaffin
*Assistant Examiner* — Mikayla Chubb
(74) *Attorney, Agent, or Firm* — Daly, Crowley, Mofford & Durkee, LLP

(57) ABSTRACT

A neuromorphic circuit performs functions representative of spiking timing dependent plasticity of a synapse.

28 Claims, 34 Drawing Sheets

(56) References Cited

OTHER PUBLICATIONS

Leonard "Analog VLSI Implementation of Synaptic Modification in Realistic Neurons," Massachusetts Institute of Technology; pp. 1-79; 1998.

Mak et al., "A Component-Based FPGA Design Framework for Neuronal Ion Channel Dynamics Simulations," IEEE Transactions on Neural Systems and Rehabilitation Engineering. vol. 14, No. 4; Dec. 2006.

Notification of Transmittal of the International Search Report and the Written Opinion of the International Searching Authority, or the Declaration; PCT/US2009/054881 dated Dec. 11, 2009; 14 pages.

Rachmuth et al., "Transistor Analogs of Emergent Iono-Neuronal Dynamics," HFSP Journal; vol. 2, No. 3; Jun. 2008; pp. 156-166.

Schemmel et al., "Implementing Synaptic Plasticity in a VLSI Spiking Neural Network Model," Neural Networks IJCNN 2006; pp. 1-6; Jul. 2006.

* cited by examiner

| Classification | Parameter | Unit | asymmetric Hebb | asymmetric anti-Hebb | symmetric mixed | symmetric LTP | symmetric LTD |
|---|---|---|---|---|---|---|---|
| Location | - | - | Rat hippocampal culture | Cerebellum-like structure | Rat hippocampal slice CA1 | Rat hippocampal slice CA1 | Rat hippocampal CA3-CA1 |
| Spike timing [15] | Δt (LTD) | ms | −30~0 | 0~+50 | −30~−10 +15~+20 | None | −50~50 |
| | Δt (LTP) | ms | 0~+15 | −50~0 | 0~+15 | −40~50 | None |
| Parameters of Ca-dependent plasticity | $K_{CaK}$ | μM | 1.16 | 1.20 | 2.10 | 1.22 | 3.84 |
| | $K_{CaP}$ | μM | 0.12 | 0.10 | 0.9 | 0.81 | 1.30 |
| | $θ_P$ | μM | 0.92 | 0.95 | 2.22 | 1.02 | 3.05 |
| | $θ_J$ | μM | 0.00 (zero) | 0.00 (zero) | 1.02 (nonzero) | 0.00 (zero) | 0.47 (nonzero) |
| | $V_{CaR}$ | μM s$^{-1}$ | 3.4 | 3.5 | 3.7 | 4.6 | 5.0 |
| | $V_{CaP}$ | μM s$^{-1}$ | 2.1 | 1.0 | 0.7 | 1.2 | 1.2 |
| Action potential model | - | - | Classical H-H equation | Inhibitory H-H eq. with DAP | H-H eq. with DAP | H-H eq. with DAP | H-H eq. with DAP |

*FIG. 16*

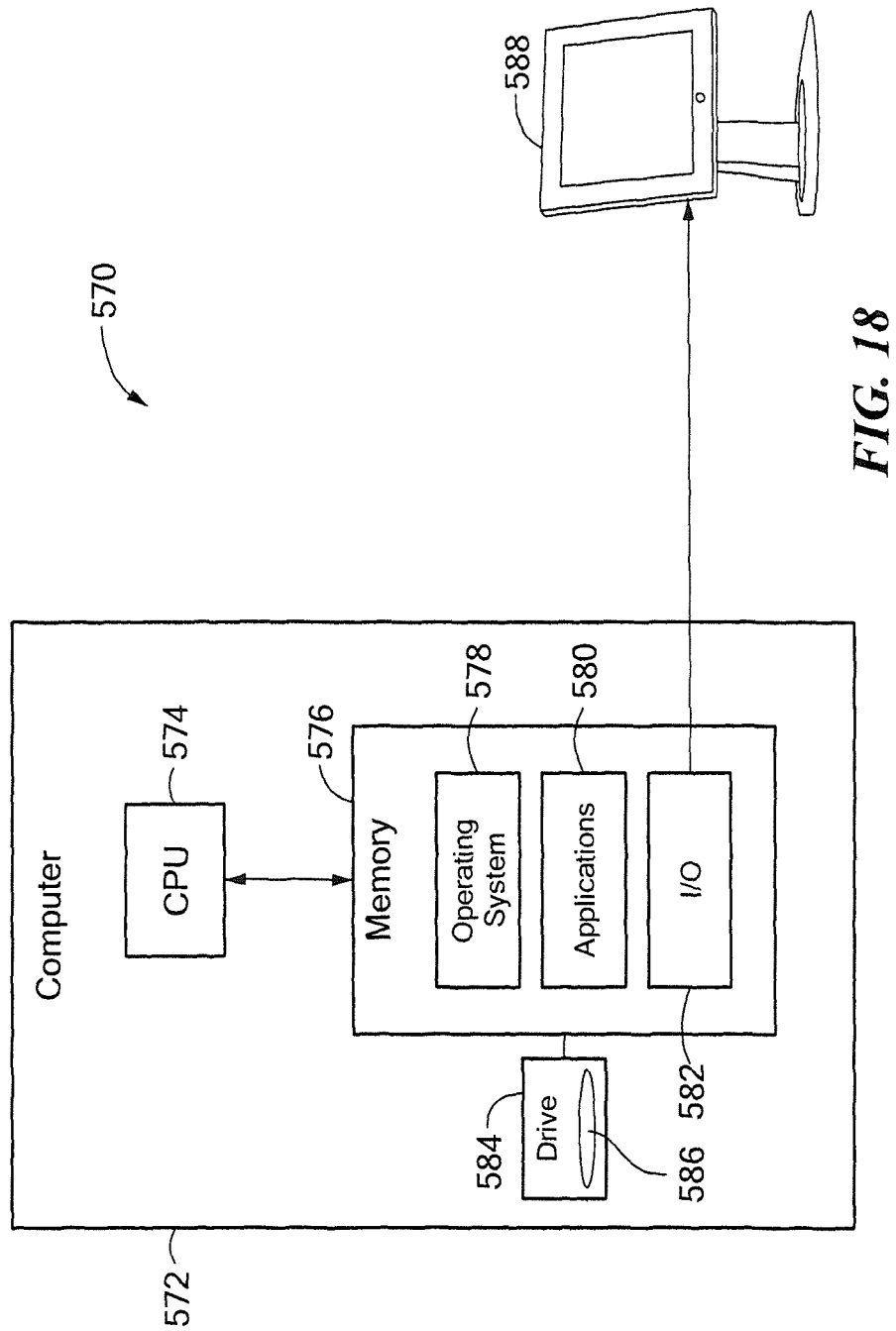

CIRCUITS AND METHODS REPRESENTATIVE OF SPIKE TIMING DEPENDENT PLASTICITY OF NEURONS

CROSS REFERENCE TO RELATED APPLICATIONS

This application is a U.S. National Stage application under 35 U.S.C. §371 of, and claims the benefit of, PCT Application No. PCT/US2009/054881 filed on Aug. 25, 2009, which application claims priority under 35 U.S.C. §119(e) to U.S. Provisional Patent Application No. 61/096,479 filed on Sep. 12, 2008 and U.S. Provisional Patent Application No. 61/092,554 filed on Aug. 28, 2008, which applications are hereby incorporated herein by reference in their entirety.

STATEMENT REGARDING FEDERALLY SPONSORED RESEARCH

The invention was made with government support under Grant No. EB005460 awarded by the National Institutes of Health. The government has certain rights in the invention.

FIELD OF THE INVENTION

This invention relates generally to circuits and methods configured to emulate biological functions and, more particularly, to a circuit and method that emulate spike timing dependent plasticity and also rate-based plasticity associated with neurons.

BACKGROUND OF THE INVENTION

Neurons are electrically excitable cells that process and transmit information around the nervous system. Neurons are the primary components of the brain and spinal cord in vertebrates, and ventral nerve cord in invertebrates.

Referring to FIG. 1, a neuron includes a nucleus as shown. The nucleus includes a soma, an axon, and a dendrite. The soma acts as a processing unit for processing of neuronal signals and is responsible for generating action potentials (i.e., voltages). Action potentials (also referred to as electrical signals herein) are further described below. The action potentials are propagated from the soma, through an axon, to the end of the neuron, which is also called an axon terminal. In the axon terminal, chemical neurotransmitters that chemically encode the electrical signal are produced, which cross a gap between the axon terminal and a dendrite of another neuron (not shown). This gap is part of the connection system of two neurons. The gap is referred to as a synapse. The synapse is descried more fully below in conjunction with FIG. 2.

Attempts have been made to emulate operation of a synapse with electronic circuits.

So-called spike timing dependent plasticity (STDP) is known to exist in synapses. However, existing circuits are unable to emulate spike timing dependent plasticity in a way that closely replicates biochemical processes.

It is also known that there are variety of types of spike timing dependent plasticity that are experimentally observed, each dependent upon a relative timing between presynaptic and postsynaptic stimuli and also dependent upon waveform shapes of postsynaptic back potentials. Existing circuits are unable to emulate all of the different types of STDP.

A so-called BCM rule, described more fully below, is also known. Existing circuits and techniques are unable to provide a relationship between the BCM rule and STDP.

Therefore, it would be desirable to provide a circuit and a method that can emulate spike timing dependent plasticity in a way that closely replicates biochemical processes. It would also be desirable to provide a circuit and a method that can emulate all of the different types of STDP. It would also be desirable to provide a circuit and a method that can provide a relationship between the BCM rule and STDP.

SUMMARY OF THE INVENTION

The present invention provides a circuit and a method that can emulate spike timing dependent plasticity in a way that closely replicates biochemical processes, that can emulate all of the different types of STDP, and that can provide a relationship between the BCM rule and STDP.

In accordance with one aspect of the present invention, a circuit to model spike timing dependent plasticity of a postsynaptic neuron includes a calcium integration circuit configured to generate a calcium integration circuit output signal ($Ca_{total}$) representative of a total concentration of calcium in a postsynaptic dendrite. The calcium integration circuit is responsive to first and second input signals ($V_{glu}$, $V_{dent}$). The first input signal ($V_{glu}$) is representative of a glutamate concentration (GLU) in the postsynaptic dendrite and the second input signal is representative of a postsynaptic dendrite back potential. A magnitude of the calcium integration circuit output signal ($Ca_{total}$) is influenced by a relative timing relationship between the first and second input signals. The relative timing relationship is in accordance with the above-described spike timing. The circuit also includes an excitatory postsynaptic current (EPSC) transduction circuit coupled to receive the calcium integration circuit output signal ($Ca_{total}$) and configured to generate an EPSC transduction circuit output signal (EPSC) representative of a change of synaptic strength of the postsynaptic neuron.

In some embodiments, the calcium integration circuit performs a function representative of a calcium entrapment model having a form the same as or similar to equations 1.1 or 1.2 below.

In some embodiments, the EPSC transduction circuit is configured to perform a function representative of a BCM relationship representative of both rate-based plasticity and spike timing dependent plasticity.

In some embodiments, the EPSC transduction circuit is configured to perform a function representative of a BCM relationship having a form the same as or similar to equation 1.6 below.

In some embodiments, the circuit comprises an analog circuit comprised of FETs. In some embodiments, the FETs are configured to operate in subthreshold mode.

In some embodiments, the circuit also includes a glutamate receptor circuit coupled to receive the first input signal ($V_{glu}$) representative of the glutamate concentration in the postsynaptic dendrite, coupled to receive an association signal ($K_{glu}$) representative of an association constant indicative of a binding of the glutamate to NMDA receptors in the postsynaptic dendrite, and configured to generate a glutamate receptor circuit output signal ($I_{glunorm}$) representative of a ratio of bound glutamate to total glutamate in the postsynaptic dendrite.

In some embodiments, the circuit also includes an NMDA channel circuit coupled to receive the glutamate receptor circuit output signal ($I_{glunorm}$), coupled to receive the second input signal ($V_{dent}$) representative of the postsynaptic dendrite back potential, configured to generate a first NMDA channel circuit output signal ($g_{nmda}$) representative of a conductance of NMDA receptors in the postsynaptic dendrite, and configured to generate a second NMDA channel circuit output signal ($I_{dent}$) representative of the postsynaptic dendrite back potential signal ($V_{dent}$). The calcium integration circuit is coupled to receive the first and second NMDA channel circuit output signals ($g_{nmda}$, $I_{dent}$).

In some embodiments, the circuit can be driven by the first and second input signals ($V_{glu}$, $V_{dent}$), which can be generated by first and second respective spiking circuits.

The first spiking circuit can be configured to generate the first input signal ($V_{glu}$). In some embodiments, the first input signal ($V_{glu}$) has a shape in accordance with a diffusion model, for example a model in accordance with the diffusion model of equations 0.1 or 0.2 below.

The second spiking circuit can be configured to generate the second input signal (3). In some embodiments, the second input signal has shape determined in accordance with a Hodgkin-Huxley model.

In some embodiments, the second input signal ($V_{dent}$) has shape also determined in accordance with a back propagation model representative of back propagation from an axon hillock to the postsynaptic dendrite. In some embodiments, the back propagation model is of a form of equations 0.7 through 1.0 below.

In accordance with another aspect of the present invention, a method of simulating a spike timing dependent plasticity of a postsynaptic neuron includes receiving, with an analog circuit, first and second input signals ($V_{glu}$, $V_{dent}$). The first input signal ($V_{glu}$) is representative of a glutamate concentration in a postsynaptic dendrite. The second input signal is representative of a postsynaptic dendrite back potential. The method also includes generating, with the analog circuit, a calcium integration output signal ($Ca_{total}$) representative of a total concentration of calcium in the postsynaptic dendrite. A magnitude of the calcium integration output signal ($Ca_{total}$) is influenced by a relative timing relationship between the first and second input signals, wherein the relative timing relationship is in accordance with the spike timing. The method also includes generating, with the analog circuit, an EPSC transduction output signal (EPSC) representative of a change of synaptic strength in the postsynaptic neuron in response to the calcium integration output signal ($Ca_{total}$).

In some embodiments, the generating a calcium integration output signal ($Ca_{total}$) includes generating the calcium integration output signal ($Ca_{total}$) with a function representative of a calcium entrapment model having a form the same as or similar to equations 1.1 and 1.2 below.

In some embodiments, the generating an EPSC transduction output signal (EPSC) comprises generating the EPSC transduction output signal (EPSC) in accordance with a function representative of a BCM relationship representative of both rate-based plasticity and spike timing dependent plasticity.

In some embodiments, the generating an EPSC transduction output signal (EPSC) comprises generating the EPSC transduction output signal (EPSC) with a function representative of a BCM relationship model having a form the same as or similar to equation 1.6 below.

In some embodiments, the analog circuit comprises an analog circuit comprised of FETs. In some embodiments, the FETs are configured to operate in subthreshold mode.

In some embodiments, the method also includes receiving, with the analog circuit, the first input signal ($V_{glu}$) representative of the glutamate concentration in the postsynaptic dendrite. In some embodiments, the method also includes receiving, with the analog circuit, an association signal ($K_{glu}$) representative of an association constant indicative of a binding of the glutamate to NMDA receptors in the postsynaptic dendrite. In some embodiments, the method also includes generating, with the analog circuit, a glutamate receptor output signal ($I_{glunorm}$) representative of a ratio of bound glutamate to total glutamate in the postsynaptic dendrite.

In some embodiments, the method also includes generating, with the analog circuit, in response to the first input signal ($V_{glu}$) and in response to the postsynaptic dendrite back potential signal ($V_{dent}t$), a first NMDA channel output signal ($g_{nmda}$) representative of a conductance of NMDA receptors in the postsynaptic dendrite. In some embodiments, the method also includes generating, with the analog circuit, in response to the postsynaptic dendrite back potential signal ($V_{dent}$), a second NMDA channel output signal ($I_{dent}$) representative of the postsynaptic dendrite back potential signal ($V_{dent}$).

In some embodiments, the analog circuit comprises an analog circuit comprised of FETs. In some embodiments, the FETs are configured to operate in subthreshold mode.

In some embodiments, the method further includes generating the first input signal ($V_{glu}$) having a shape determined in accordance with a diffusion model.

In some embodiments, the method further includes generating the second input signal ($V_{dent}t$) having a shape determined in accordance with a Hodgkin-Huxley model.

In some embodiments, the method further includes generating the second input signal ($V_{dent}$) having a shape also determined in accordance with a back propagation model representative of back propagation from an axon hillock to the postsynaptic dendrite. In some embodiments, the back propagation model is of the form of equations 0.7 through 1.0 below.

In accordance with another aspect of the present invention, the above method can be implemented in a computer.

In accordance with another aspect of the present invention, the above method can be associated with a computer-readable medium including instructions for implementing the method.

BRIEF DESCRIPTION OF THE DRAWINGS

The foregoing features of the invention, as well as the invention itself may be more fully understood from the following detailed description of the drawings, in which:

FIG. 16 is a table showing a summary of the STDPs of FIGS. 11-15C and parameters associated therewith;

FIG. 18 is a block diagram showing a computer system in which operational code may reside in accordance with the model of FIG. 3 and upon which graphs can be displayed in accordance with any of the above graphs;

DETAILED DESCRIPTION OF THE INVENTION

Figure 1:
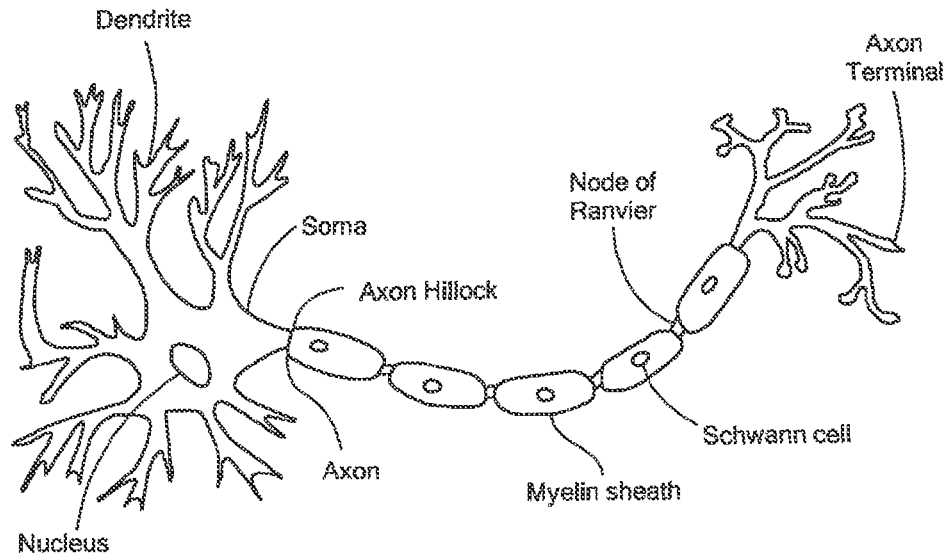
FIG. 1 is a pictorial showing a neuron.

Before describing the present invention, some introductory concepts and terminology are explained. As used herein, the term "Bienenstock-Cooper-Munro rule," or "BCM rule" or "BCM curve" for short, is used to describe a rule or curve relating a frequency of neuronal stimulation to a change of neural plasticity (i.e., neural strength). It will be shown below, for example, in FIGS. 9A and 9B, that there is also an equivalence between the frequency-based (or rate-based) BCM rule or curve and a rule or curve that relates a total postsynaptic calcium concentration to a change of neural plasticity (i.e., neural strength). Hence, it will become apparent that neural stimulation frequency can affect total postsynaptic calcium concentration.

Spike timing dependent synaptic plasticity (STDP) refers to a neuronal characteristic for which the efficacy of synaptic transmission is influenced by a relative timing between presynaptic and postsynaptic stimulation, i.e., between a presynaptic action potential and a postsynaptic back potential.

STDP is considered to be important because it validates and expands Hebbian theory, an influential neurological learning rule. STDP has also become a principal experimental protocol for inducing change in synaptic plasticity. Theoretical work on STDP is underdeveloped since few biophysical models can reasonably model how temporal asymmetry arises, let alone unify different subtypes of STDP. The unified model described below has three significant parts: back propagation of action potentials, dual requirement of N-methyl-D-aspartate (NMDA) receptors, and calcium dependent plasticity. Rate based plasticity is also discussed and included below.

First, the shapes of action potentials at synapses are carefully modeled by the voltage responses of Hodgkin-Huxley equations propagated through axon and dendrite. The second part of the model incorporates the dual requirement of NMDA receptors for opening up calcium ionic channels. Third, to explain the calcium dependent plasticity, a two-component model consisting of calcium dependent protein kinase and phosphatase is used.

Synaptic plasticity, the ability of connections between neurons to change in strength, has been intensively studied because it is widely viewed as an underlying mechanism of learning and memory. Spike timing dependent plasticity (STDP) refers to the phenomenon, in which the synaptic plasticity can either be long term potentiated (LTP) or depressed (LTD), depending on the relative timing between external stimuli. STDP has quickly become a popular research area since its discovery partly because it supports and refines Hebb's postulate, an influential activity-dependent learning rule proposed half century ago.

Depending on the type of synapse and nervous system, the profiles of STDP as functions of time delays between presynaptic and postsynaptic spiking vary significantly. In general, two major types of STDP responses exist: temporally symmetric and asymmetric. The former demonstrates no significant effects of temporal order between presynaptic and postsynaptic stimuli. In contrast, the later shows reverse direction of long-term plasticity under opposite temporal order. The asymmetric STDP can be further divided into two subtypes: Hebbian and anti-Hebbian. For a Hebbian synapse, the synaptic strength gets potentiated when EPSPs induced by presynaptic stimuli precede postsynaptic action potentials. In contrast, anti-Hebbian synapses show depression under the same pre-post temporal stimulation. Various types STDP are described below in conjunction with FIGS. 11-15C Only a unified model can explain all types of STDP. Only a unified model can accurately model essential molecular mechanisms that contribute to the temporal dependence of synaptic plasticity.

Figure 2:
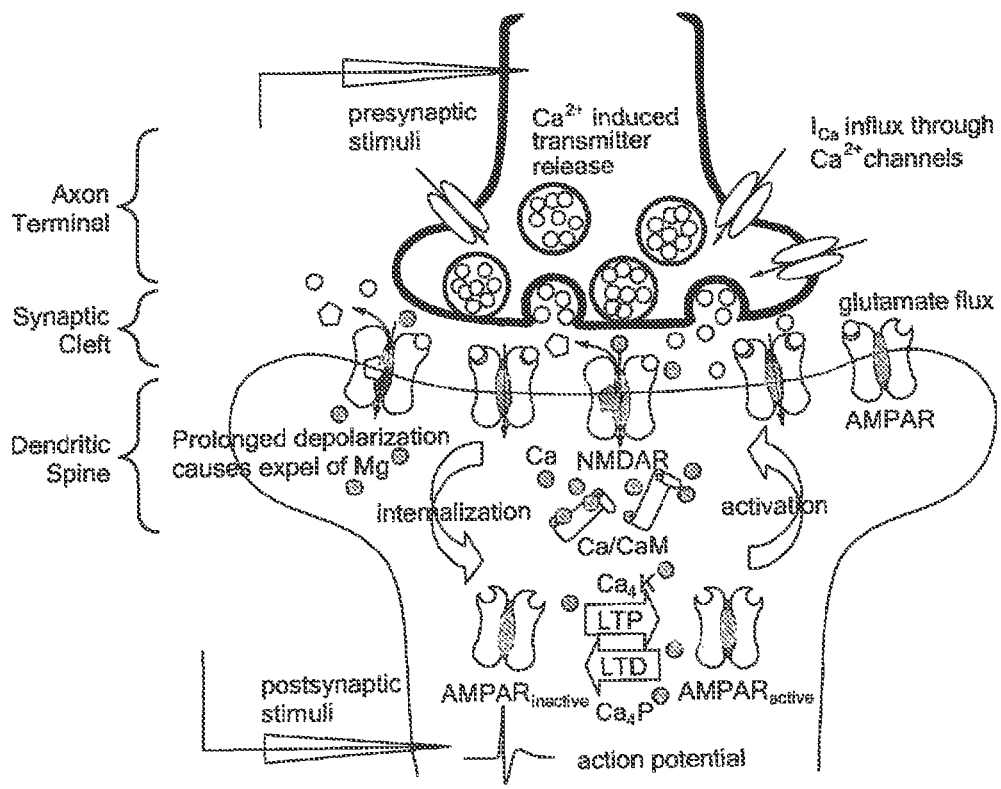
FIG. 2 is a is a pictorial showing a synapse between two neurons.

Referring now to FIG. 2, a synaptic cleft is formed between two neurons, and in particular, between an axon terminal of one neuron and a dendritic spine of another neuron. Electrical signals tend to propagate from the top to the bottom of this figure.

The synapse includes three main parts, the axon terminal that contains the neurotransmitters, the synaptic cleft, and the dendritic spine.

As described more fully below, neurotransmitters generated by the pre-synaptic neuron (axon terminal), and which cross the synapse, bind to neurotransmitter receptors (also called input receptors herein) on the dendrite of the postsynaptic neuron. Every neuron has multiple dendrites that are all connected to other neurons. Current signals that propagate into the dendrites, also referred to as postsynaptic currents, form postsynaptic potentials that are summed at the soma of the post-synaptic neuron to produce new action potentials.

An action potential (also referred to herein as a spike or pulse) is a self-regenerating wave of electrochemical activity that allows excitable cells (such as muscle and nerve cells) to carry a signal over a distance. It is the primary electrical signal generated by nerve cells, and arises from changes in the permeability of the nerve cell's axonal membranes to specific ions. Action potentials are pulse-like waves of voltage that travel along several types of cell membranes. An exemplary action potential is generated on the membrane of the axon of a neuron, but also appears in other types of excitable cells, such as cardiac muscle cells, and even plant cells.

A typical action potential is initiated at the axon when the membrane is sufficiently depolarized (i.e., when its voltage is sufficiently increased). As the membrane potential is increased, both sodium and potassium ion channels begin to open. This increases both the inward sodium current (depolarization) and the balancing outward potassium current (repolarization/hyperpolarization). For small voltage increases, the potassium current triumphs over the sodium current and the voltage returns to its normal resting value, typically −70 mV. However, if the voltage increases past a critical threshold, typically 15 mV higher than the resting value, the sodium current dominates. This results in a runaway condition whereby the positive feedback from the sodium current activates even more sodium channels. Thus, the cell "fires," producing an action potential.

Synapses allow neurons to form interconnected circuit networks within the nervous system and are very crucial to the biological computations that underlie perception, thought, and memory. Synapses also provide the means for the nervous system to connect and control other systems of the body. For instance, a specialized synapse between a motor neuron and a muscle cell is called a neuromuscular junction.

Signal propagation through a synapse begins with a depolarization of the axon terminal due to an action potential. The depolarization results in an influx of intercellular calcium into the axon terminal through calcium channels as shown. The intracellular calcium in the axon terminal, in turn, causes vesicles (circles in FIG. 2) to release a neurotransmitter, for example, glutamate, into the synaptic cleft, where the glutamate binds to receptors, e.g., N-methyl-D-aspartate (NMDA) receptors, on the dendritic spine. If the dendritic spine also experiences a postsynaptic back potential (postsynaptic stimuli) then intercellular calcium flows through the NMDA receptors and into the dendritic spine. Once within the dendritic spine, the intracellular calcium binds with kinase (K) and phosphatase (P) forming calcium bound kinase ($Ca_4K$) and calcium bound phosphatase ($Ca_4P$), respectively. Relative proportions of calcium bound kinase and calcium bound phosphatase result in levels of active and inactive AMPA receptors, which are described more fully below.

The above process is involved in spike timing dependent plasticity (STDP), for which the timing refers to a timing between the presynaptic action potential (or a release of glutamate) in the axon terminal and the postsynaptic back potential in the dendritic spine. This timing is shown below to influence plasticity of the synapse.

As described above, signal propagation through the synapse is promoted by release of neurotransmitters, e.g., glutamate, by vesicles that are able to release the neurotransmitters when stimulated. Arrival of an action potential into the axon terminal (e.g., from above in FIG. 2) results in an influx of calcium, Ca, ions from around the neuron. Influx of calcium into the axon terminal triggers a biochemical process that results to the release of neurotransmitters (e.g., glutamate) from the vesicles into the synaptic cleft about 180 microseconds after Ca influx.

Receptors (e.g., NMDA receptors) on the dendritic spine bind to the neurotransmitter molecules and respond by opening nearby ion channels in the post-synaptic cell membrane, causing ions to rush in or out via ion channels, forming postsynaptic currents that change the local membrane potential (i.e., voltage) of the postsynaptic cell. The resulting change in voltage is called postsynaptic potential. In general, the result is an excitatory postsynaptic potential (EPSP) in the case of depolarizing excitatory postsynaptic currents (EPSC), or inhibitory postsynaptic potential (IPSP) in the case of hyperpolarizing inhibitory postsynaptic currents (IPSC). It will be come apparent from discussion below that a change in EPSP is related to a change in synaptic strength.

Whether a synapse is excitatory or inhibitory depends on what type of ion channels are opened to conduct the postsynaptic current, which in turn is a function of the type of receptors and neurotransmitters employed at the synapse. However, in discussion below, NMDA ion channels and glutamate neurotransmitters are discussed.

The last stage of signaling is termination. Presynaptic signals are terminated by the breakdown or reuptake of existing neurotransmitters. Reuptake is mainly localized in the presynaptic neuron and serves to recycle transported neurotransmitters.

Strength of a synapse (synaptic strength) is related to a magnitude of a change in postsynaptic current resulting from the activation of postsynaptic neurotransmitter receptors. Changes in synaptic strength can be short term (short term potentiation/depression, or STP/STD), which causes no permanent structural changes in the neuron. Typically, this change lasts a few seconds to minutes. Alternatively, changes in synaptic strength can also be long term (long term potentiation/depression, or LTP/LTD). For long term changes, repeated or continuous synaptic activation results in an alteration of the structure of the synapse itself. Learning and memory are believed to result from long-term changes in synaptic strength, via a so-called "synaptic plasticity" mechanism.

The concept of synaptic strength leads to the concept of a strong synapse as opposed to a weak synapse. For a strong synapse, an action potential in the presynaptic neuron triggers another action potential in the postsynaptic neuron. Conversely, for a weak synapse, an action potential in the presynaptic neuron may not trigger another action potential in the postsynaptic neuron. In other words, for a weak synapse, an EPSP in the postsynaptic neuron may not reach the threshold for action potential initiation in the postsynaptic neuron.

Thus, it will be apparent that synaptic plasticity refers to an ability for the synaptic strength between two neurons to change. The above-described synaptic plasticity refers to and results in long term changes in the synaptic strength of a synapse, either long term potentiation (LTP) or long term depression (LTD).

Each neuron forms synapses with many other neurons and therefore receives multiple synaptic inputs. When action potentials fire simultaneously in several of these neurons, multiple EPSCs are created which all generate EPSPs that sums up in the soma. Hence, the output of a neuron may depend on the input of many others, each of which may have a different degree of influence, depending on the strength of its synapse with a specific neuron.

Several conventional models are used to explain STDP. The conventional models can be divided into two classes: phenomenological and mechanistic.

Phenomenological models attempt to emulate experimental responses with simple mathematical expressions at a macroscopic level. In contrast, conventional mechanistic models derive physiological mechanisms at a biomolecular level to describe experimental findings.

Analysis described below uses a so-called "dual requirement" for NMDA receptor activation. A model described more fully below assigns biophysical models to a group of molecular reactions that give rise to STDP.

A number of analytical steps are provided in the model below. First of all, Hodgkin-Huxley equations are used to model shapes of action potentials. Shapes of action potential have important impact on STDP responses, impact that has been overlooked by conventional models of STDP. Furthermore, a so-called "two-component model" of calcium dependent plasticity is used below, which uses particular biochemical reactions, resulting in a model that is more biophysically based than the conventional BCM rule. The model described more fully below achieves an STDP result that accounts for different timing relationships between presynaptic and postsynaptic stimuli, explained by and using particular biochemical relationships. The model described below also provides rate-based plasticity.

Spike timing dependent plasticity (STDP) requires a group of subsystems interacting with one another in a timely manner. Different from most previous simple models, a composite and unified model described below consists of several subsystems in accordance with real biochemical relationships.

Figure 3:
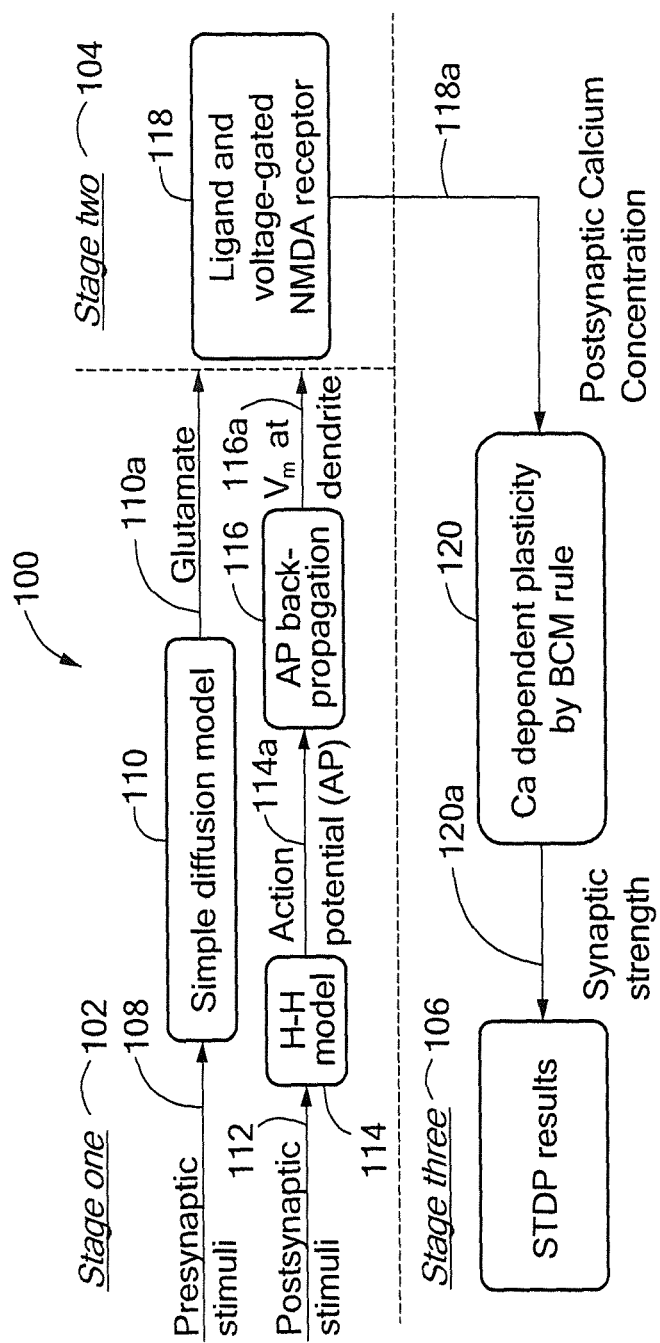
FIG. 3 is a flow chart showing a biophysical model associated with the synapse of FIG. 2.

It should be appreciated that FIG. 3 show a flowchart corresponding to the below contemplated technique, which would be implemented in a circuit (e.g., FIG. 22) or in a computer system (e.g., FIG. 18).

In some embodiments associated with a computer, rectangular elements (typified by element 110 in FIG. 3), herein denoted "processing blocks," represent computer software instructions or groups of instructions. Diamond shaped elements, herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit, an application specific integrated circuit (ASIC), or an analog circuit (e.g., FIGS. 22-28)

The flow diagrams do not depict the syntax of any particular programming language. Rather, the flow diagrams illustrate the functional information one of ordinary skill in the art requires to fabricate circuits or to generate computer software or analog circuits to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 3, a flow chart 100 describes a process used in a unified biophysical model that can be used to predict spike timing dependent plasticity (STDP), i.e., plasticity of a synapse related to a relative timing of a presynaptic action potential and a postsynaptic back potential. The process 100 closely parallels biochemical processes described above in conjunction with FIG. 2, as will be apparent from discussion below.

The process 100 (i.e., model) can be broken into three stages 102, 104, 106. In the first stage 102, presynaptic stimuli 108, i.e., presynaptic action potentials, are received by a diffusion model (also referred to herein as a first model) described more fully below. In some arrangements, the presynaptic stimuli 108 are short pulses, i.e., essentially delta functions. The diffusion model 110 is configured to generate a glutamate concentration versus time signal 110a representative of a glutamate concentration versus time in a synaptic cleft. Also in the first stage 102, postsynaptic stimuli 112, i.e., postsynaptic potentials, are received by a Hodgkin-Huxley (H-H) model 114 (also referred to herein as a second model) described more fully below. In some arrangements, the postsynaptic stimuli 112 are also short pulses, i.e., essentially delta functions. The postsynaptic pulses 112 have a selected timing relationship with respect to the presynaptic pulses 108, i.e., postsynaptic pulses 112 are set to occur before, after, or during presynaptic pulses 108.

The Hodgkin-Huxley (H-H) model 114 is configured to generate action potential signals (APs) 114a representative of realistic shapes of postsynaptic action potentials appearing at an axon hillock of a post synaptic neuron as determined by the H-H model 114. It will become apparent from discussion below that the shapes of the action potentials 114a are one factor (along with the above-described spike timing) that can determine an eventual STDP.

An action potential back-propagation model 116 (also referred to herein as a third model) is coupled to receive the postsynaptic action potentials 114a and configured to model their propagation representative of propagation from an axon hillock to a dendritic spine, resulting in a postsynaptic back potential signal 116a representative of a potential at the dendritic spine.

In the second stage 104, a ligand and voltage-gated NMDA receptor model 118 (also referred to herein as a fourth model) is coupled to receive the glutamate concentration versus time signal 110a (a ligand), coupled to receive the dendritic back potential signal 116a, and configured to generate a postsynaptic calcium concentration signal 118a representative of a total postsynaptic calcium concentration in the dendritic spine.

In the third stage 106, a calcium dependent plasticity module 120 (also referred to herein as a fifth model) is coupled to receive the calcium concentration signal 118a and configured to generate a synaptic strength signal 120a representative of a change in plasticity of the synapse. In some embodiments, the calcium dependent plasticity module 120 can employ a BCM relationship, which is described more fully below.

In some standard laboratory experiments relating to spike timing dependent plasticity, a postsynaptic neuron is repeatedly stimulated either milliseconds before or after the presynaptic neuron. Pulse signals generated at the postsynaptic neuron (at the axon hillock) are back propagated through the postsynaptic axon to the postsynaptic dendrite. Previous models did not use proper shapes of action potentials and did not consider back propagation in the postsynaptic neuron in detail. For instance, in some prior models, action potentials were depicted by two exponential functions rather than by the H-H model 114. The shapes of two exponential functions simply decay monotonously with two different slopes whereas those of action potentials recorded experimentally typically demonstrate depolarization, repolarization, and refractory phases that can be predicted by the H-H model 114.

Diffusion

Figure 4:
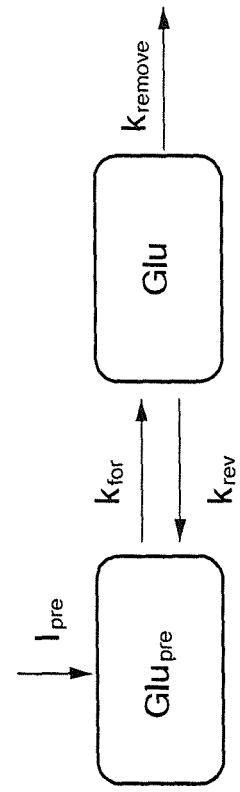
FIG. 4 is a block diagram showing formation of a glutamate concentration in accordance with the model of FIG. 3.

Referring now to FIG. 4, a diffusion model that can be used as the diffusion model 110 of FIG. 3 can include two compartments. A first compartment can be coupled to receive a presynaptic calcium current ($I_{pre}$), and configured to generate a presynaptic glutamate concentration ($Glu_{pre}$) versus time. The presynaptic glutamate concentration ($Glu_{pre}$) versus time results in a postsynaptic glutamate concentration (Glu) versus time.

Presynaptic stimuli cause release of glutamate as neurotransmitters, which diffuse across the synaptic cleft to reach postsynaptic receptors (NMDA receptors). Theoretically, spatiotemporal diffusion models coupled with reactions can describe the transportation of glutamate at the synapse. Instead, the relationship between glutamate concentration and the presynaptic stimuli ($I_{pre}$) can be assumed to follow the two-compartment model for simplicity. Presynaptic glutamate ($Glu_{pre}$) can be transported through the synaptic cleft to become available (Glu) to postsynaptic receptors. The reverse direction is also possible. Initially without stimulation, the concentrations of Glu and $Glu_{pre}$ are both zero. Forward and reverse rate constants of transportation are $k_{for}$ and $k_{rev}$, respectively. Meanwhile, glutamate is constantly removed by a glutamate transporter with a rate constant $k_{remove}$.

$$\frac{dGlu_{pre}}{dt} = -k_{for}Glu_{pre} + k_{rev}Glu + I_{pre} \quad (0.1)$$

$$\frac{dGlu}{dt} = k_{for}Glu_{pre} - k_{rev}Glu - k_{remove}Glu$$

$$\frac{d}{dt}\begin{pmatrix} Glu_{pre} \\ Glu \end{pmatrix} = \begin{pmatrix} -k_{for} & k_{rev} \\ k_{for} & -(k_{for}+k_{remove}) \end{pmatrix}\begin{pmatrix} Glu_{pre} \\ Glu \end{pmatrix} + \begin{pmatrix} 1 \\ 0 \end{pmatrix}I_{pre} \quad (0.2)$$

With two equations and two unknowns, the linear system of ordinary differential equation with known initial conditions can be integrated.

Figure 4A:
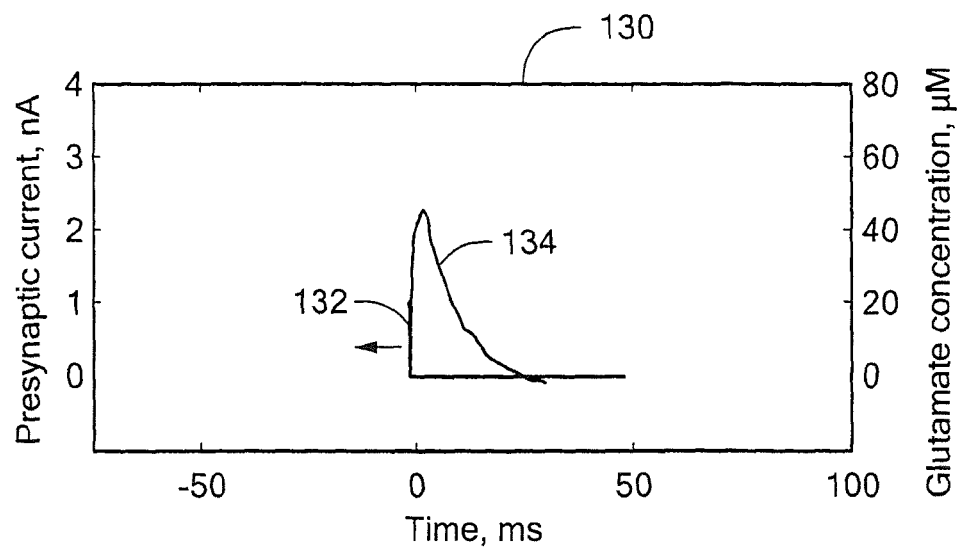
FIG. 4A is a graph of a glutamate concentration versus time signal used in the model of FIG. 3.

Referring now to FIG. 4A, a graph 130 has a horizontal axis in units of time in milliseconds, a left vertical axis in units of presynaptic current, $I_{pre}$, in nanoamps, and a right vertical axis in units of glutamate concentration in micromoles. Curves 132, 134 are representative of a presynaptic calcium current and a glutamate concentration, respectively.

Given a presynaptic current, $I_{pre}$, 132 having an amplitude of 1 nA and lasting for 1 ms as an input, the glutamate concentration 134 rises rapidly but decreases gradually.

Parameter values of $k_{for}$, and $k_{rev}$, and $k_{remove}$ are estimated and are summarized in Table 1 below.

TABLE 1

| Parameters | Units | Values |
|---|---|---|
| $g_{Ldendrite}$ | μS | 3.0e−4 |
| $g_{inter}$ | μS | 3.5e−4 |
| $g_{NMDAmax}$ | μS | 1.0e−3 |
| $g_{AMPA}$ | μS | 2.0e−4 |
| $k_{AMPARf}$ | $s^{-1}$ | 0.47 |
| $k_{AMPARb}$ | $s^{-1}$ | 1.0 |
| $k_{for}$ | $ms^{-1}$ | 0.3 |
| $k_{remove}$ | $ms^{-1}$ | 0.4 |
| $k_{rev}$ | $ms^{-1}$ | 0.3 |
| $k_{NMDA}$ | $mV^{-1}$ | 0.1 |
| $V_{1/2}$ | mV | −30 |

Hodgkin-Huxley Model

Figure 5:
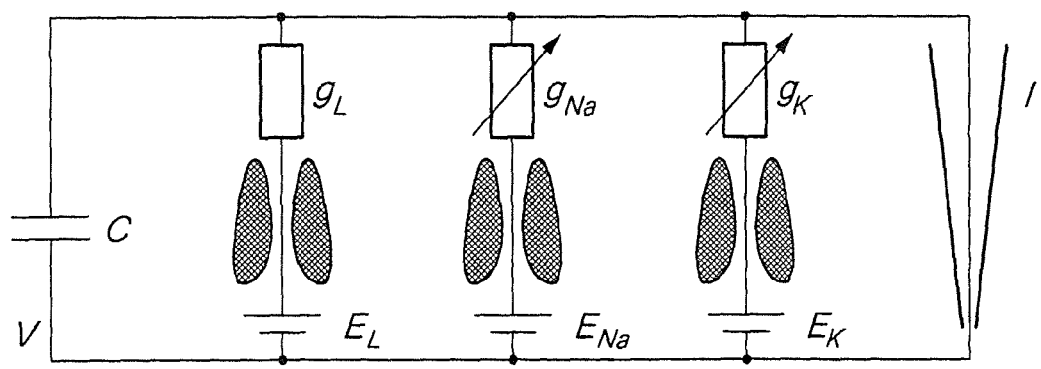
FIG. 5 is a circuit model representative of a Hodgkin-Huxley (H-H) model hat can be used in the model of FIG. 3.

Referring now to FIG. 5, a single compartment Hodgkin-Huxley model, which can be used as the H-H model 114 of FIG. 3, can be represented as shown, with a capacitor, C, coupled in parallel with a leakage channel comprised of a leakage conductance, $g_L$, in series with a leakage voltage source, $E_L$, coupled in parallel with a calcium channel comprised of a variable calcium conductance, $g_{Na}$, in series with a calcium voltage source, $E_{Na}$, coupled in parallel with a potassium channel comprised of a variable potassium conductance, $g_K$, in series with a potassium voltage source, $E_K$.

Hodgkin-Huxley equations represent a conductance-based compartment model. Physiologically, similar to other types of cells, neurons are surrounded by double-lipid membranes that separate cytoplasm from extracellular space. Ion pumps maintain concentration gradients across the membranes and thus maintain electrical potentials.

Neuronal cell membranes have been modeled as capacitors separating electric charge. The ion channels across the membrane act as conductance that allows ionic current flow between intracellular and extracellular space. The transmembrane current flow perturbs electrical balance and may initiate action potentials. The reverse potentials $E_{Na}$, $E_K$, and $E_L$ exist due to concentration gradients of ions across the membrane maintained by ion pumps. Current balance equation according to Kirchhoff's Law can be written as follows:

$$C\dot{V} = -I_{Na} - I_K - I_L + I_{ex} \quad (0.3)$$

For the Hodgkin-Huxley (H-H) model, the types of channels considered include sodium, potassium, and leakage. Each ion channel is selective to a specific type of ion. Ionic current through an ion channel is determined by the opening and closing of the ion channel. The gating variables represent the degree of opening of a certain ion channel and they follow first order kinetics with voltage-dependent rate constants α (V) and β (V). Voltage dependence was determined experimentally and has been formulated into equations.

A detailed model for each ion channel is described below. With the system of ordinary differential equations (ODEs) fully defined, four variables with four equations, the ODEs can be integrated to get the response of the membrane potential. A resting membrane potential is approximately −65 mV.

Sodium channels are controlled by two gating variables: m and h, both of which depend on the membrane potential. The activation variable m increases with membrane potential while the inactivation variable decreases with it. The dynamics of sodium channels are described in equations below.

$$I_{Na} = g_{Na}m^3h(V-E_{Na})$$

$$\dot{m} = \alpha_m(V)(1-m) - \beta_m(V)m$$

$$\dot{h} = \alpha_h(V)(1-h) - \beta_h(V)h$$

$g_{Na}=120$ mS/cm$^2$; $E_{Na}=-50$ mV $\alpha_m(V)=0.1(V+40)/(1-\exp(-(V+40)/10))$ $\beta_m(V)=4\exp(-(V+65)/18)$ $\alpha_h(V)=0.07\exp(-(V+65)/20)$ $\beta_h(V)=1/(1+\exp(-(V+35)/10))$ (0.4)

Potassium delayed-rectifier current flows through potassium channels, which are controlled by one single gating variable n. The variable n grows with respect to membrane voltage. The overall dynamics of potassium channels are described in equations below.

$I_K = g_K n^4 (E_K - V)$ $\dot{n} = \alpha_n(V)(1-n) - \beta_n(V)n$ $g_K = 36$ mS/cm$^2$; $E_K = -77$ mV $\alpha_n(V) = 0.01(V+55)1(1-\exp(-(V+55)/10))$ $\beta_n(V) = 0.125\exp(-(V+65)/80)$ (0.5)

The leakage current, $I_L$, which approximates the passive properties of the cell, has a linear relationship with the membrane voltage.

$I_L = g_L(E_L - V)$ $g_L = 0.3$ mS/cm$^2$; $E_L = -54.38$ mV (0.6)

The shapes of action potentials vary significantly, depending on the types and locations of neurons. Although the output of Hodgkin-Huxley equations represents one major type of action potential, it cannot account for all classes of action potential. Therefore, various spiking models have been developed independently or based on the H-H equations. To model the experimental data of various types of STDP, a precise simulation of action potentials initiated at the neurons of interest is necessary.

Several types of neurons demonstrate depolarization after potential (DAP) behavior. These neurons, at the repolarization stage, depolarize instead of hyperpolarize once reaching the resting potential, which is −65 mV according to H-H equations. Therefore, the level of membrane potential does not drop below the steady state value. To implement the introduction of DAP into the H-H model, the hyperpolarization part of the action potential is reversed whenever the membrane potential, $V_m$, is smaller than −65 mV. A constant, $k_{DAP}$, is added to control the degree of depolarization after potential. Exemplary Matlab® code to execute the algorithms are shown below and the comparison between the output of classical H-H model and that with DAP behavior is shown in FIGS. 6 and 6A.

IF $V_m < -65$
  THEN $V_m = -65 + k_{DAP}*(-65 - V_m)$
ELSE
  $V_m = V_m$
END

Figure 6:
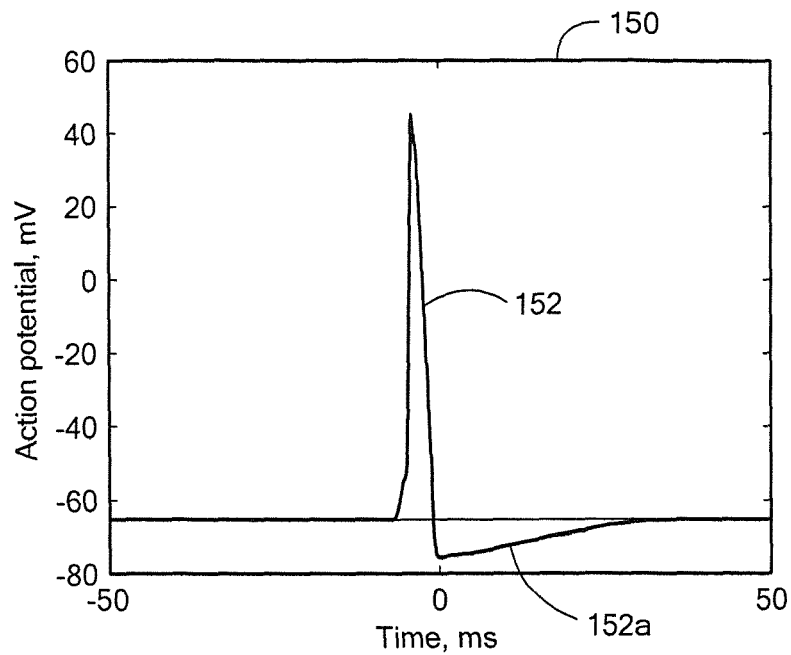
FIGS. 6 and 6A are graphs showing exemplary output signals representative of action potentials and representative of outputs of the circuit model of FIG. 5.

Referring now to FIG. 6, a graph 150 has a horizontal axis with a scale in units of time in milliseconds and a vertical axis with an axis in units of action potential magnitude in millivolts. An action potential signal 152 is representative of an output from the above classical H-H equations. The action potential signal includes a reverse potential region 152a.

Figure 6A:
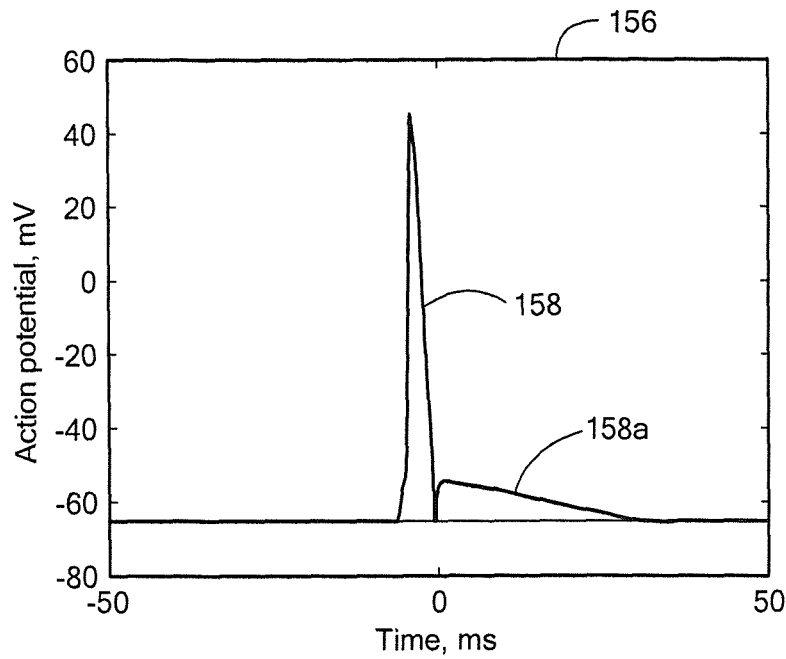

Referring now to FIG. 6A, a graph 156 has a horizontal axis with a scale in units of time in milliseconds and a vertical axis with an axis a scale of action potential magnitude in millivolts. An action potential signal 158 is representative of an output from the above H-H equations modified for DAP where $k_{DAP}=1$.

Back Propagation

Figure 7:
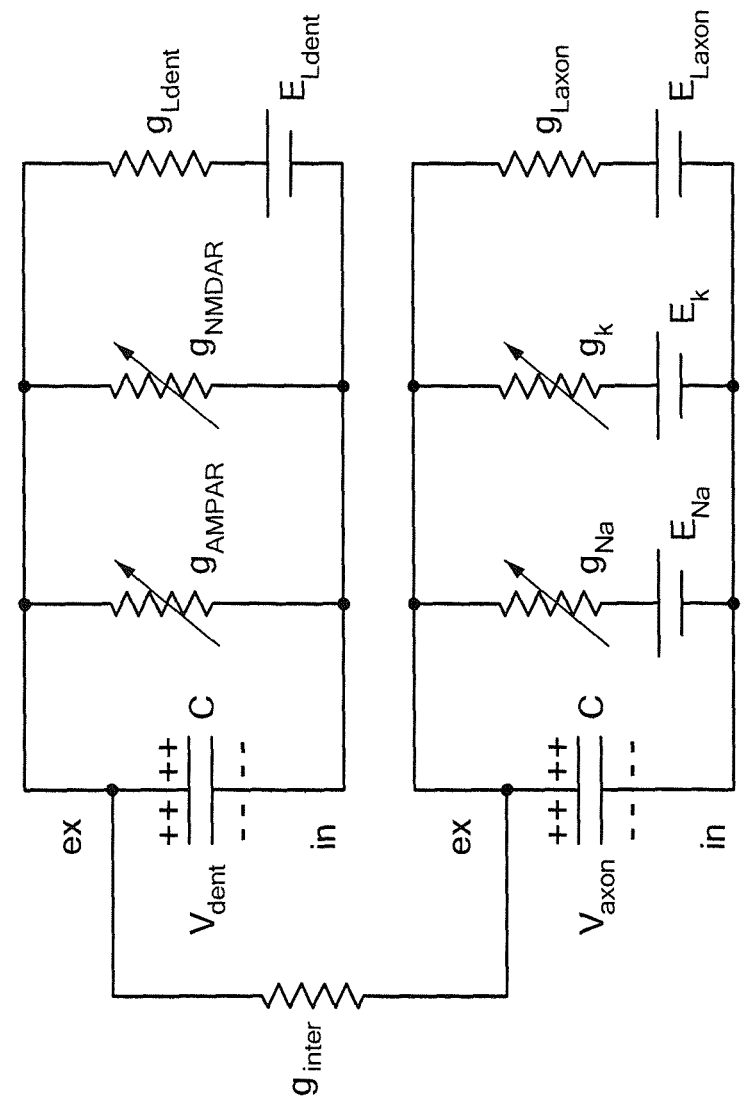
FIG. 7 is a circuit model representing a back propagation of a biophysical potential in a postsynaptic neuron that can be used in the model of FIG. 3.

Referring now to FIG. 7, a back propagation model, which can be used as the back propagation model 116 of FIG. 3 can be represented as two parts of a neuron experiencing a spike in potential: an axon and a dendrite in a multi-compartment model. An exemplary equivalent circuit is shown.

Postsynaptic action potentials (APs) are assumed to be injected at an axon hillock of a postsynaptic neuron. The injected APs can be modeled by the above-described Hodgkin-Huxley equations.

$$C_{axon}\frac{dV_{axon}}{dt} = -I_{Na} - I_K - I_{Laxon} + I_{post} + I_{inter}$$ (0.7)

where the sodium, potassium, and leakage currents at the axon are expressed below. The variable m, h, and n are gating variables while $E_{Na}$, $E_K$, and $E_{Laxon}$ are the reverse membrane potentials. Further details and parameter values can be found in the literature.

$I_{Na} = \bar{g}_{Na}m^3h(V_{axon} - E_{Na})$ $I_K = \bar{g}_K n^4(V_{axon} - E_K)$ $I_{Laxon} = \bar{g}_{Laxon}(V_{axon} - E_{Laxon})$ (0.8)

Alternatively, the APs can be modeled by the above described H-H with DAP equations.

As indicated in FIG. 3, signals 110a, 116a from presynaptic and postsynaptic neurons converge. Initially, neurotransmitters (represented by the glutamate concentration signal 110a of FIG. 3, released from presynaptic neurons bind with membrane receptors (e.g., NMDA receptors) on postsynaptic dendrites. The binding increases a probability of opening of receptor-gated ionic channels. Postsynaptic APs can be back propagated from the postsynaptic axon hillock to the dendritic spine, and the back-propagated potentials can influence a charge balance at the dendritic spine through an interconnecting conductance, $g_{inter}$, shown in FIG. 7.

$$C_{dent}\frac{dV_{dent}}{dt} = -I_{NMDAR} - I_{AMPAR} - I_{Ldent} - I_{inter}$$ (0.9)

where
  $I_{NMDAR}$=current flow through NMDA receptors
  $I_{AMPAR}$=current flow through AMPA receptors
  $I_{dent}$=current flow into the dendritic capacitor, and
  $I_{inter}$=current flow through the interconnecting conductance.

Current interflowing between the postsynaptic axon hillock and the postsynaptic dendritic spine can be calculated as a product of the interconnecting conductance with the potential difference between two compartments based on Ohm's law.

$I_{inter} = g_{inter}(V_{dent} - V_{axon})$ (1.0)

Referring briefly again to FIG. 1, a potential initiated at the axon hillock is first turned into a waveform representative of a real biological action potential by way to the above-described Hodgkin-Huxley (H-H) equations 0.3 to 0.6. Then the action potential is back propagated to the dendritic spine by way of the above described—back propagation equations 0.7 to 1.0.

Returning again to FIG. 7, in the back-propagation model, compartment models are used for modeling membrane potentials, assuming that the membrane acts as a capacitor separating intra and extra cellular compartments, and assuming that ion channels act as conductors (or conductances) linking the two regions.

Referring briefly again to FIG. 5, Hodgkin-Huxley equations, also a compartment model, are used for modeling an action potential at an axon ($V_{axon}$). Ionic currents incorporated in classical H-H equations are sodium, potassium, and leakage ($I_{Na}$, $I_K$, and $I_{Laxon}$), in additional to current injected into the postsynaptic neuron ($I_{post}$).

Referring again to FIG. 7, in the back propagation model, the above-described inter-current, $I_{inter}$, flows between axon and dendrite, which can be calculated by multiplying the conductance ($g_{inter}$) with the potential difference between two compartments based on Ohm's law.

Inter-current is introduced above because back-propagating action potentials (BPAPs) from axon to dendrite are important for spreading the effects of postsynaptic stimuli. Therefore, the membrane potential at the dendrite ($V_{dent}$) may be influenced by EPSP (e.g., by calcium) due to presynaptic stimuli as well as by postsynaptic BPAPs. The time course of EPSP is governed by the binding of glutamate with NMDA and AMPA receptors, which causes the ion channel (e.g., calcium ion channels) to open or close. Current flow through the receptors (e.g., NMDA receptors) further depends upon the conductance of ion channels (e.g., $g_{NMDAR}$ and $g_{AMPAR}$).

Standard Hodgkin-Huxley (H-H) equations are sufficient for modeling asymmetric STDP following so-called Hebbian rule. However, different from the output of the classical H-H equations, the shapes of the action potentials in asymmetric STDP following Hebbian rule and in symmetric STDP demonstrate "depolarizing after potential" (DAP) behavior. Thus, for these two cases DAP is introduced to extend the H-H model by inverting the hyperpolarization part of action potentials.

Dual Requirements for NMDA Receptor Activation

Figure 8:
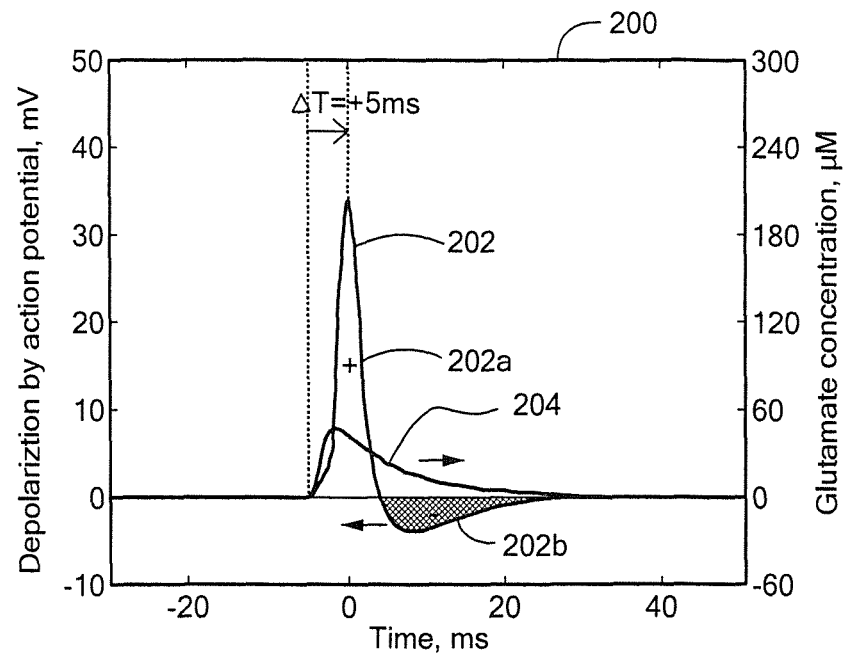
FIGS. 8 and 8A are graphs showing relative timings (spike timings) between postsynaptic back potentials versus time and glutamate concentrations versus time that can be used in the model of FIG. 3.

Referring now to FIG. 8, a graph 200 has a horizontal axis with a scale in unit of time in milliseconds, a left vertical axis with a scale in units of depolarization in millivolts, and a right vertical axis with a scale in units of glutamate concentration in micromoles.

A signal 202 is representative of the postsynaptic dendrite signal, $V_{dent}$, predicted by the above H-H model (FIGS. 5-6A) in combination with the above back-propagation model (FIG. 7). The signal 202 can be representative of the signal 116a of FIG. 3. The signal 202 has a positive potentiation portion 202a and a negative potentiation portion 202b, similar to the signal 152 of FIG. 6. However, the signal 152 of FIG. 6 is representative of only the H-H model above and not the back propagation model. Hence, the signal 152 is representative of the signal 114a of FIG. 3.

A signal 204 is representative of the glutamate concentration signal, Glu, predicted by the above diffusion model (FIGS. 4, 4A) and is representative of the signal 110a of FIG. 3. The signals 202, 204 have a relative timing, ΔT, of +5 ms. It is largely this timing, timing between signals 110a, 116a of FIG. 3, that is important in the overall STDP model of FIG. 3. However, the timing can be expressed in other ways. For example the timing can be expressed as a timing between signals 108, 112 of FIG. 3, or a timing between any two signal in the parallel paths of stage one 102 of FIG. 3.

Figure 8A:
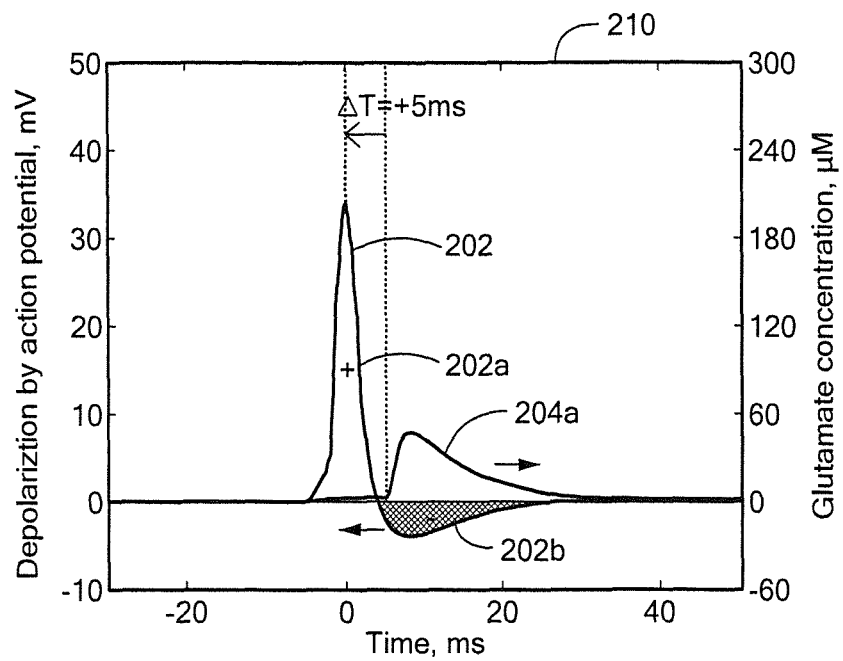

Referring now to FIG. 8A, in which like elements of FIG. 8 are shown having like reference designations, a graph 210, like the graph 200 of FIG. 8, has a horizontal axis with a scale in unit of time in milliseconds, a left vertical axis with a scale in units of depolarization in millivolts, and a right vertical axis with a scale in units of glutamate concentration in micromoles.

The signal 204, already described above, is representative of the postsynaptic dendrite signal, $V_{dent}$, predicted by the above H-H model (FIGS. 5-6A) in combination with the above back-propagation model (FIG. 7).

A signal 204a, like the signal 204 of FIG. 8, is representative of the glutamate concentration signal, Glu, predicted by the above diffusion model (FIGS. 4, 4A) and is representative of the signal 110a of FIG. 3. Unlike the signals 202, 204 of FIG. 8, the signals 202, 204a have a relative timing, ΔT, of −5 ms.

Referring to both FIGS. 8 and 8A, it will become apparent from discussion below that, when the glutamate profile (e.g., 204, 204a) overlaps in time mostly with the positive potentiation portion of the postsynaptic back potential (e.g., 202a), both requirements of NMDA receptor activation are met. This in turn tends to result in more calcium flowing into the postsynaptic dendrite. In contrast, if the glutamate profile (e.g., 204a) occurs at the same time as the negative potentiation portion of the postsynaptic back potential (202b), NMDA-receptor channels do not open or only partially open. This tends to result in less calcium flowing into the postsynaptic dendrite. How calcium level influences the direction of synaptic plasticity is discussed below.

Postsynaptic calcium signaling plays an important role in regulating long-term plasticity. As described above, NMDA receptor-gated ion channels serve as the main gateways through which calcium flows into the postsynaptic dendrite. Though other ion transport mechanisms may be involved, including other calcium transport mechanisms, it is assumed herein that NMDA receptor-gated ion channels are the source of calcium inflow. As described above, it is also assumed that the opening of NMDA-receptor channels is governed by two things: by the binding of glutamate to the NMDA receptors and also by depolarization of the postsynaptic dendrite. Consequently, conductance of NMDA receptors ($g_{NMDAR}$) is assumed to be a product of two terms: a function depending upon glutamate concentration (Glu) and a function depending upon postsynaptic dendrite membrane voltage ($V_{dent}$). Note that glutamate flux mainly results from presynaptic stimuli while depolarization (postsynaptic dendrite membrane voltage) is caused by the back propagation of postsynaptic stimuli.

The first term, a glutamate dependant function, is described in the equation below by a ligand-receptor model with association constant $K_{Glu}$. Glutamate concentration can be related back to the presynaptic stimuli ($I_{pre}$) by the diffusion model described above in conjunction with FIGS. 4 and 4A. Second, the second term, a voltage dependent function, can be modeled with a logistic function as shown below, wherein an exponential term therein can be that originated from a known Arrhenius equation. The voltage dependent function rises to a maximum ($g_{NMDARmax}$) following a sigmoidal curve with half way voltage equal to $V_{1/2}$ and a slope as large as a $0.5_{NMDA}$ at that point.

$$g_{NMDAR}(Glu, V_{dent}) = \frac{Glu}{Glu + K_{Glu}} \times \frac{g_{NMDARmax}}{1 + e^{-k_{NMDAR}(V_{dent} - V_{1/2})}} \quad (1.1)$$

The conductance of NMDA receptor-gated ion channels, $g_{NMDAR}$, dictates the amount of calcium flowing into postsynaptic dendrite. Under the assumptions that the NMDA receptors are the major gateway of calcium inflow and the leakage rate of calcium is negligible, calcium concentration is proportional to the integration of current flow through NMDA receptors over the time span of stimuli as provided in equation 1.2 below. $I_{NMDAR}$ can also be expressed as the product of conductance ($g_{NMDAR}$) and dendrite membrane potential ($V_{dent}$). The total calcium concentration remains constant after the presynaptic and postsynaptic stimuli if we assume the loss of calcium ions through leakage is negligible. Also, we assume that the concentration of calcium is much higher than that of calcium-dependent proteins and most of the total calcium concentration (CaT) is assumed to exist in ionic form (Ca).

$$Ca \propto \int_{t_{stimuli}} I_{NMDAR} dt = \int_{t_{stimuli}} g_{NMDAR} V_{dent} dt \quad (1.2)$$

The lag time between glutamate flux (presynaptic) and membrane depolarization (postsynaptic) influences the level of NMDA receptor activation and thus the amount of calcium inflow. Since both transient signals only last for tens of milliseconds, such temporal proximity (i.e., spike timing) between presynaptic and postsynaptic stimuli is necessary to trigger interaction.

Two-Component Model of Calcium Dependent Plasticity

The level of calcium entering the postsynaptic dendrite through NMDA receptors has been found to strongly influence synaptic plasticity. Furthermore, depending on the total amount of calcium inflow, postsynaptic calcium may either up- or down-regulate signal transduction pathways and lead to synaptic plasticity change. Long-term synaptic strength tends to depress at moderate levels of postsynaptic $Ca^{2+}$ but tends to increase at higher levels level of postsynaptic $Ca^{2+}$.

A BCM rule is an omega-shaped function able to describe the dependence of synaptic strength on postsynaptic activities. It has been used in previous STDP models to relate synaptic strength to intracellular calcium concentration. Both empirical and mechanistic models have been developed to reproduce BCM rules. Simple empirical models may not pinpoint physiological reactions responsible for the omega function of synaptic plasticity; yet detailed mechanistic models involving complex multi-step calcium dependent enzyme activation are difficult to reproduce. After extracting essential reaction mechanisms, a two-component calcium binding model with sufficient biophysical details to describe STDP is used below.

Calcium dependent kinase and calcium dependent phosphatase have been suggested to be related to synaptic plasticity. Postsynaptic calcium can influence synaptic plasticity through two steps. First, intracellular calcium either binds with calcium-dependent protein kinase or calcium-dependent protein phosphate, resulting in calcium bound kinase or calcium bound phosphatase, respectively. Afterwards, these calcium-bound enzymes insert active AMPA receptors to or remove them from the membrane of the postsynaptic dendrite, respectively. The final number of active AMPA receptors remaining determines the synaptic conductance and thus plasticity.

The model development starts with the description of binding between calcium and two types of enzymes. The trapped calcium can either bind with calmodulin-dependent protein kinase II (K for short) or protein phosphatase 1 (P for short) as shown in equation 1.3 below. The binding between enzymes and calcium is assumed to be cooperative and four calcium ions are required to fully activate the kinase ($Ca_4K$) or protein phosphatase ($Ca_4P$).

$$4Ca + K \underset{K_{CaKb}}{\overset{K_{CaKf}}{\rightleftharpoons}} Ca_4K \quad (1.3)$$

$$4Ca + P \underset{K_{CaPb}}{\overset{K_{CaPf}}{\rightleftharpoons}} Ca_4P$$

Consequently, a fourth order Hill equation can be used to model the formation of calcium bound kinase, $Ca_4K$, and calcium bound phosphatase, $Ca_4P$, and the decomposition can be modeled as a first order reaction. The rates of change in $Ca_4K$ and $Ca_4P$ concentrations are equal to the formation rate minus the consumption rate as summarized in equations 1.4 below. Since experimental results of STDP are usually summarized in terms of the final plasticity change, the concentrations after reaching steady state are of special interest. At steady state, the time derivatives in equations 1.4 below are set to zero so that concentrations of $Ca_4K$ and $Ca_4P$ can be expressed in terms of Ca.

$$\frac{dCa_4K}{dt} = k_{CaKf} \frac{Ca^4}{Ca^4 + K_{CaK}^4} - k_{CaKb} Ca_4K = 0 \quad (1.4)$$

$$\therefore Ca_4K = \frac{k_{CaKf}}{k_{CaKb}} \frac{Ca^4}{Ca^4 + K_{CaK}^4}$$

$$\frac{dCa_4P}{dt} = k_{CaPf} \frac{Ca^4}{Ca^4 + K_{CaP}^4} - k_{CaPb} Ca_4P = 0$$

$$\therefore Ca_4P = \frac{k_{CaPf}}{k_{CaPb}} \frac{Ca^4}{Ca^4 + K_{CaP}^4}$$

Once formed, calmodulin-dependent protein kinase II bound by calcium ($Ca_4K$) tends to insert and activate AMPA receptors (AMPAR). In contrast, once formed, calcium-bound protein phosphatase 1 ($Ca_4P$) tends to internalize and deactivate AMPAR as represented in the equation below, in which $k_{AMPARf}$ and $k_{AMPAb}$ represent forward and backward reaction rate constants of AMPAR activation, respectively, and in which $V_{CaK}$ and $V_{CaP}$ are proportional constants that quantify the contributions of $Ca_4K$ and $Ca_4P$ to the rate constants, respectively.

$$AMPAR_{inactive} \underset{k_{AMPARb} = V_{CaK} Ca_4 P}{\overset{k_{AMPARf} = V_{CaK} Ca_4 K}{\rightleftharpoons}} AMPAR_{active} \quad (1.5)$$

In essence, concentration changes of $Ca_4K$ and $Ca_4P$ caused by calcium inflow tend to alter a balance between active and inactive AMPA receptors. Under an assumption that a total number of AMPA receptors in a postsynaptic dendrite remains constant, a change of synaptic strength, $\Delta W$, before and after presynaptic and postsynaptic stimuli is proportional to the change in normalized forward rate constants.

$$\Delta W \propto \frac{k_{AMPARf} + V_{CaK} Ca_4 K}{k_{AMPARb} + V_{CaP} Ca_4 P + k_{AMPARf} + V_{CaK} Ca_4 K} - \frac{k_{AMPARf}}{k_{AMPARb} + k_{AMPARf}} \quad (1.6)$$

The above equation 1.6 provides a relationship between the change of synaptic strength ($\Delta W$) (a long term change) and total postsynaptic calcium concentration, Ca. It will be appreciated from equations 1.1 and 1.2 above that the total postsynaptic calcium concentration is related to a timing (spike timing) between the presynaptic stimulus (e.g., glutamate concentration) and the postsynaptic stimulus (e.g., the postsynaptic back potential). The steady state concentrations of $Ca_4K$ and $Ca_4P$ in equation 1.6 above can be expressed as functions of Ca according to equation 1.2 for total calcium concentration above.

Figure 9:
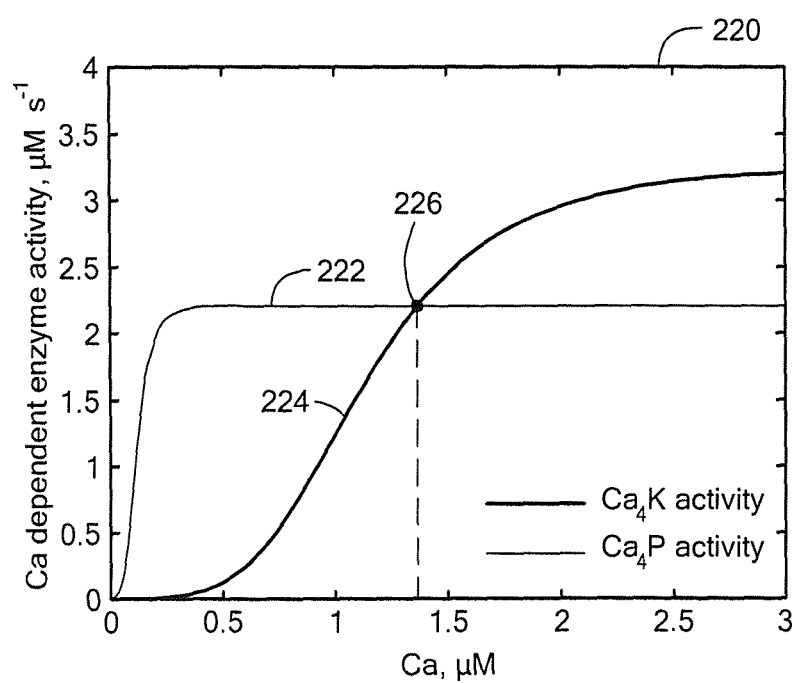
FIG. 9 is a graph showing rates of calcium bound kinase concentration and calcium bound phosphatase concentration that can be generated in a postsynaptic neuron.

Referring now to FIG. 9, a graph 220 has a horizontal axis with a scale in units of total postsynaptic calcium concentration in micromoles and a vertical axis with a scale in units of concentrations of calcium bound kinase activity or calcium bound phosphatase activity in units of micromoles per second.

A curve 222 is representative of calcium bound kinase activity and a curve 224 is representative of calcium bound phosphatase activity determined by equations above. Above a postsynaptic calcium concentration of about 1.4 micromoles, the calcium bound phosphatase activity dominates the calcium bound kinase activity and at lower postsynaptic calcium concentrations, the opposite is shown.

Figure 9A:
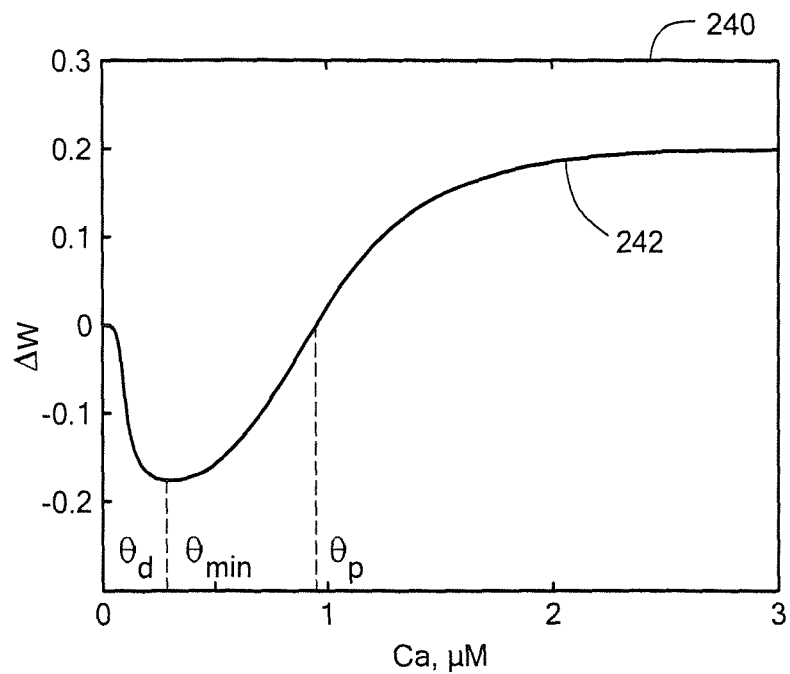
FIG. 9A is a graph showing a change of synaptic plasticity of a postsynaptic neuron in accordance with the graph of FIG. 9.

Referring now to FIG. 9A, a graph 240 has a horizontal axis with a scale in units of total postsynaptic calcium concentration in micromoles and a vertical axis with a scale in units of change of synaptic strength, $\Delta W$, according to equation 1.6 above.

The graph 240 includes a curve 242 that shows a reduction of synaptic strength below a postsynaptic calcium concentration of about one micromole and an increase of synaptic strength above a postsynaptic calcium concentration of about one micromole.

Comparing the curve 242 to the curves 222, 224, of FIG. 9, it will be understood that the decrease and increase of synaptic strength represent by the curve 242 is an outcome o the different relative levels of calcium bound phosphatase activity represented by the curve 222 and calcium bound kinase activity represented by the curve 224.

The model was utilized to explain experimental results of both frequency dependent and spike timing dependent synaptic plasticity (STDP). One experimental dataset of frequency-dependent plasticity was modeled first by using our two-component model of calcium dependent plasticity. Afterwards, five scenarios of STDP experimental results were analyzed individually to demonstrate the applicability of the unified model.

Frequency Dependent STDP

Directionality of long-term plasticity in rat hippocampal slices was experimentally found to depend upon stimulus frequency. Under low frequency stimuli synapses get depressed while high frequency stimuli result into long-term potentiation. The omega-shaped functional dependence of plasticity on frequency mimics the response predicted by the Bienenstock-Cooper-Munro (BCM) rule. It has been suggested that frequency dependent plasticity is a joint consequence of frequency dependent calcium inflow and calcium dependent plasticity (which is related to STDP). Experiments have shown that postsynaptic calcium concentration is directly proportional to stimuli frequency. Therefore, a conversion constant is sufficient to switch between calcium-dependent plasticity (e.g., STDP) and frequency-dependent plasticity.

Figure 9B:
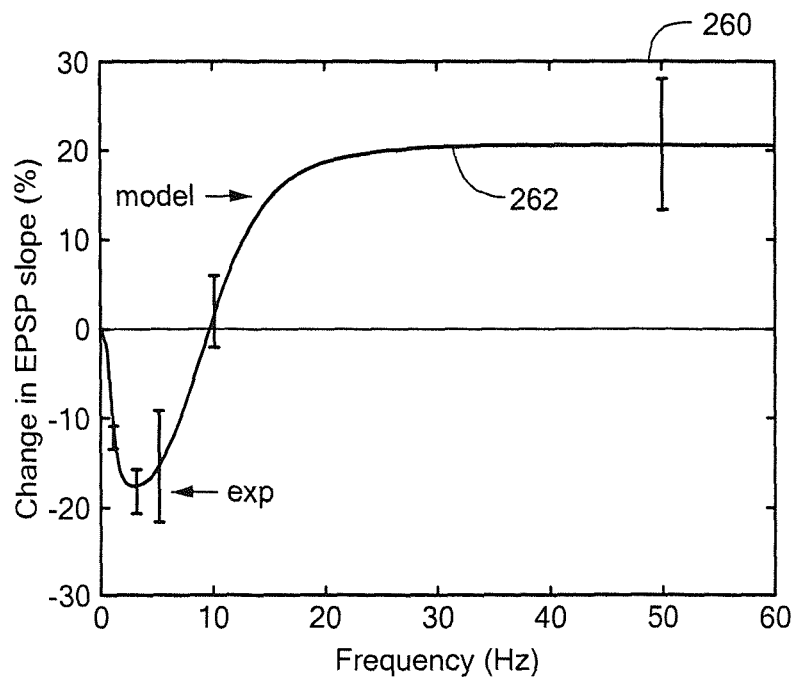
FIG. 9B is a graph showing a change in synaptic plasticity versus frequency.

Referring now to FIG. 9B, a graph 260 has a horizontal axis with a scale in units of presynaptic and postsynaptic stimuli frequencies in Hertz, and a vertical axis with a scale in units of change in EPSP slope in percent. From the above discussion, it twill be understood that the frequency of the stimuli is related to the total postsynaptic calcium concentration. It will also be recognized that the change of EPSP slope is related to a change of synaptic strength. Thus, the graph 240 of FIG. 9A and the graph 260 of FIG. 9B can be compared. The form (i.e., axes) of the graph 260 will be understood to be in a conventional form of a BCM relationship.

A curve 262 is representative of a change of plasticity with stimulus frequency. Frequency dependent plasticity is briefly discussed above. The curve 262 can be seen to have the same shape as the curve 242. Therefore, the curve 242 follows a BCM-type characteristic. As described above, the curve 262 can readily be derived from the above relationship for $\Delta W$.

There are two conditions that the profiles of kinase and phosphatase (e.g., curves 224, 222, respectively) must meet in order to match the omega-shaped response of the curves 242, 262. First, phosphatase must be activated faster at low calcium concentration than kinase. Second, at high concentration, the activity of kinase surpasses that of phosphatase. As shown in FIG. 9, given calcium-dependent phosphatase (CaP) is estimated to be more sensitive to total calcium concentration than is kinase (CaK), it saturates at lower calcium concentration. Furthermore, since CaP may weaken synaptic strength by inactivating AMPA receptors, the change in synaptic strength ($\Delta W$) dips at low total calcium concentration (CaT) as shown in 9A. Yet the decrease is soon counteracted by increasing CaK, which becomes more active at higher total postsynaptic calcium concentrations and enhances synaptic connectivity. In FIG. 9A is shown a value of total postsynaptic calcium concentration, $\theta_{min}$, corresponding to largest synaptic strength decrease as well as the threshold calcium concentrations, $\theta_d$, $\theta_p$, bordering a sign change of $\Delta W$.

Experimental values shown in FIG. 9B tend to validate the above models and equations. In conclusion, different sensitivities of kinase and phosphatase to calcium result into selective signaling and an omega-shaped plasticity function.

Depending upon the type of synapse, the responses of spike timing dependency may differ. The commonly observed responses can be divided into three groups: forward STDP, backward STDP, and STDP with two LTD windows. The models described above provide a unified theory that can explain all three cases of STDP.

Forward STDP refers a type of spike timing dependent plasticity in which synaptic depression arises when repetitive presynaptic stimuli closely precede postsynaptic stimuli. Conversely, synaptic potentiation occurs under the opposite condition.

Change in synaptic plasticity as a function of spike timing has been documented by others in rat hippocampal neurons. According to experimental protocol, transient responses of long-term plasticity from different spike timing were measured first. Afterwards, the steady state change of synaptic strength was plotted as a function of different spike timing between presynaptic and postsynaptic stimuli. Outputs from the above model equations are compared below to the experimental results.

Figure 10:
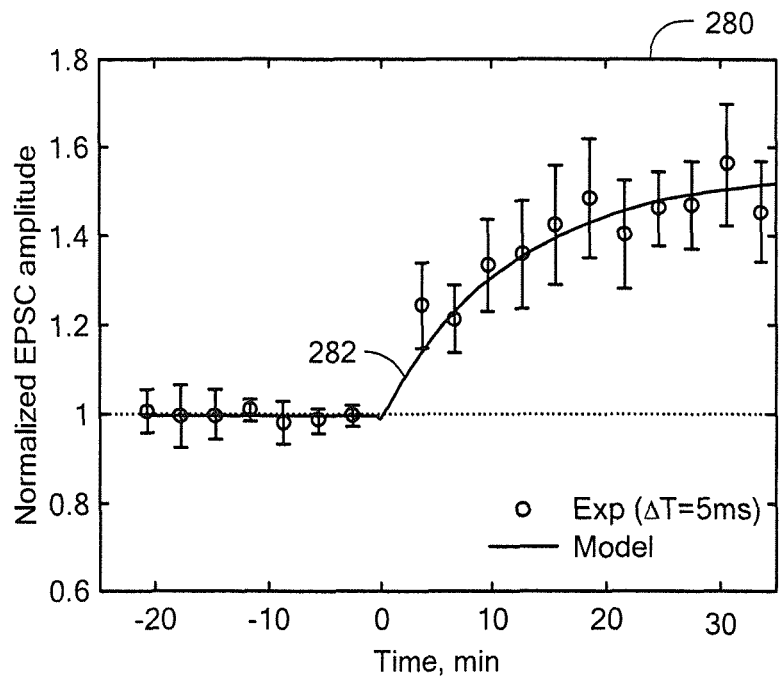
FIGS. 10 and 10A are graphs showing changes in synaptic plasticity versus time at two different level of total postsynaptic calcium concentration.

Referring now to FIG. 10, a graph 280 has a horizontal axis with a scale in units of time in minutes and a vertical axis with a scale in units of EPSC amplitude in relative units. A curve 282 is representative of outputs of the above-described models having a spike timing of +5 ms (see, e.g., FIG. 8) when experiencing presynaptic and postsynaptic stimuli of sixty pulses at a rate of one Hertz. As indicted, the synaptic strength becomes stronger with time. Experimental results are shown as circles with vertical bars. The models match well with experimental data.

Figure 10A:
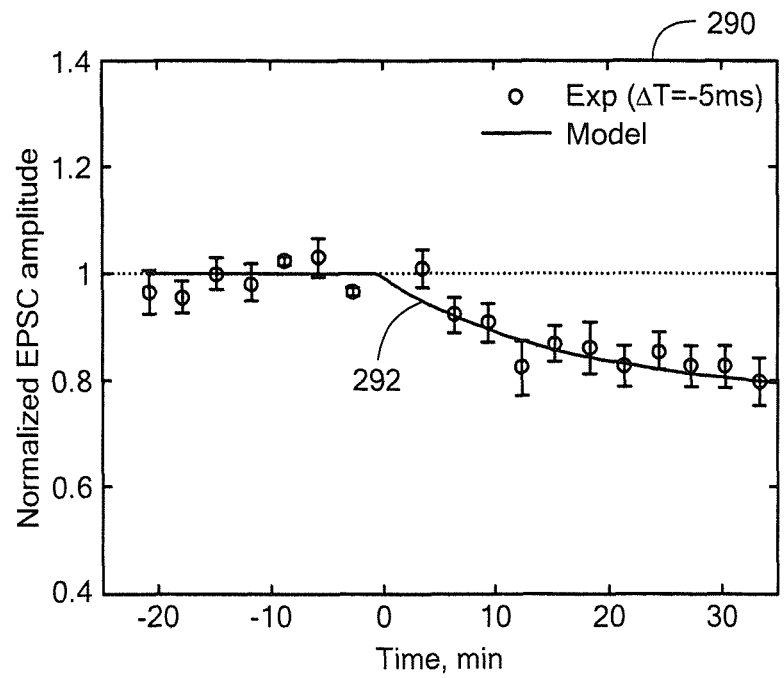

Referring now to FIG. 10A, a graph 290 has a horizontal axis with a scale in units of time in minutes and a vertical axis with a scale in units of EPSC amplitude in relative units. A curve 292 is representative of outputs of the above-described models having a spike timing of −5 ms (see, e.g., FIG. 8A) when experiencing presynaptic and postsynaptic stimuli of sixty pulses at a rate of one Hertz. As indicted, the synaptic strength becomes weaker with time. Experimental results are shown as circles with vertical bars. The models match well with experimental data.

Transient responses of positively correlated presynaptic and postsynaptic stimuli demonstrate positive steady state response (LTP), and those of negatively correlated stimuli show negative response (LTD). As shown in FIG. 10, when EPSP caused by presynaptic stimulus precedes a postsynaptic back potential by 5 ms, the normalized EPSC amplitude increases by about 50%. In contrast, as shown in FIG. 10A, the opposite temporal order makes the EPSC amplitude decrease by 20%. Considering the dynamics of NMDA receptors coupled with the calcium two-component (kinase and phosphatase) model, we simulated both the positive and negative spike timing in FIGS. 10 and 10A. Even with the exactly same sets of parameters, the results clearly show distinct directions of synaptic plasticity as a result of temporal order of presynaptic glutamate concentration and postsynaptic back potential. Also, the rise time and steady-state EPSC amplitudes match the experimental data. This indicates that the unified systematic model is likely to be the underlying mechanism of STDP given specific spike timing.

In FIGS. 11-15C below, a variety of spike timings are examined with the above models, and the model outputs are compared with experimental results. Not only spike timings, but also shapes of postsynaptic dendrite back potentials are shown below to influence types of STDP.

Typical STDP experiments include measuring synaptic plasticity at various spike timings. Temporal order determines the polarity of long-term plasticity.

Forward Asymmetric STDP Following a Hebbian Rule

Figure 11:
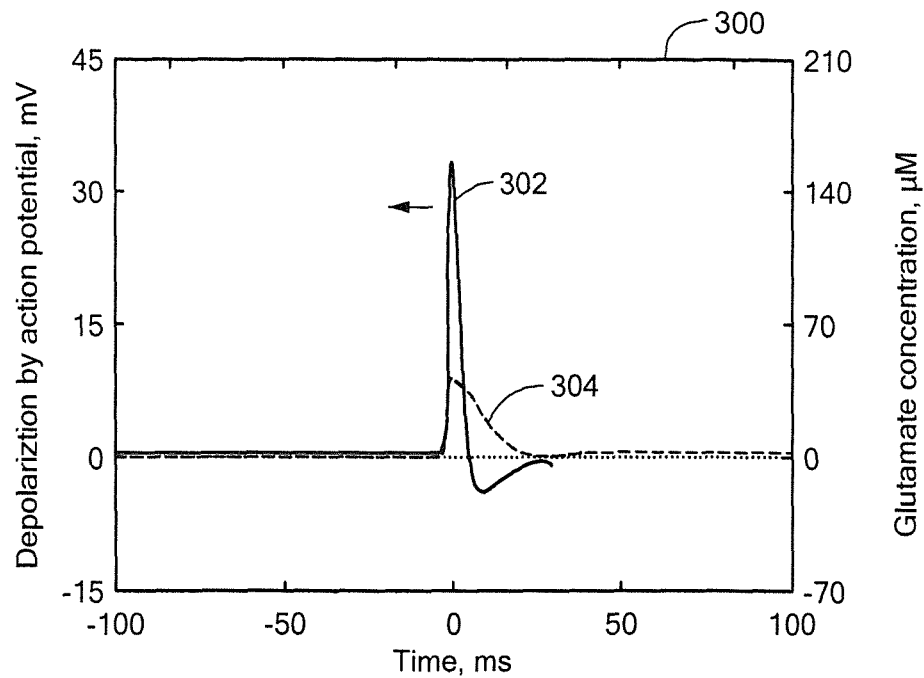
FIGS. 11-11C are a series of graphs resulting in a particular spike timing dependent plasticity (STDP) in FIG. 11C in accordance with spike timing and waveform shapes of postsynaptic back potential and glutamate concentration shown in FIG. 11.

Referring now to FIG. 11, a graph 300, like the graphs 200, 210 of FIGS. 8 and 8A, has a horizontal axis with a scale in unit of time in milliseconds, a left vertical axis with a scale in units of depolarization in millivolts, and a right vertical axis with a scale in units of glutamate concentration in micromoles. A curve 302 is representative of a postsynaptic back potential having a shape determined by Hodgkin-Huxley equations. A curve 304 is representative of glutamate concentration. As described above, the relative timing is indicative of spike timing.

Figure 11A:
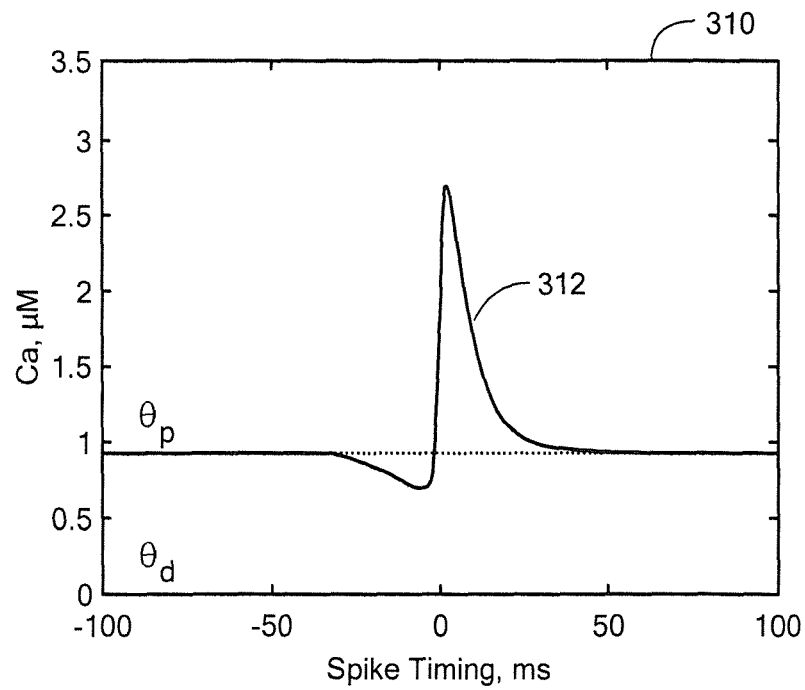

Referring now to FIG. 11A, a graph 310 has a horizontal axis with a scale in unit of relative spike timing in milliseconds and vertical axis with a scale in units total postsynaptic calcium concentration in micromoles. A curve 312 is predicted by the above model equations and is indicative of a total postsynaptic calcium concentration versus time. To generate the curve 312, sixty pulses of presynaptic and postsynaptic stimuli according to the graph 300 of FIG. 11 but with various spike timings were applied at a rate of one Hertz.

Figure 11B:
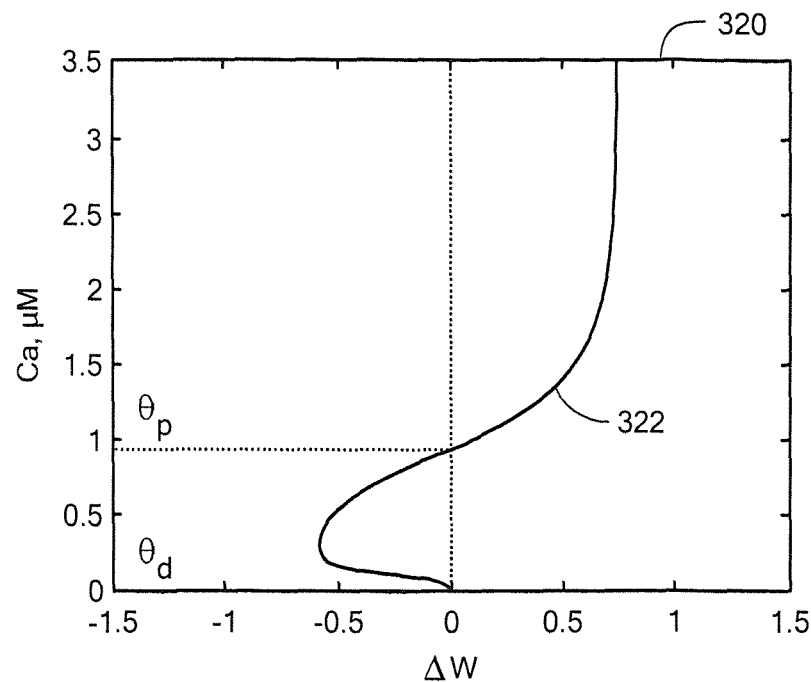

Referring now to FIG. 11B, a graph 320, similar to the graph 240 of FIG. 9A but differently oriented, has a horizontal axis with a scale in units of change of synaptic strength in relative units and a vertical axis with a scale in units of total postsynaptic calcium concentration in micromoles. A curve 322 is predicted by the above model equations and is indicative of a change in synaptic strength versus total postsynaptic calcium concentration. To generate the curve 322, sixty pulses of presynaptic and postsynaptic stimuli according to the graph 300 of FIG. 11 but with various spike timings were applied at a rate of one Hertz. Fewer calcium ions flow into the postsynaptic dendrite in the case of negative spike timing as opposed to two to three times more calcium at spike timings of about +0~15 ms. Here, the calcium dependent plasticity equation 1.6 above was used to convert calcium concentration into a change in number of active AMPA receptors and thus, synaptic strength.

Figure 11C:
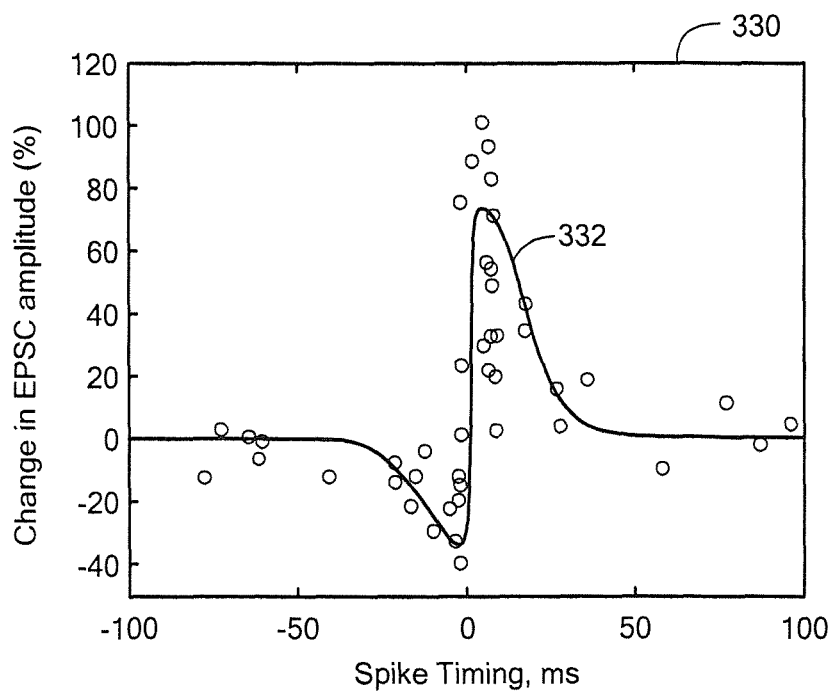

Referring now to FIG. 11C, a graph 330 has a horizontal axis with a scale in units of spike timing in milliseconds and a vertical axis with a scale in units of change in EPSP amplitude in percent. A curve 332 is predicted by the above model equations and is indicative of a change in synaptic strength versus spike timing. To generate the curve 332, sixty pulses of presynaptic and postsynaptic stimuli according to the graph 300 of FIG. 11 but with various spike timings were applied at a rate of one Hertz. Experimental results represented by small circles show agreement between experimental results and model predictions. The spike timing dependent plasticity represented by the curve 332 is referred to as "forward STDP" and "asymmetric STDP" following a so-called "Hebbian" rule.

Backward Asymmetric STDP Following a Hebbian Rule

Figure 12:
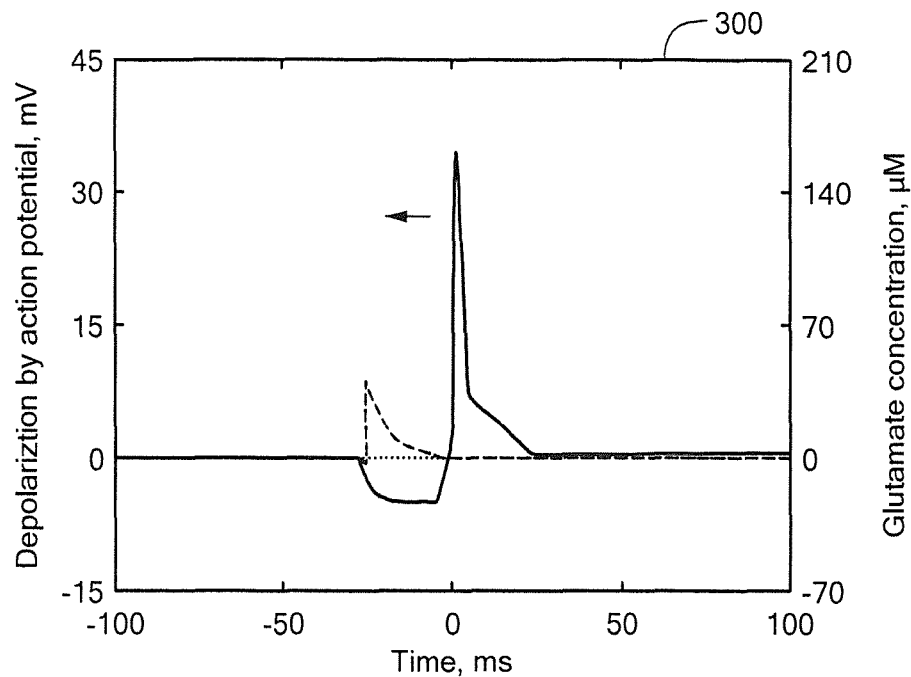
FIGS. 12-12C are a series of graphs resulting in another particular spike timing dependent plasticity (STDP) in FIG. 12C in accordance with spike timing and waveform shapes of postsynaptic back potential and glutamate concentration shown in FIG. 12.
Figure 12A:
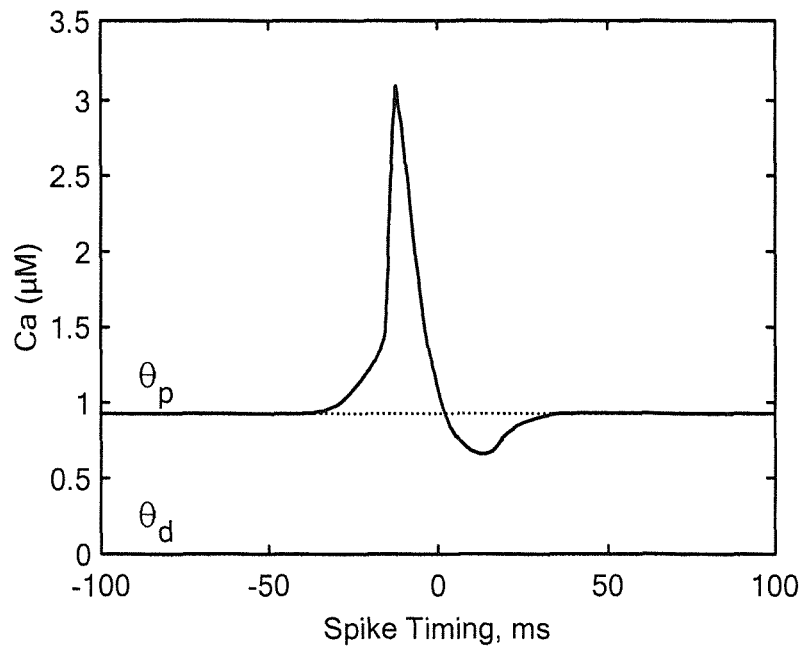
Figure 12B:
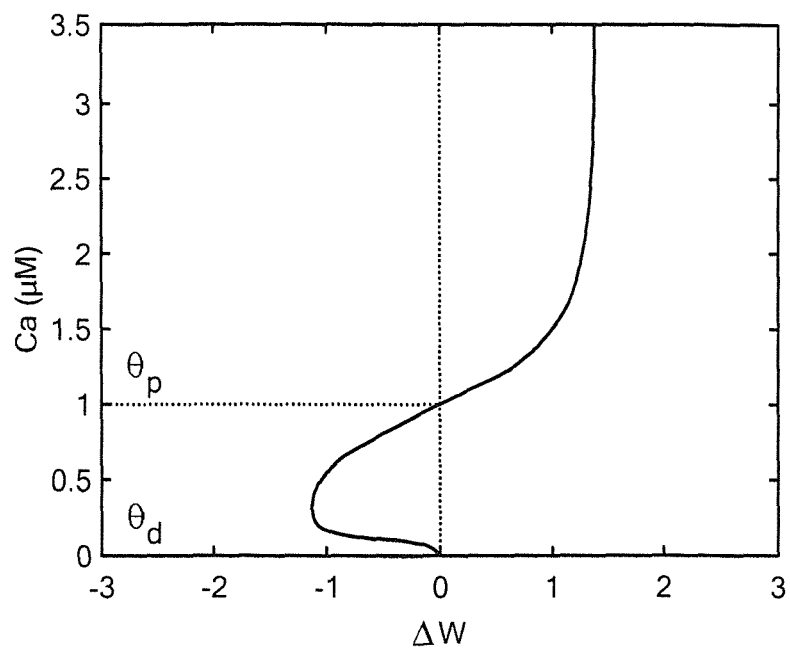
Figure 12C:
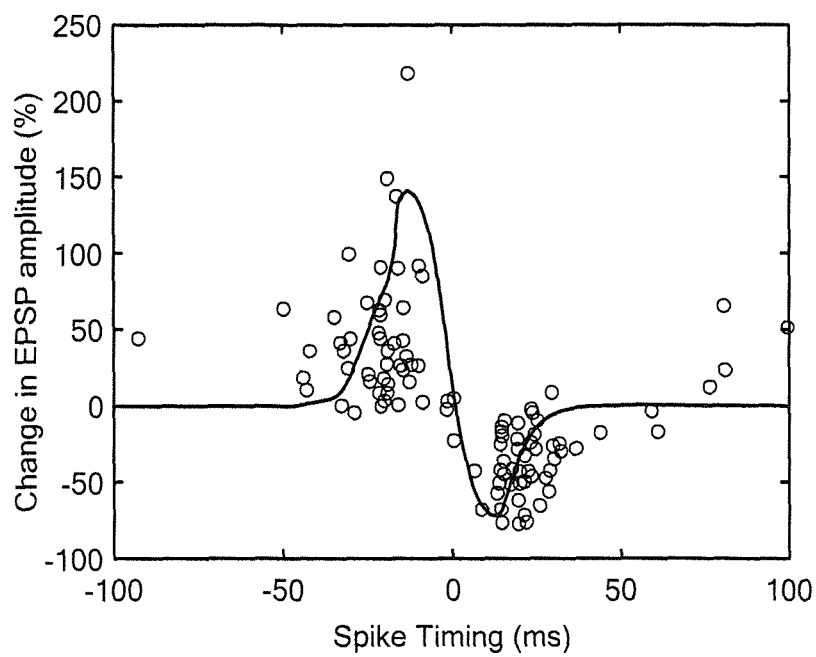

Referring now to FIGS. 12-12C in comparison with FIGS. 11-11C, the graphs are similar to graphs of FIGS. 11-11C, respectively, however, in FIG. 12, a different shape of postsynaptic dendrite back potential is used, which is not in accordance with the H-H equations presented above in conjunction with FIGS. 5 and 6, but which is more like the postsynaptic dendrite back potential used in the H-H with DAP presented in conjunction with FIG. 6A. Experimental results represented by small circles in FIG. 12C again show agreement between experimental results and model predictions. The spike timing dependent plasticity represented by the curve FIG. 12C below is referred to as "backward STDP," and "asymmetric STDP" following a so-called "anti-Hebbian" rule.

FIGS. 12-12C are not discussed in detail herein as they follow the same pattern as FIGS. 11-11C.

Temporal spike timing directional dependence of backward STDP is the reverse of that for forward STDP shown above in FIGS. 11-11C. For example, in parallel fiber synapses of cerebellum-like structures in electric fish, it has been observed that LTP results when EPSP precedes a postsynaptic back potential. Conversely, LTD results under the opposite temporal spike timing relationship.

There may be different types of plasticity in cerebral cortex and in cerebellum-like structures. The various plasticity types can be explained by different shapes of postsynaptic back potentials. The parallel fiber synapses in GABAergic Purkinje-like cells are mostly inhibitory. Similar to other inhibitory synapses, the generated postsynaptic back potential demonstrates apparent hyperpolarization before the peak of the spike. The inversion in back potential may result into backward STDP.

Symmetric STDP with Both LTP and LTD

Figure 13:
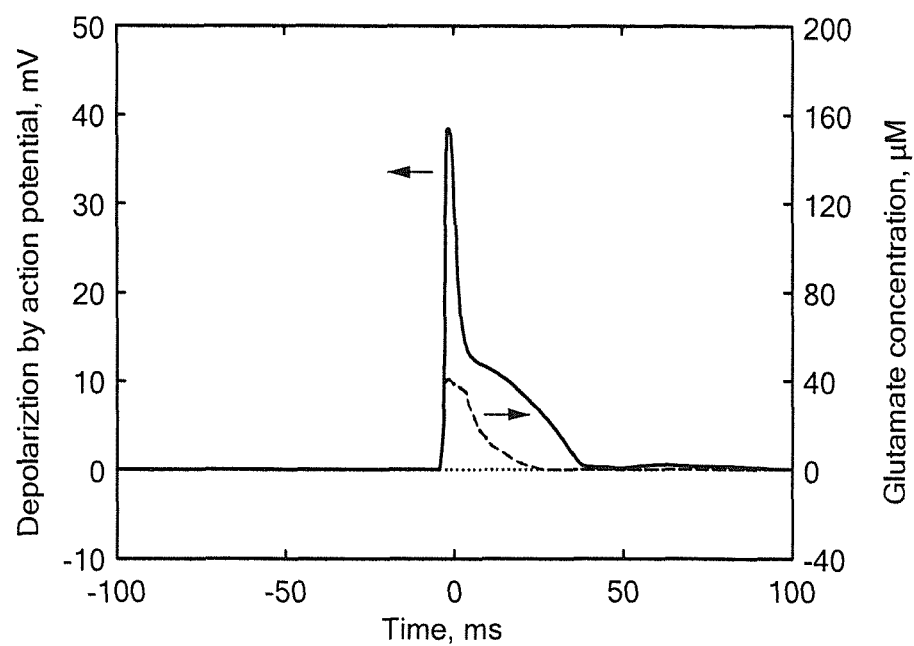
FIGS. 13-13C are a series of graphs resulting in another particular spike timing dependent plasticity (STDP) in FIG. 13C in accordance with spike timing and waveform shapes of postsynaptic back potential and glutamate concentration shown in FIG. 13.
Figure 13A:
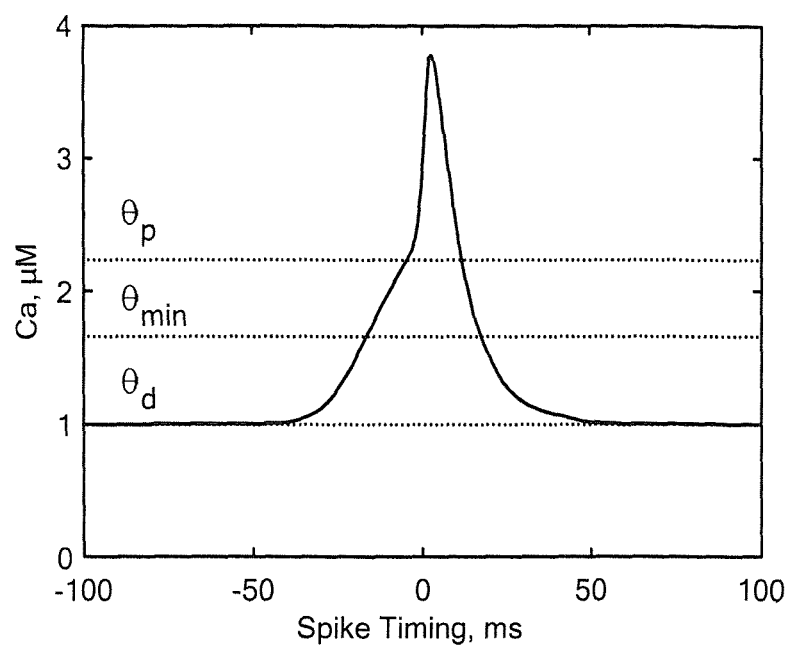
Figure 13B:
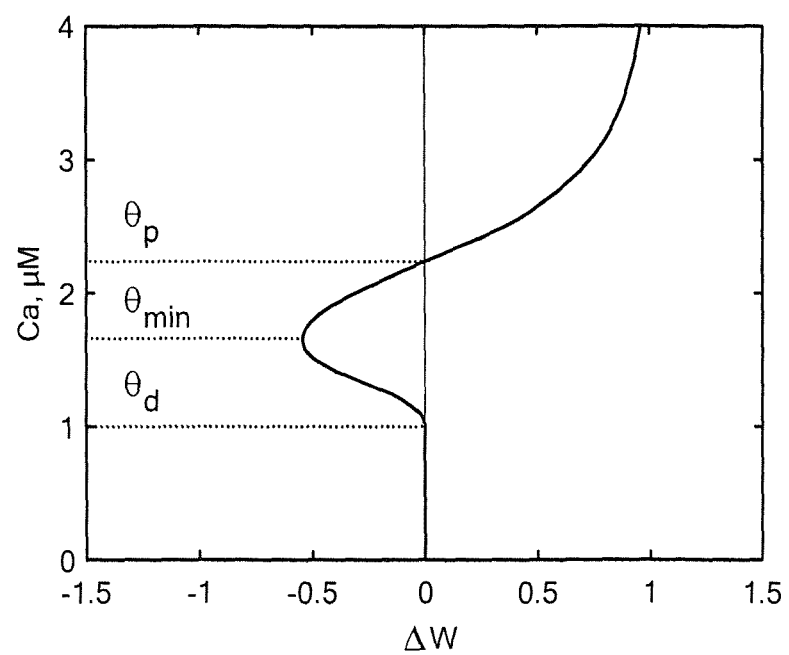
Figure 13C:
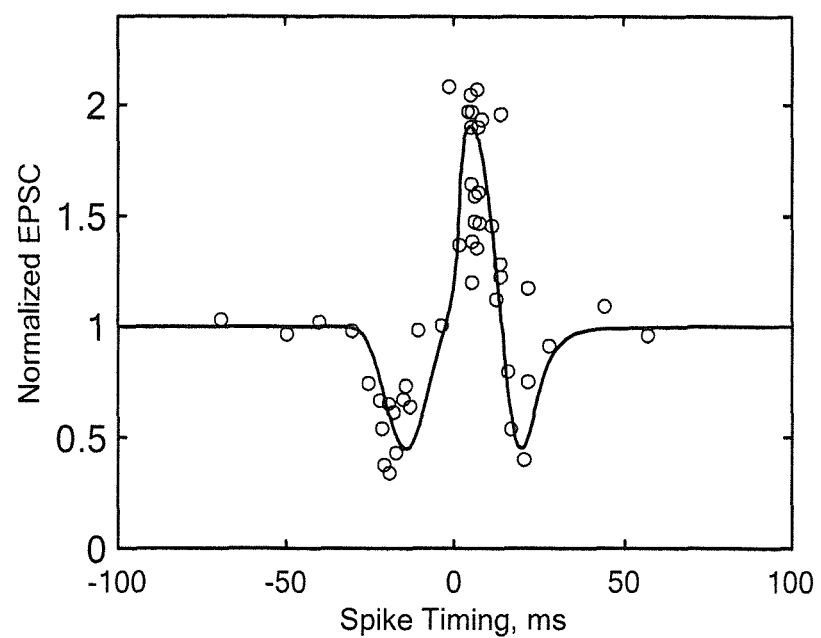

Referring now to FIGS. 13-13C in comparison with FIGS. 11-11C, the graphs are similar to graphs of FIGS. 11-11C, respectively, however, in FIG. 13, yet a different shape of postsynaptic dendrite back potential is used, which is not in accordance with the H-H equations presented above in conjunction with FIGS. 5 and 6, but which is more like the postsynaptic dendrite back potential used in the H-H with DAP presented in conjunction with FIG. 6A. Experimental results represented by small circles in FIG. 13C again show agreement between experimental results and model predictions. The spike timing dependent plasticity represented by the curve FIG. 13C below is referred to as "symmetric STDP with both LTP and LTD."

FIGS. 13-13C are not discussed in detail herein as they follow the same pattern as FIGS. 11-11C.

The symmetric STDP of FIG. 13C demonstrates two depression windows at spike timing around +20 ms and −20 ms, respectively while the time interval in between results into potentiation. This phenomenon was first discovered in CA1 pyramidal neurons of rat hippocampus, by others. Similar responses of two LTD windows at a spike timing of about ±25 ms were reported at CA3-CA1 synapses.

Because there is no apparent hyperpolarization portion in the postsynaptic back potential in FIG. 13, the convolution between glutamate and the back potential simply contributes to higher calcium level for all spike timings. The reason for the existence of two depression windows even at monotonously higher calcium concentration is the omega-shaped calcium-dependent synaptic strength. More specifically, as indicated in FIGS. 13A and 13C, the highest calcium concentration ($>\theta_p$) at around time zero results in a largest increase in synaptic plasticity. Therefore, the level of calcium between concentrations of $\theta_d$ and $\theta_p$ leads to the two depression windows with the largest drop of synaptic strength corresponding to a total postsynaptic calcium concentration of $\theta_{min}$.

Symmetric STDP with Only LTP

Figure 14:
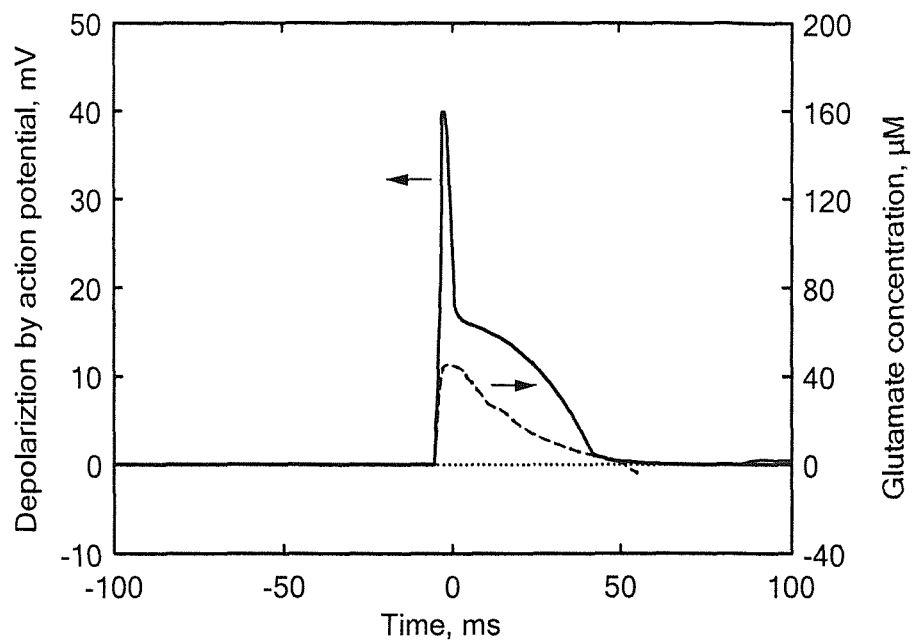
FIGS. 14-14C are a series of graphs resulting in another particular spike timing dependent plasticity (STDP) in FIG. 14C in accordance with spike timing and waveform shapes of postsynaptic back potential and glutamate concentration shown in FIG. 14.
Figure 14A:
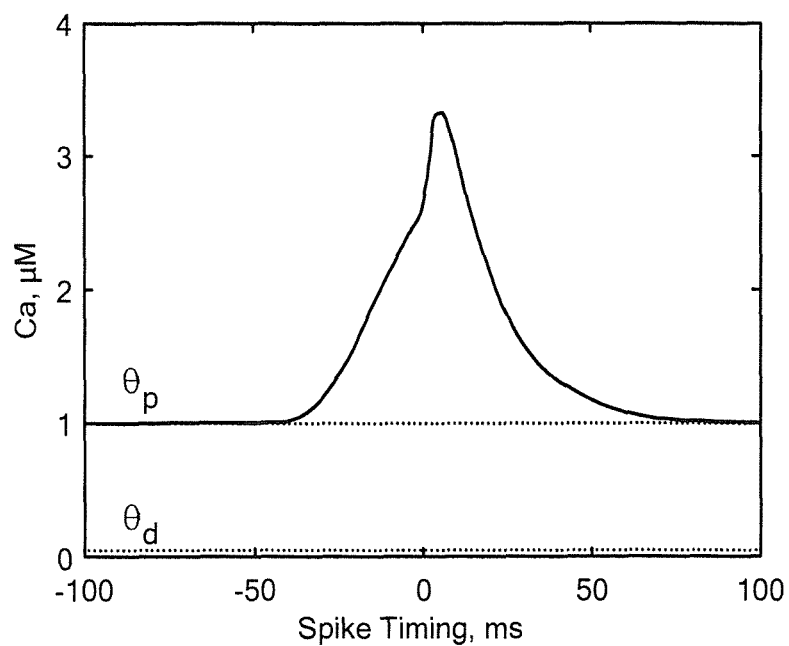
Figure 14B:
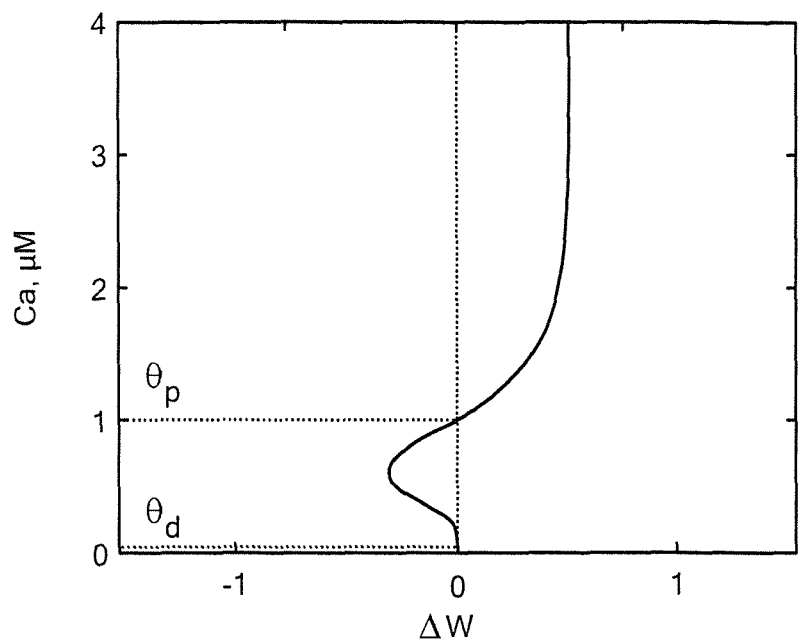
Figure 14C:
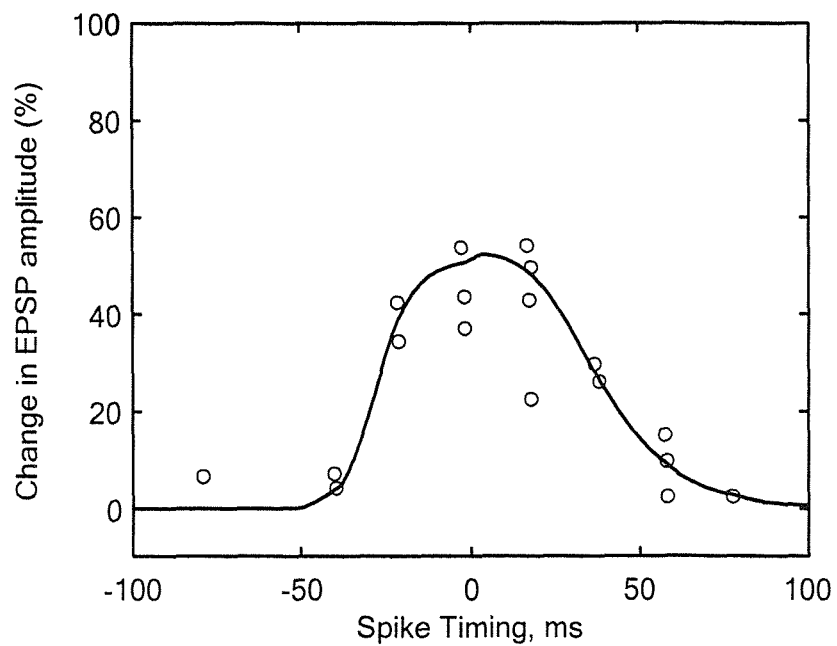

Referring now to FIGS. 14-14C in comparison with FIGS. 11-11C, the graphs are similar to graphs of FIGS. 11-11C, respectively, however, in FIG. 14, yet another different shape of postsynaptic dendrite back potential is used, which is not in accordance with the H-H equations presented above in conjunction with FIGS. 5 and 6, but which is more like the postsynaptic dendrite back potential used in the H-H with DAP presented in conjunction with FIG. 6A. Experimental results represented by small circles in FIG. 14C again show agreement between experimental results and model predictions. The spike timing dependent plasticity represented by the curve FIG. 14C below is referred to as "symmetric STDP with only LTP."

The symmetric STDP with only LTP was discovered in hippocampal slice CA1 fairly early. According to experimental data shown as circles in FIG. 14C, time lags between presynaptic and postsynaptic stimuli ranging from −40 ms to +50 ms result in LTP without observable LTD. This type of STDP is the simple to explain because the response appears like common results of convolution.

Symmetric STDP with Only LTD

Figure 15:
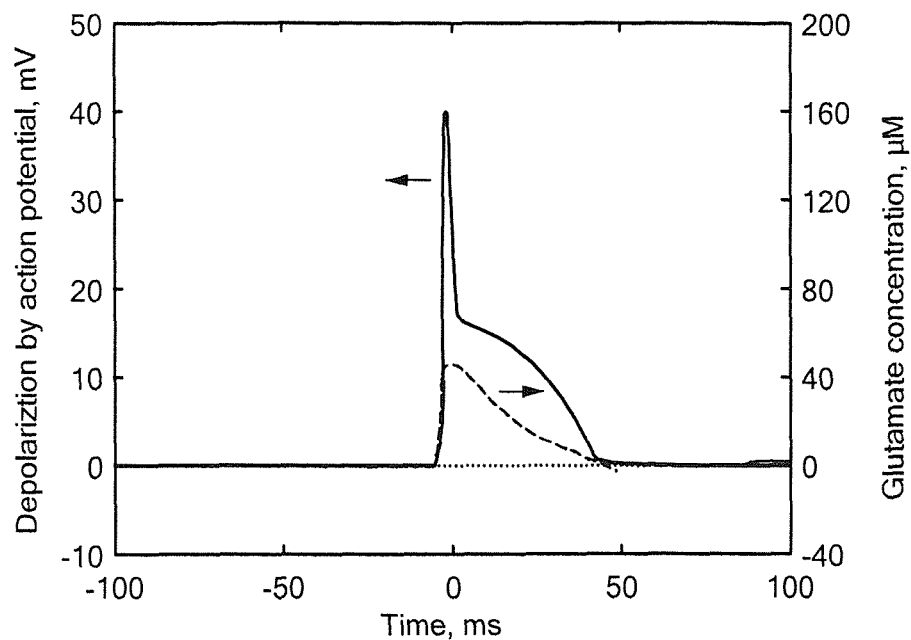
FIGS. 15-15C are a series of graphs resulting in another particular spike timing dependent plasticity (STDP) in FIG. 15C in accordance with spike timing and waveform shapes of postsynaptic back potential and glutamate concentration shown in FIG. 15.
Figure 15A:
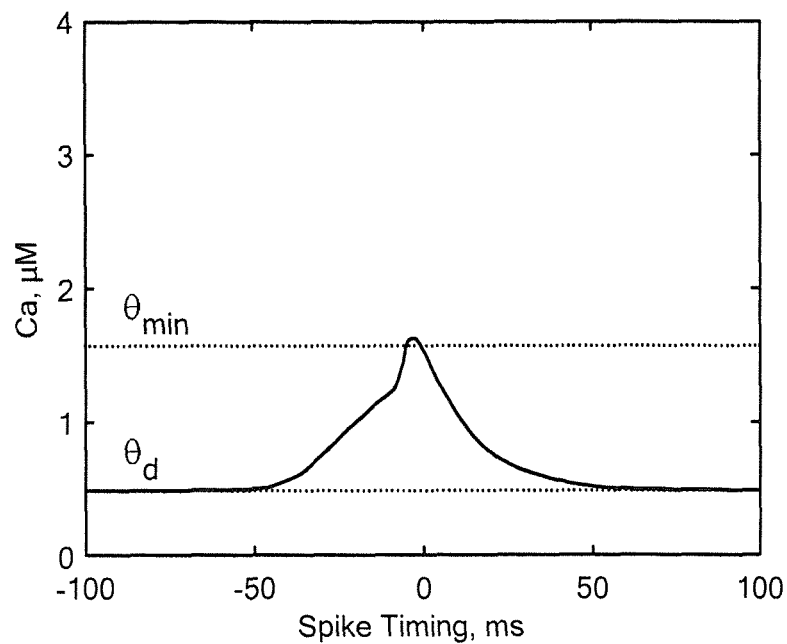
Figure 15B:
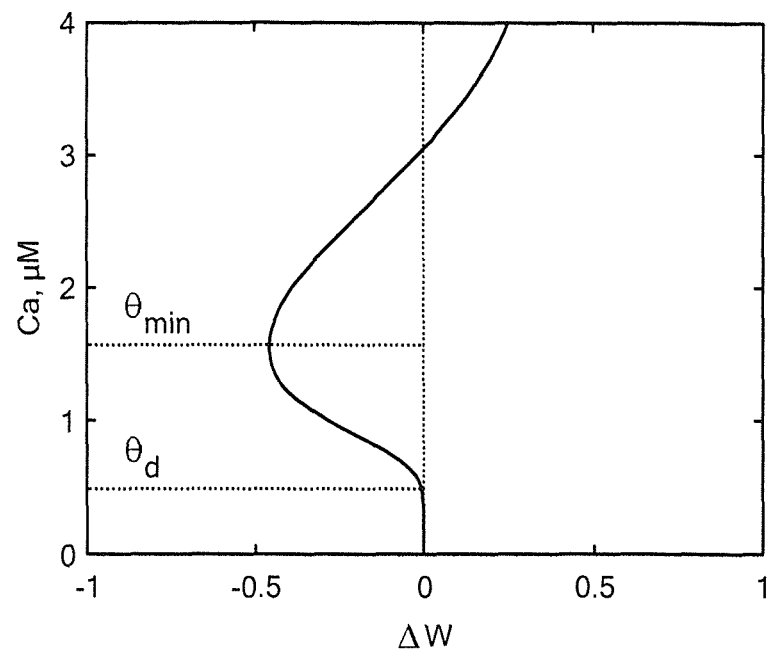
Figure 15C:
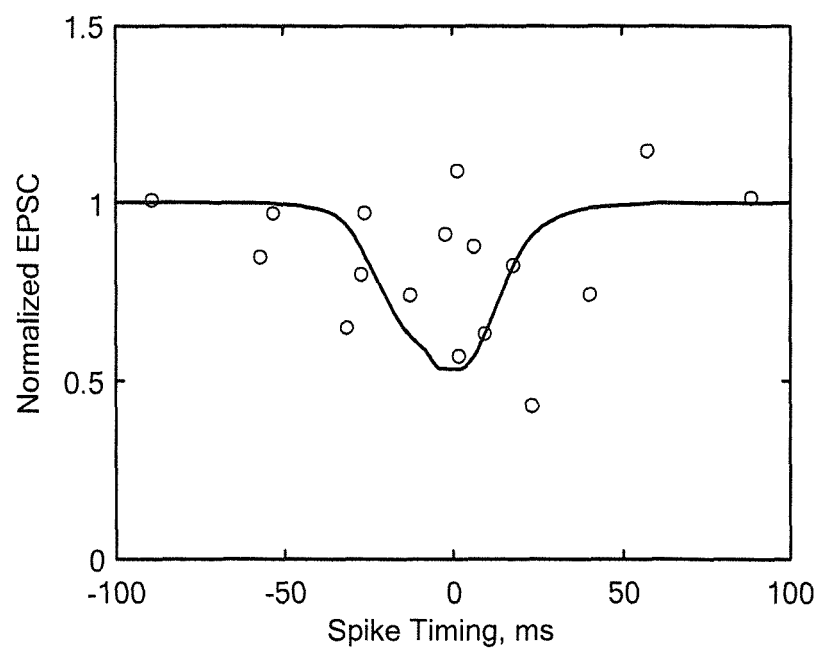

Referring now to FIGS. 15-15C in comparison with FIGS. 11-11C, the graphs are similar to graphs of FIGS. 11-11C, respectively, however, in FIG. 15, yet another different shape of postsynaptic dendrite back potential is used, which is not in accordance with the H-H equations presented above in conjunction with FIGS. 5 and 6, but which is more like the postsynaptic dendrite back potential used in the H-H with DAP presented in conjunction with FIG. 6A. Experimental results represented by small circles in FIG. 15C again show agreement between experimental results and model predictions. The spike timing dependent plasticity represented by the curve FIG. 15C below is referred to as "symmetric STDP with only LTD."

FIGS. 15-15C are not discussed in detail herein as they follow the same pattern as FIGS. 11-11C.

Symmetric STDP with only LTD was discovered in rat barrel cortical slice and in rat hippocampal CA3-CA1. The experimental protocols adopted for eliciting symmetric STDP with only LTD are similar to previous experiments. The spike timing difference for generating LTD was between −50 ms and 50 ms. Throughout the pairing stimulation, no significant long-term potentiation was detected.

What causes some synapses to demonstrate STDP with only LTD and others to show LTP can be hypothesized. Since the postsynaptic back potentials of FIGS. 14 and 15 are similar, the reasons might lie in the relative levels between calcium concentration and the threshold values of BCM rules. Though the back potential shapes are similar, we applied a smaller proportional constant in regard to FIG. 15A than in regard to FIG. 14A, assuming the magnitude of calcium concentration is lower. The reasons might be larger sizes of postsynaptic compartments or weaker calcium current inflow. Then other parameters were assigned such that accumulated calcium concentration level lies between two threshold values, $\theta_{min}$ and $\theta_d$. Under this condition, synaptic strength decreases monotonously with calcium, so highest concentration level at time zero corresponds to the lowest synaptic strength in FIGS. 15B and 15C. FIG. 15C shows STDP with only LTD, wherein the left and right sides are symmetric to one another.

Referring now to FIG. 16, the above-described five types of STDP are summarized along with parameters used in the above-described models.

It will be apparent from discussion above that spike timing dependent plasticity is the manifestation of several subsystems interacting with one another as shown in FIG. 3. Temporal order specificity of STDP is the result of convolution between presynaptic glutamate flux and postsynaptic depolarization both of which are necessary for activation of NMDA receptors. The glutamate influx is elicited by presynaptic stimuli and membrane depolarization is initiated by action potentials and back potentials due to postsynaptic stimuli.

The underlying cellular reactions that cause spike timing dependent plasticity were not fully understood from previous molecular biology methodology. Without the above-described quantitative model, a number of qualitative hypotheses were previously left unexplained. Since the above-described unified model is capable of explaining various kinds of STDP, the actual underlying biophysical mechanisms may be close to those described above.

Figure 17:
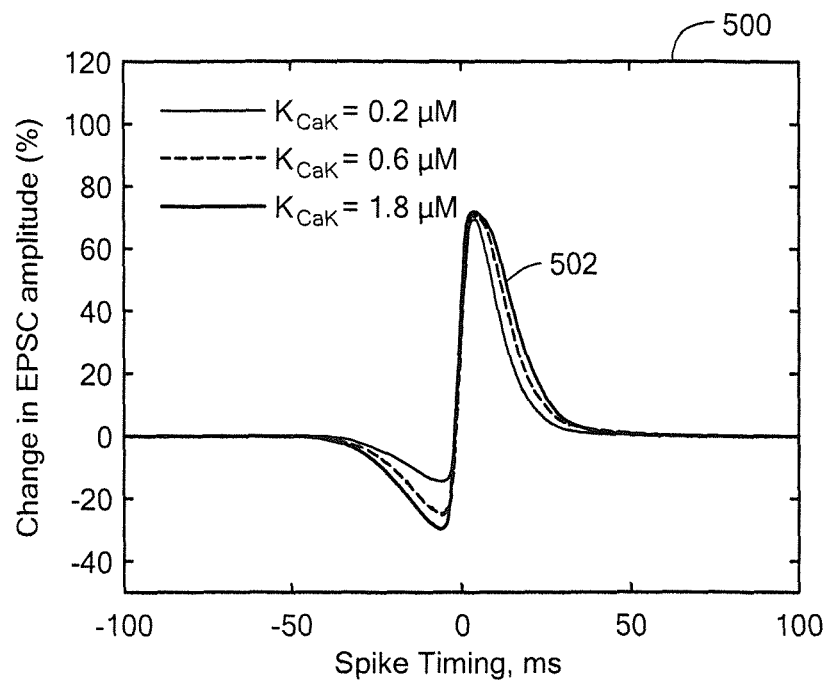
FIGS. 17 and 17A are graphs showing relations between STDP and various parameters.
Figure 17A:
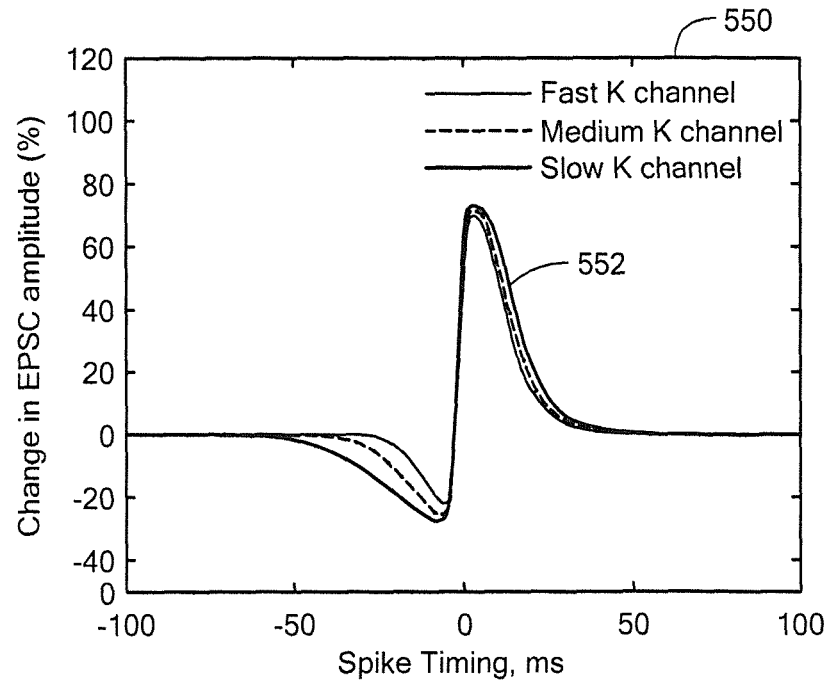

Referring now to FIGS. 17 and 17A, graphs 500, 550 have horizontal axes with scales in units of relative spike timing in milliseconds and vertical axes with scales in units of change in EPSC amplitude in percent.

The graph 500 includes a plurality of curves 502, which are calculated using the above equations but with a corresponding plurality of values of the sensitivity factor $K_{CaK}$, which is the sensitivity of calcium to calcium dependent kinase.

The graph 550 includes a plurality of curves 552, which are calculated using the above equations but with a corresponding plurality of values corresponding to the speed of potassium channels.

Perturbation of parameters of FIGS. 17 and 17A demonstrate how different physiological conditions lead to the change in STDP response. As shown in FIG. 17, raising the sensitivity of calcium-dependent kinase (i.e., decreasing $K_{CaK}$ values) weakens the depression level of the LTD window. The reason is that the more sensitive the kinase is to calcium (i.e., it gets saturated more easily), the lower is the level of synaptic strength. Therefore, the perturbation of $K_{CaK}$ causes the variation of STDP in terms of intensity but not in the width of time window. As shown in FIG. 17A, changes in the recovery rate of potassium channels alters the time course of action potential. As a result, the action potential recovers from hyperpolarization slower and thus the time window within which LTD prevails are widened.

With the above-described unified model, some issues can be resolved. A first issue is whether one coincidence detector (i.e., the above described equation 1.2 for total calcium) is sufficient to demonstrate the STDP response. A second issue is whether the spike timing dependent long-term potentiation and depression involves independent processes. As demonstrated by the response of the model, the NMDA receptor as a single coincidence detector can give rise to a variety of STDP types. Therefore, voltage gated calcium channels (VGCC) as second coincidence detectors re not necessarily required. Second, the spike timing potentiation and depression are likely to result from an integrated mechanism. Such mechanism gives rise to potentiation or depression, depending on the relative timing of glutamate flux and membrane depolarization as the two requirements of NMDA receptor activation.

In general, the time extent of postsynaptic back potential is as large as twenty milliseconds, and the time extent of glutamate flux is of the same order. In order for these two signals to interact with one another, close temporal proximity is required. Negatively correlated presynaptic and postsynaptic stimulation may result in an anti-Hebbian change in synaptic strength. Hyperpolarization and omega-shaped calcium dependent plasticity are reasons behind such phenomena.

Referring now to FIG. 18, a computer system 570 can include a computer 572 and a display device 588. The computer 572 can include a central processing unit (CPU) 574 coupled to a computer-readable memory 576, a form of computer-readable storage medium, which can, for example, be a semiconductor memory. The memory 576 can store instructions associated with an operating system 578, associated with applications programs 580, and associated with input and output programs 582, for example a video output program resulting in a video output to the display device 588.

The computer 572 can also include a drive device 584, which can have a computer-readable storage medium 586 therein, for example, a CD or a floppy disk. The computer-readable storage medium 576 and/or the computer-readable storage medium 586 can be encoded with computer-readable code, the computer-readable code comprising instructions for performing at least the above-described models.

Circuit Design

As used herein, the term "neuromorphic circuit" refers to analog, digital, or mixed signal very large scale integration (VLSI) circuits that implement circuit models and real time simulation of neuronal systems. Such circuits are directed to perception, motion control, and signal processing pathways in the brain.

Described below are particular circuits that can implement the spike timing dependent plasticity of the above-described mathematical models. While analog neuromorphic circuits are shown below and described below to have particular advantages, it will be apparent that is other embodiments, the spike timing dependent plasticity can be implemented using digital circuits.

When designing a neuromorphic circuit, it is important to understand how biochemical processes of neurons relate to available circuit techniques and overall architectures. As described above, a unified mathematical model has been developed to characterize the biophysics of neuronal biological processes, in particular, spike timing dependent plasticity. The above-identified mathematical relationships are implemented in circuit described below.

In constructing a complete neuromorphic circuit, a number of circuit functions are needed, including, but not limited to, circuits that can provide action potential generators that can be used to encode electrical information, circuits that can provide chemical signal generators to encode chemical information into electrical signals, and also circuits that can emulate a synapse. The circuits are configured to receive electrical inputs representative of biochemical signals and configured to emulate observed synaptic plasticity behavior. To build such circuits we then face many design considerations such as power, area and speed.

The neuron is not a fast acting signal processing unit. Hence, circuit speed may not be a significant design issue. The brain is not a slow machine. However, compared to modern circuits, which typically operate in high frequencies (e.g., up to 1000 MHz), the brain is a relatively slow processor; neuron activity typically operates in low frequency bands (10-100 KHz). Thus, power and silicon area, rather than speed, tend to dominate design considerations.

A small silicon area may be achieved by building circuits using a small number of transistors while avoiding large capacitors and resistors. Low power may be achieved by using circuits that operate in a subthreshold or weak inversion regime. Subthreshold circuits typically have transistors that draw currents in the picoampere (pA) or nanoampere (nA) range, which is coincidentally similar to the order of magnitude of currents in neurons.

Analog circuits used to implement neuromorphic circuits have advantages over digital circuits. Digital circuits used to implement biochemical relationships tend to be more complex than analog circuits and tend to require more silicon die area. Also, relationships that can be implemented with relatively simple analog circuits tend to require more complex digital circuits if implemented digitally. For example, an adder can be implemented in a simple analog circuit. However, a digital adder is slower and more complex.

Among analog circuits, weak inversion transistor circuits (subthreshold circuits) have particular advantages described below.

A metal oxide silicon field effect transistor (MOSFET) is a known four terminal device use din integrated circuits. The four terminals of the MOSFET are the gate (G), source (S), drain (D), and bulk (B).

As is known, there are two types of MOSFETS, an N-channel MOSFET (NMOS) and a P-channel MOSFET (PMOS). NMOS is primarily used to sink currents while PMOS is used to source currents.

A voltage between the MOSFET's gate and source is referred to as a gate-source voltage, $V_{GS}$. The $V_{GS}$ affects current, $I_D$, flowing through the drain. $V_{GS}$ can be modified in at least two ways, i.e., by setting a fixed current through the drain of the transistor or by applying a fixed voltage across the gate and source of the transistor. It is known that MOSFETs have a gate-source threshold voltage, $V_{th}$, at which voltage an $I_D$ to $V_{GS}$ relationship rapidly changes slope. MOSFET are most often used in designs for which operation is at a gate-source voltage above the threshold voltage, i.e., $V_{GS} > V_{th}$. However, in other designs, MOSFETs can operate at gate-source voltages below the gate-source threshold voltage, i.e., $V_{GS} < V_{th}$, i.e., in subthreshold operation. Drain current, $I_D$, flowing through a MOSFET is much larger (about 1,000-1,000,000 times larger) when a MOSFET operates at a gate-source voltage above the threshold voltage than when the MOSFET operates at a gate-source voltage below the threshold voltage.

In subthreshold operation, the Boltzmann distribution of electron energies allows some of the more energetic electrons at the source to enter the drain-source channel and flow to the drain, resulting in a subthreshold current, $I_D$, that is an exponential function of $V_{GS}$. In weak inversion, the current varies exponentially with gate-to-source bias, $V_{GS}$, as given approximately by:

$$I_D = I_o e^{\frac{\kappa V_{GS}}{\varphi_t}} e^{\frac{(1-\kappa)V_{BS}}{\varphi_t}} \left(1 - e^{\frac{V_{DS}}{\varphi_t}}\right) \tag{1.7}$$

where:

$I_o$=an intrinsic current that flows when $V_{GS}$ is equal to zero, $\varphi_t$=the thermal voltage and is defined as $\varphi_t$=kT/q, where k is the Boltzmann constant, q=the charge of a single electron and T is the absolute temperature of the room, and κ=a process dependent constant and typically has a value of approximately 0.7.

The intrinsic current, $I_o$, is process dependent. In other words, the intrinsic current, $I_o$, depends on how the chip and silicon was manufactured.

The above equation 1.7 could be simplified if the bulk is short circuited to the source. This will set $V_{BS}$ to be equal to zero and the second exponential term becomes equal to one. Also, the transistor is biased so that it is saturated, which is achieved, for example, setting $V_{DS}$ to be 100 mV or larger, then the third exponential term becomes about zero because $V_{DS} \geq 4\varphi_t$, which would make the last term greater than 0.99. After these simplifications, a simplified expression for $I_D$ becomes:

$$I_D \approx I_o e^{\frac{\kappa V_{GS}}{\varphi_t}} \tag{1.8}$$

It should be understood that this is a purely exponential relationship between $V_{GS}$ and $I_D$.

Operation of analog circuits described below can be in subthreshold mode or in above-threshold mode. However, as described above, analog circuits operating in subthreshold mode have advantages. The subthreshold mode is further discussed in van der Meer, P. R., A. van Staveren, and A. H. M. v. Roermund, *Low-power deep sub-micron CMOS logic: Subthreshold Current Reduction*. Dordrecht: Springer, 2004. 78.

Analog architectures for various circuit structures are shown below as applied to particular neuromorphic circuits. Most of these structures can be found within electronic textbooks. One exemplary circuit used below, a multiplier and divider, can be found in Wilamowski, B. M. *VLSI analog multiplier/divider circuit, Industrial Electronics*. 1998. Another exemplary circuit used below, a transconductance amplifier, can be found in Sarpeshkar, R., L. R. F., and C. Mead, *A low-power wide-linear-range transconductance amplifier*, Analog Integrated Circuits and Signal Processing, 1997.

Since synaptic plasticity was discovered, neuromorphic engineers have attempted to create circuit network models of synapses. Neuromorphic circuits can be characterized in terms of several performance characteristics, including, but not limited to, power, stability, memory retention, and network scalability.

Some previous circuit models are inaccurate and do not reproduce experimental results. As an example, some previous circuit models are unable to reproduce the correct exponential-like shape of the synaptic change function in hebbian STDP of FIG. 11C above. Other previous circuit models are too simplistic and merely employ curve-fitting methods to reproduce the STDP curves. None of the previous circuits capture all known types of STDP, for example, the types shown above in FIGS. 11-15C, which is a very important issue since previous circuits can only be used in special circumstances and cannot be used as a general way, for example, to form intelligent machines. Furthermore, the previous circuits are not able to relate calcium based synaptic plasticity to STDP. In other words, no other circuit system has shown the BCM rule combined with an STDP behavior. In essence, previous circuits are neither accurate nor complete. In contrast, circuits described below that implement the above-described models of STDP (e.g., FIG. 3) provide robust and versatile characteristics that can unify the various forms of STDP as well as the BCM rule.

As described above, synaptic plasticity is influenced by two essential inputs—glutamate ligand concentration and back propagating dendritic action potential, i.e., a back potential (see, e.g., signals 110a, 116a of FIG. 3). As described above, the timing (i.e., spike timing) of these two input signals is important in order to properly model STDP. Therefore, below are presented circuits that reflect how the EPSC level is modulated by relative timing of these two inputs. Two external circuit blocks, i.e., spiking circuits, can emulate the behavior and timing of these two inputs signals.

Figure 19:
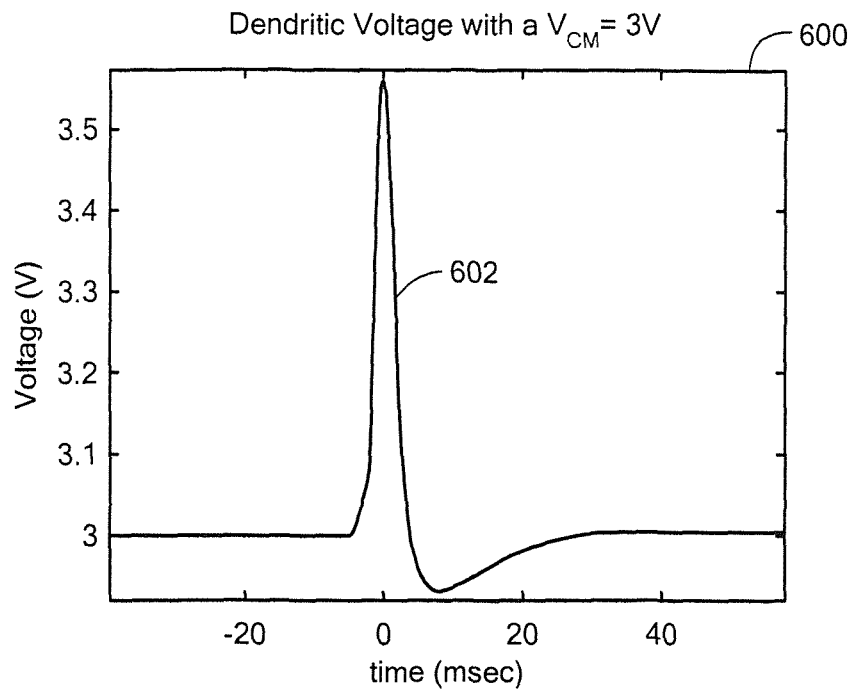
FIGS. 19 and 19A are graphs showing signals representative of a postsynaptic back potential and of a glutamate concentration, respectively.

Referring now to FIG. 19, a graph 600 has a horizontal axis with a scale in units of time in milliseconds and a vertical axis with a scale in units of voltage in volts. A signal 602 is representative of a dendritic back potential like the curve 202 of FIG. 8 and is representative of the signal 110a of FIG. 3.

Figure 19A:
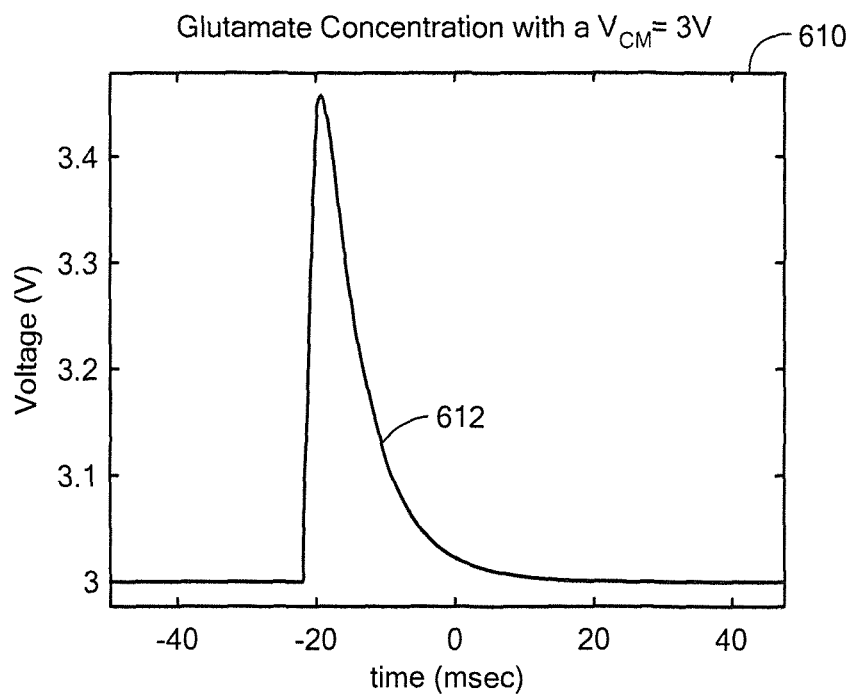

Referring now to FIG. 19A, a graph 610 has a horizontal axis with a scale in units of time in milliseconds and a vertical axis with a scale in units of voltage in volts. A signal 612 is representative of a glutamate concentration like the curve 204 of FIG. 8, and is representative of the signal 116a of FIG. 3.

Both the glutamate signal 612 and the dendritic back potential signal 602 are time varying continuous signals. A spiking circuit can generate these signals.

Figure 20:
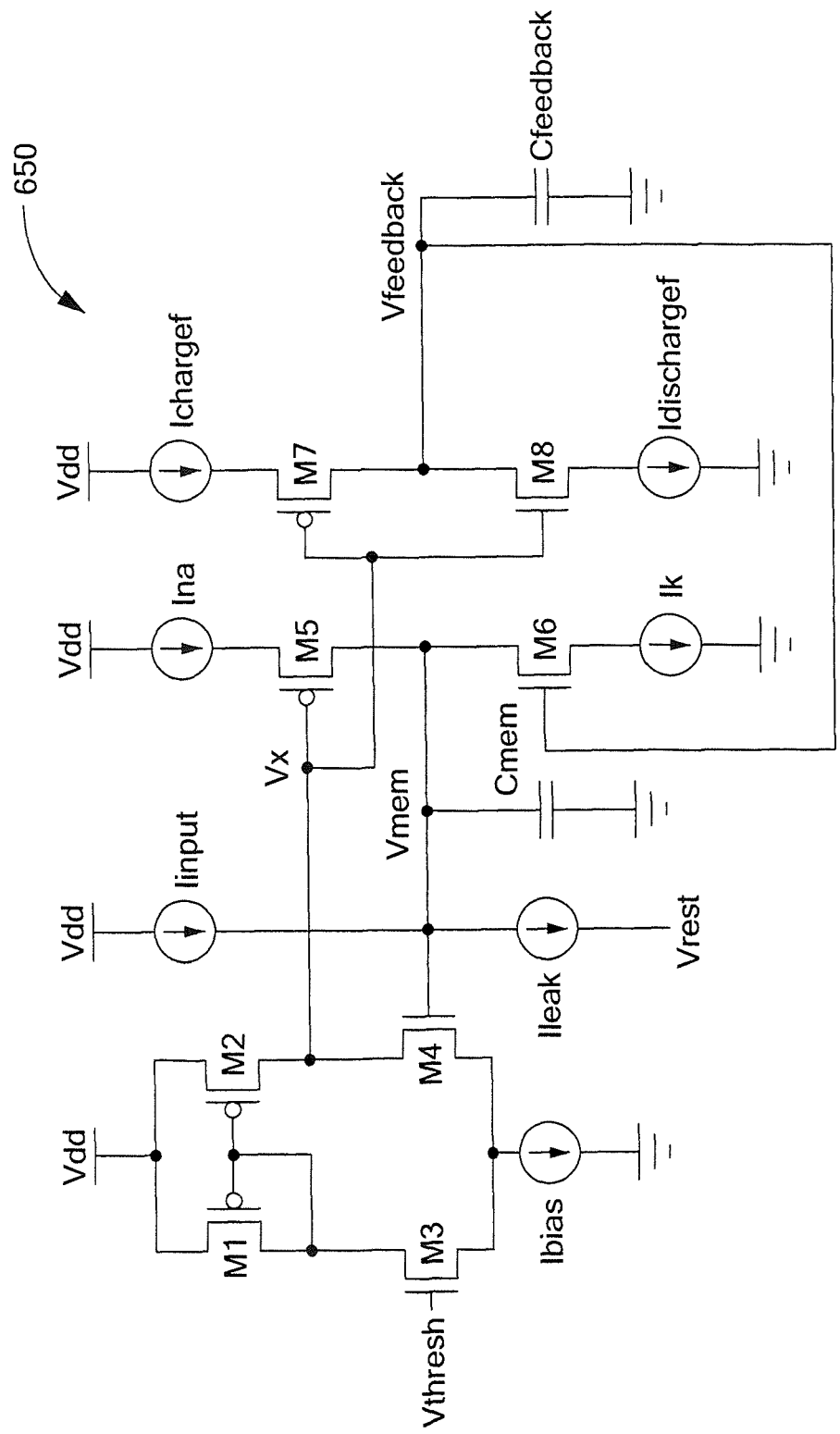
FIG. 20 is a circuit schematic showing a spiking circuit that can be configured to generate the signals of FIGS. 19 and 19A.

Referring now to FIG. 20, a circuit 650 can generate a voltage spike or a series of voltage spikes as a voltage output signal, $V_{mem}$, in response to an input current stimulus, $I_{input}$. The circuit 650 can include a transconductance amplifier formed by transistors M1-M4. The transconductance amplifier is used as a comparator such that when the voltage output signal, $V_{mem}$, rises above a threshold voltage, $V_{thresh}$, a voltage, $V_x$, decreases, turning off a transistor M5, which causes a current source, $I_{Na}$, to charge a capacitor, $C_{mem}$, a higher voltage output signal, $V_{mem}$. The voltage, $V_x$, then turns on M7, which allows the current $I_{Charge}$ to charge a feedback capacitor, $C_{feedback}$. When the voltage, $V_{feedback}$, on the feedback capacitor, $C_{feedback}$, rises above a certain threshold, a transistor M6 turns on causing a current source, $I_K$, to discharge $C_{mem}$ back to its initial resting voltage, $V_{rest}$. This last event forces $V_x$ to return to its resting value of around Vdd, which turns on a transistor M8, discharging $C_{feedback}$ and thereby turn off transistor M6.

Figure 21:
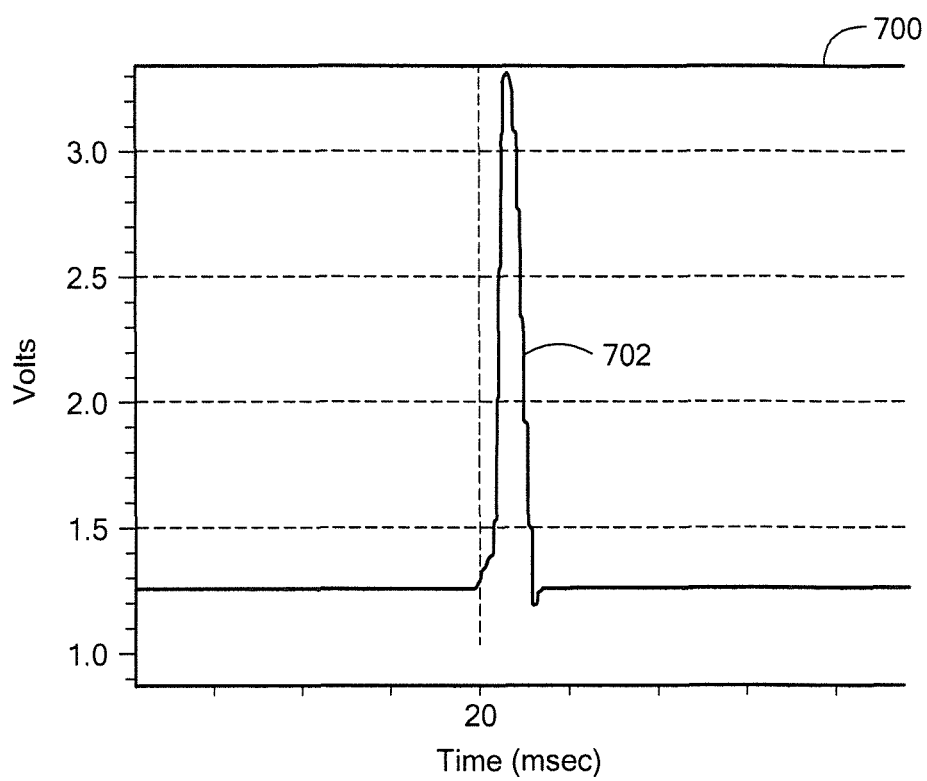
FIG. 21 is a graph showing a spike output signal from the circuit of FIG. 20.

Referring now to FIG. 21, a graph 700 has a horizontal axis with a scale in units of time in milliseconds and a vertical axis with a scale in units of voltage in volts. A signal 702 is the output voltage signal, $V_{mem}$, from the spiking circuit 650 of FIG. 20.

The above-described STDP circuit model (e.g., FIG. 3) represents a synapse. Several synaptic signals are of interest. The synaptic weight (or change in synaptic strength, ΔW in the above described equations 1.6) is of interests, which is represented by the excitatory postsynaptic current (EPSC). Another signal of interest is the total calcium level ($Ca_{total}$) of the synapse. Circuits described below determine the total calcium concentration, $Ca_{total}$, and map this value into synaptic strength.

It should be understood that circuits described below implement part of or all of the unified biochemical model represented by the block diagram 100 of FIG. 3.

Two options were considered in developing an electronic circuit. One option is to use a voltage mode design while the other option is to use a current mode design. For reasons that will become apparent from circuits below, existing circuit technology makes it easier and simpler to design the system using a current mode approach.

Figure 22:
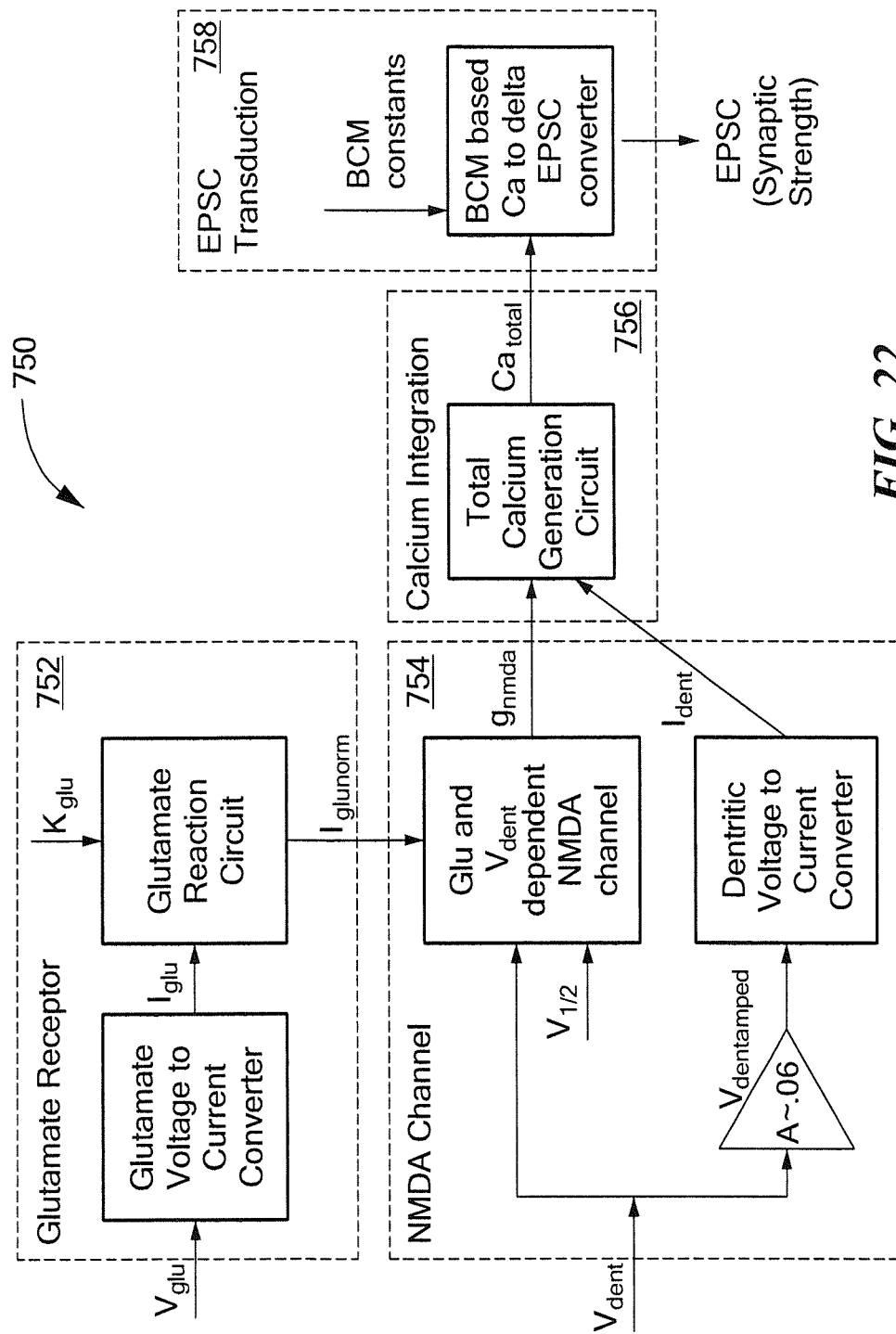
FIG. 22 is a circuit block diagram of a circuit that can perform the functions of the biophysical model of FIG. 3, and which includes a glutamate receptor circuit, an NMDA channel circuit, a calcium integration circuit, and an EPSC transduction circuit.

Referring now to FIG. 22, a circuit 750 can include a calcium integration circuit 756 configured to generate a calcium integration circuit output signal ($Ca_{total}$) representative of a total concentration of calcium in a postsynaptic dendrite. The calcium integration circuit is responsive to first and second input signals ($V_{glu}$, $V_{dent}$). The first input signal ($V_{glu}$) is representative of a glutamate concentration (GLU) in the postsynaptic dendrite. The second input signal is representative of a postsynaptic dendrite back potential. A magnitude of the calcium integration circuit output signal ($Ca_{total}$) is influenced by a relative timing relationship between the first and second input signals, wherein the relative timing relationship is in accordance with the above-described spike timing.

The circuit 750 can also include an EPSC transduction circuit 758 coupled to receive the calcium integration circuit output signal ($Ca_{total}$) and configured to generate an EPSC transduction circuit output signal (EPSC) representative of a change of synaptic strength of the postsynaptic neuron.

In some embodiments, as will become apparent from discussion below in conjunction with FIG. 24 below, the calcium integration circuit 756 performs a function representative of a calcium entrapment model of the form the same as or similar to equations 1.1 or 1.2 above.

In some embodiments, as will become apparent from discussion below in conjunction with FIG. 25 below, the EPSC transduction circuit 758 is configured to perform a function representative of a BCM relationship representative of both rate-based plasticity and spike timing dependent plasticity. In some embodiments, the EPSC transduction circuit 758 is configured to perform a function representative of a BCM relationship in the form of equation 1.6 above.

In some embodiments, the circuit 750 comprises an analog circuit comprised of FETs. In some embodiments, the FETs are configured to operate in subthreshold mode.

In some embodiments, the circuit 750 also includes a glutamate receptor circuit 752 coupled to receive the first input signal ($V_{glu}$) representative of the glutamate concentration in the postsynaptic dendrite, coupled to receive an association signal ($K_{glu}$) representative of an association constant indicative of a binding of the glutamate to NMDA receptors in the postsynaptic dendrite, and configured to generate a glutamate receptor circuit output signal ($I_{glunorm}$) representative of a ratio of bound glutamate to total glutamate in the postsynaptic dendrite.

In some embodiments, the circuit 750 also includes an NMDA channel circuit 754 coupled to receive the glutamate receptor circuit output signal ($I_{glunorm}$), coupled to receive the second input signal ($V_{dent}$) representative of the postsynaptic dendrite back potential, configured to generate a first NMDA channel circuit output signal ($g_{nmda}$) representative of a concentration of NMDA receptors in the postsynaptic dendrite, and configured to generate a second NMDA channel circuit output signal ($I_{dent}$) representative of the postsynaptic dendrite back potential signal ($V_{dent}$). The calcium integration circuit 756 is coupled to receive the first and second NMDA channel circuit output signals ($g_{nmda}$, $I_{dent}$).

In some embodiments, the circuit 750 can be driven by the first and second input signals ($V_{glu}$, $V_{dent}$), which can be generated by first and second respective spiking circuits the same as or similar to the spiking circuit 650 of FIG. 20.

The first spiking circuit can be configured to generate the first input signal ($V_{glu}$). In some embodiments, the first input signal $V_{glu}$ has a shape in accordance with a diffusion model, for example a model in accordance with the above-described diffusion model of equations 0.1 or 0.2.

The second spiking circuit can be configured to generate the second input signal ($V_{dent}$). In some embodiments, the second input signal ($V_{dent}$) has shape determined in accordance with a Hodgkin-Huxley model. In some embodiments, the second input signal ($V_{dent}$) has shape also determined in accordance with a back propagation model representative of back propagation from an axon hillock to the postsynaptic dendrite.

In some embodiments, the back propagation model is of a form the same as or similar to equations 0.7 through 1.0.

As described above in conjunction with equation 1.1, glutamate ligand concentration as a function of time, GLU combines with glutamate receptors in the postsynaptic membrane with an association constant of $K_{glu}$. Ultimately, in equilibrium, the ratio of bound glutamate to the total glutamate concentration is given by the first part of equation 1.1, or:

$$\frac{Glu}{Glu + K_{glu}} \quad (1.9)$$

The equation above is a simple arithmetic function that involves addition and division. This function can be implemented in an analog VLSI circuit of FIG. 23. It will become apparent from discussion below, that the function of equation 1.1 is spit into two parts, a first part implements by the circuit of FIG. 23 and a second part implemented by the circuit of FIG. 24.

Figure 23:
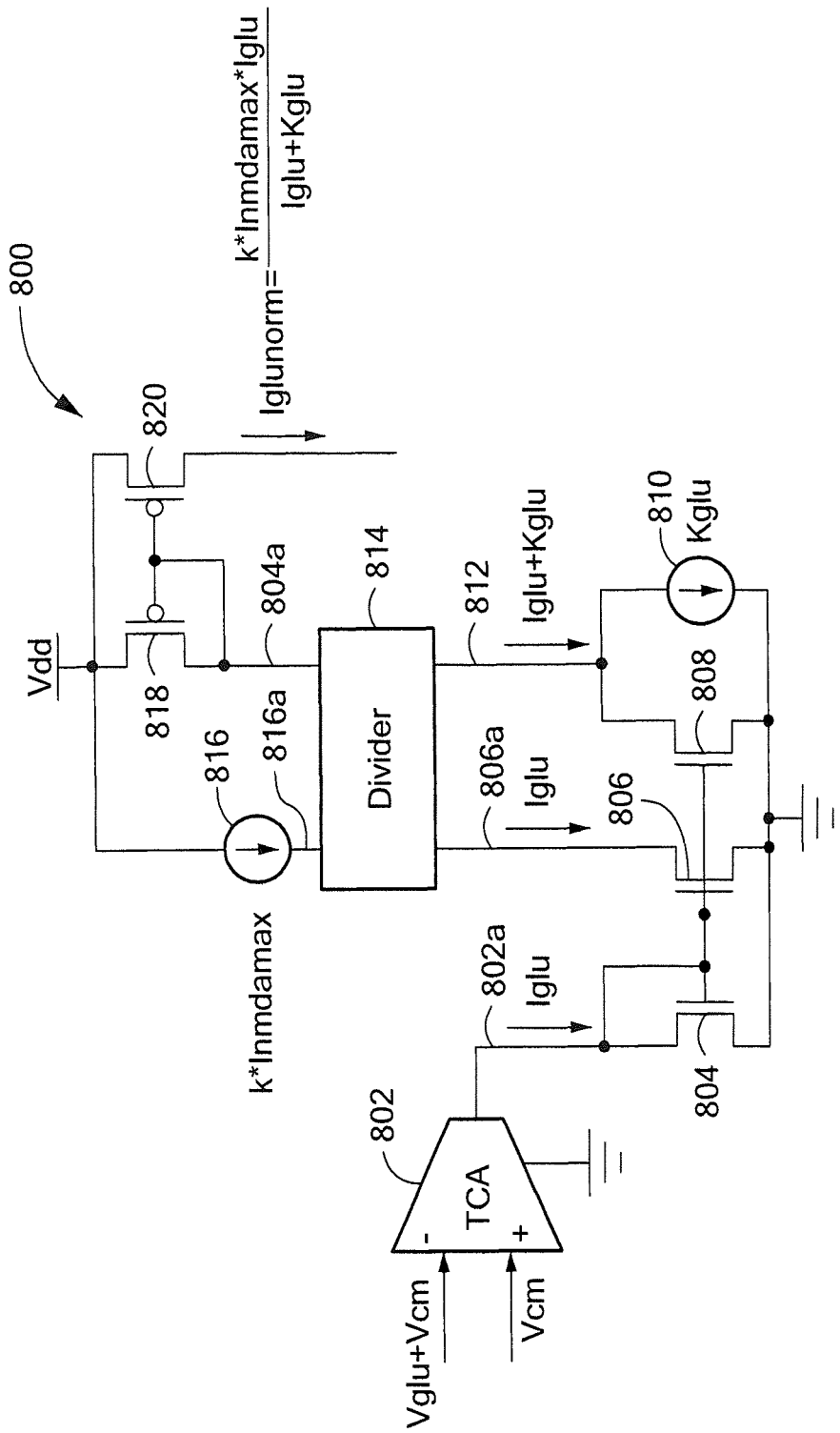
FIG. 23 is a circuit schematic of a circuit that can be used as the glutamate receptor circuit of FIG. 22.

Referring now to FIG. 23, a circuit 800 can be the same as or similar to the glutamate receptor circuit 752 of FIG. 22. The circuit 800 includes a transconductance amplifier 802 coupled to receive an input signal ($V_{glu}$) described above in conjunction with FIG. 22, and which is representative of a glutamate concentration, (GLU). It will be understood that some types of FET transconductance amplifiers are also coupled to receive a common mode bias signal ($V_{cm}$). The transconductance amplifier is configured to generate a current signal 802a, which is replicated to generate a signal 806a by a current mirror comprised of FETs 804, 806. Another current mirror is comprised of a FET 808, which is in parallel with a current generator 810, thus configured to generate a current signal 812 as sum of two components as shown.

A divider circuit 814 is coupled to receive the signals 806a, 812. The divider 814 is also coupled to receive a signal 816a generated by a current generator 816 and also a signal 818a generated by a FET 818. The divider is configured to generate an output signal 814a. A current mirror comprised of FETS 818, 820 is coupled to receive and replicate the signal 814.

The function of equation 1.9 could be implemented only a current adder and a divider. However, since the input signal, $V_{glu}$, is a voltage signal, it is first converted to a current signal using the wide range transconductance amplifier 802. The V-I conversion rate can be 10 mV=1 nA. Since two instances of $I_{glu}$ are needed, $I_{glu}$ is mirrored twice and a constant current source is $K_{glu}$ added to one of the mirrored instances of $I_{glu}$, creating two currents sinks with currents: $I_{glu}$ and $I_{glu}+K_{glu}$. A translinear current divider 814 is used to divide these two currents to generate an output current signal that represents the maximum NMDA receptor conductance. Hence, the overall transfer function of the glutamate receptor is given by:

$$I_{glunorm} = \frac{kI_{NMDAmax}I_{glu}}{I_{glu} + K_{glu}} \qquad (2.0)$$

where $I_{NMDAmax}$=1 nA and k=10. $I_{glunorm}$ is a current sink and it is mirrored to transform it to a current source to ensure that it interfaces without perturbation to the next circuit block.

The output current of the circuit 800 is qualitatively equal to what the biophysical model of equation 1.1 predicts except with a constant gain factor of k times $I_{NMDAmax}$. This is not an issue because $I_{NMDAmax}$ is used in the NMDA receptor circuit. The gain factor is not important as long as we keep track of the value of k.

Figure 24:
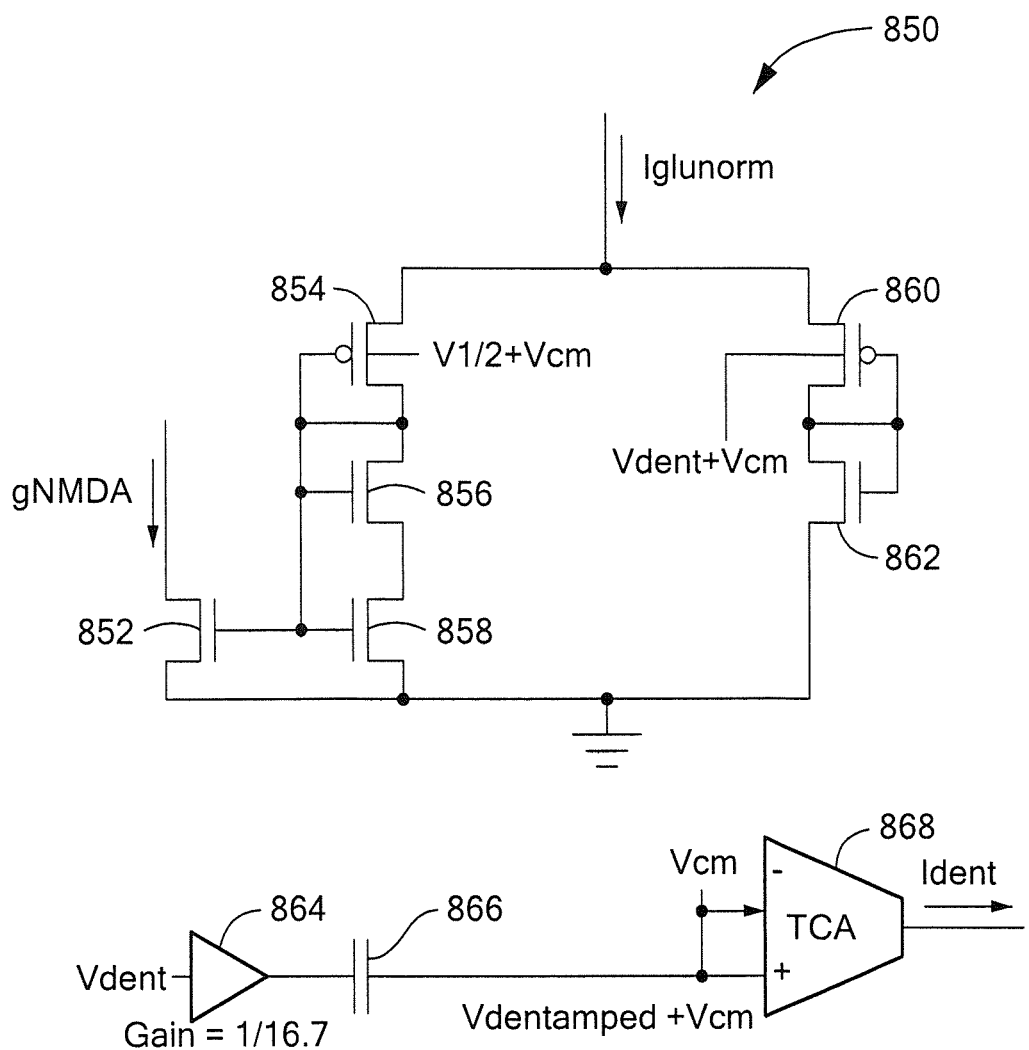
FIG. 24 is a circuit schematic of a circuit that can be used as the NMDA channel circuit of FIG. 22.

Referring now to FIG. 24, a circuit 850 can be the same as or similar to the NMDA channel circuit 754 of FIG. 22. The circuit 850 includes a wide range differential pair comprised of FETs 854-862 arranged as shown. The circuit 850 is coupled to receive the $I_{glunorm}$ signal from the circuit 800 of FIG. 23 and configured to generate a $g_{NMDA}$ signal as a current signal. representative of a conductance of NMDA receptor conductance as in equation 1.1, by way of a current mirror FET 852. The circuit 850 is also coupled to receive a half voltage signal V½ plus a common mode bias signal ($V_{cm}$).

The circuit 850 also includes an amplifier 864 coupled to receive a voltage input signal $V_{dent}$ representative of the glutamate concentration GLU. In some embodiments, the amplifier 864 has a gain of about 1/16.7. The amplifier 864 can be configured to generate a signal $V_{dentamped}$ coup led to a capacitor 866. The other side of the capacitor 866 can be coupled to receive a DC common mode bias signal $V_{cm}$, resulting in a signal $V_{dentamped}+V_{cm}$, which can be coupled to a transconductance amplifier 868, which can also be coupled to receive the signal $V_{cm}$. The transconductance amplifier 868 is configured to generate an output signal, $I_{dent}$, representative of the postsynaptic dendritic back potential.

The wide-range differential pair 854-862 is a primary component used to represent the dynamics of the NMDA channel. As described above in conjunction with equations 1.1 and 1.2, the model for NMDA channel dynamics representing the conductance of an NMDA receptor ion channel is dependent upon both the postsynaptic dendritic back potential and also upon glutamate concentration and this dependence is repeated again here for convenience:

$$g_{NMDA}(V_{dent}, Glu) = \frac{g_{MNDAmax}}{1 + e^{k_{NMDA}(V_{1/2}-V_{dent})}} \frac{Glu}{Glu + K_{glu}} \qquad (2.1)$$

An analog circuit that generates this function can be in the form of the differential pair 854-862, which has an I-V characteristic similar to the NMDA channel conductance dynamics as shown in the equation below:

$$I_{out} = I_{bias} \frac{1}{1 + \frac{\frac{W_1}{L_1}}{\frac{W_2}{L_2}} e^{\frac{\kappa(V_+-V_-)}{\varphi_t}}} \qquad (2.2)$$

in which:
$W_1/L_1$ and $W_2/L_2$ are width to length rations of transistors 854 and 860, respectively,
$V_+$=a voltage, represented as $V_{1/2}+V_{cm}$, at the positive input terminal of the differential pair,
$V_-$=a voltage, represented as $V_{dent}+V_{cm}$, at the negative input terminal of the differential pair,
κ=a constant derived from a coupling coefficient of the differential pair (se, e.g., Eq. 2.3 below), and
$\phi_t$=the thermal voltage=kT/q, where K is Boltzman's constant q is charge on a single electron, and T is absolute temperature.

In some embodiments: $W_1/L_1=W_2/L_2$, $V_+=V_{1/2}$=about 30 mV, $V_-=V_{dent}$, κ=about 0.15, and $\phi_t$=about 0.025.

In order to achieve a differential pair that can be used to obtain $g_{NMDA}$, the bias current, $I_{bias}$, is $I_{glunorm}$, the output current of the glutamate receptor circuit. Also, transistor geometry terms can be normalized to one by making the transistor sizes equal. Furthermore we mapped $V_+$ to $V_{1/2}$ and $V_-$ to $V_{dent}$.

Mapping the is $\kappa/\phi_1$ factor to $k_{NMDA}$ can be difficult because their values are quite different. Mapping the two directly without considering the scaling error between the two values would result in an incorrect emulation of the NMDA channel dynamics (for example, the dynamics might become too fast or too slow). This difference can be analyzed by solving for the value of κ in a wide linear range differential pair using this equation:

$$\kappa = \frac{1-\kappa_p}{1+\frac{\kappa_n}{\kappa_p}} \qquad (2.3)$$

where $\kappa_p$ and $\kappa_n$ represent the coupling coefficients of the PMOS and NMOS transistors used in the circuit 850.

Values for $\kappa_p$ and $\kappa_n$ are process dependent and typically fall between 0.5 and 1 and are usually approximated as 0.7, which gives an approximate working value for κ of about 0.15. Thus, $\kappa/\phi_t$ has a value of about 6 V$^{-1}$ at room temperature. In comparison, $k_{NMDA}$ is about 100 V$^{-1}$, hence, to ensure that $g_{NMDA}$ is calculated correctly, $V_{dent}$ and $V_{1/2}$ need to be scaled up by a factor of about 16.7. However, before we convert the voltage, $V_{dent}$, to a current, $I_{dent}$, the voltage, $V_{dent}$, is scaled back down by 1/16.7 to ensure that we are generating an un-scaled version of the current $I_{dent}$. An amplifier 864 can generate a scaled down version of the voltage, $V_{dent}$, resulting in a signal, $V_{dentamped}$.

Another primary component of the NMDA circuit 850 is the conversion of the scaled dendritic voltage, $V_{dentamped}$ to the current, $I_{dent}$. We can implement this by using a transconductance amplifier with an I-V ratio of 1 mV to 1 nA.

The equation below summarizes the mathematical equivalent of $g_{NMDA}$ generated by the combination of the circuits 800, 850 of FIGS. 23, 23.

$$kg_{NMDA} = \frac{kg_{NMDAmax}}{1+e^{\frac{\kappa(V_{1/2}-V_{dent})}{\varphi_t}}} \frac{I_{Glu}}{I_{Glu}+K_{glu}} \qquad (2.4)$$

Figure 25:
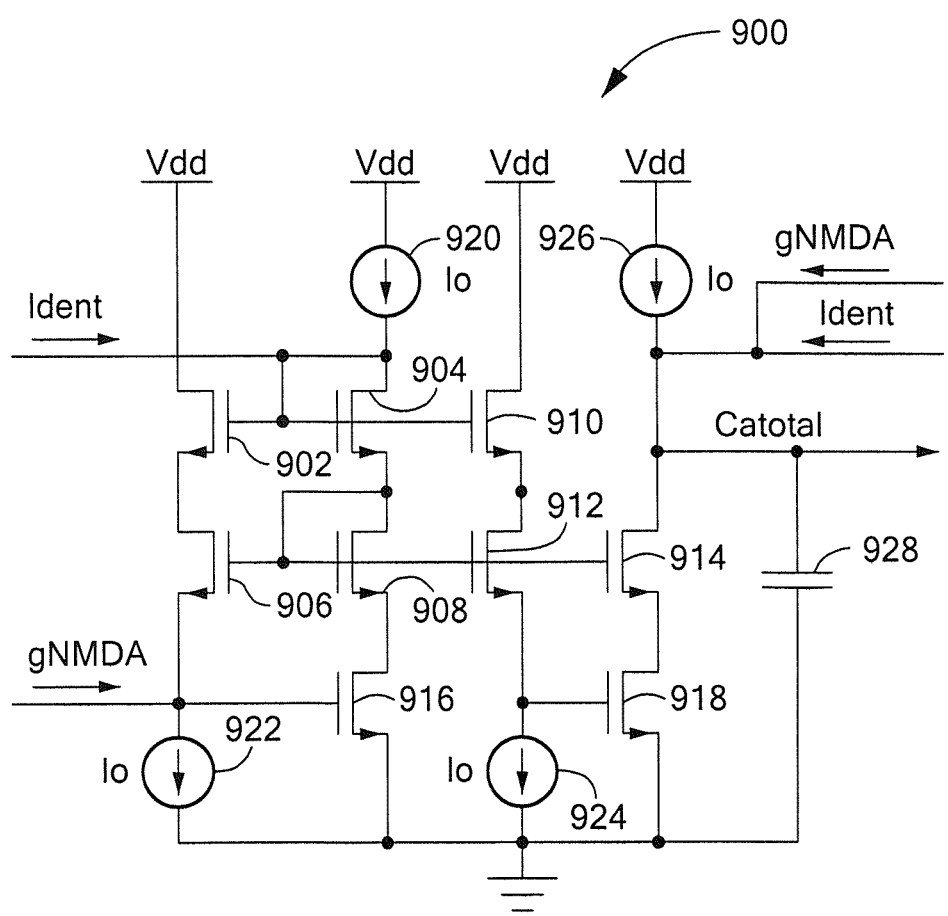
FIG. 25 is a circuit schematic of a circuit that can be used as the calcium integration circuit of FIG. 22.

Referring now to FIG. 25, a circuit 900 can be the same as or similar to the calcium integration circuit 756 of FIG. 22. The circuit 900 is coupled to receive the signals $I_{dent}$ and $g_{NMDA}$ from the NMDA channel circuit of FIG. 24.

Calcium integration determines how much total calcium is present in the synapse by integrating the product of the NMDA conductance and the dendritic back voltage. This relation is captured by this equation 1.2 above, which is reproduced below for convenience:

$$Ca_{total} = \int_{t_{start}}^{t_{end}} g_{NMDA} V_{dent} dt \qquad (2.5)$$

where:

$t_{start}$ refers to the time at which the first stimulus arrives, and $t_{end}$ refers to the time at which the final stimulus ends.

The circuit 900 includes FETs 902-918 arranged as a four quadrant multiplier along with current generators 920-926.

Equation 2.5 has a multiplication between the two temporal signals $g_{NMDA}$ and $V_{dent}$. The above function is best implemented with a four quadrant multiplier because the signal, $V_{dent}$, representative of a postsynaptic dendrite back potential, can be a biphasic signal ($g_{NMDA}$ is monophasic since conductance cannot be negative).

Integration is the second operation in equation 2.5, which can be implemented with a current flowing into a capacitor. The circuit 900 provides a total calcium signal, $Ca_{total}$ as an accumulated voltage signal at a capacitor 928, accumulated within the stimulus time window. An overall transfer function of the circuit 900 is given by:

$$Ca_{total} = \int_{t_{start}}^{t_{end}} \frac{k g_{NMDA} I_{dent}}{C_x} dt \qquad (2.6)$$

The total calcium signal $Ca_{total}$ is representative of a total calcium concentration in the postsynaptic dendrite.

Figure 26:
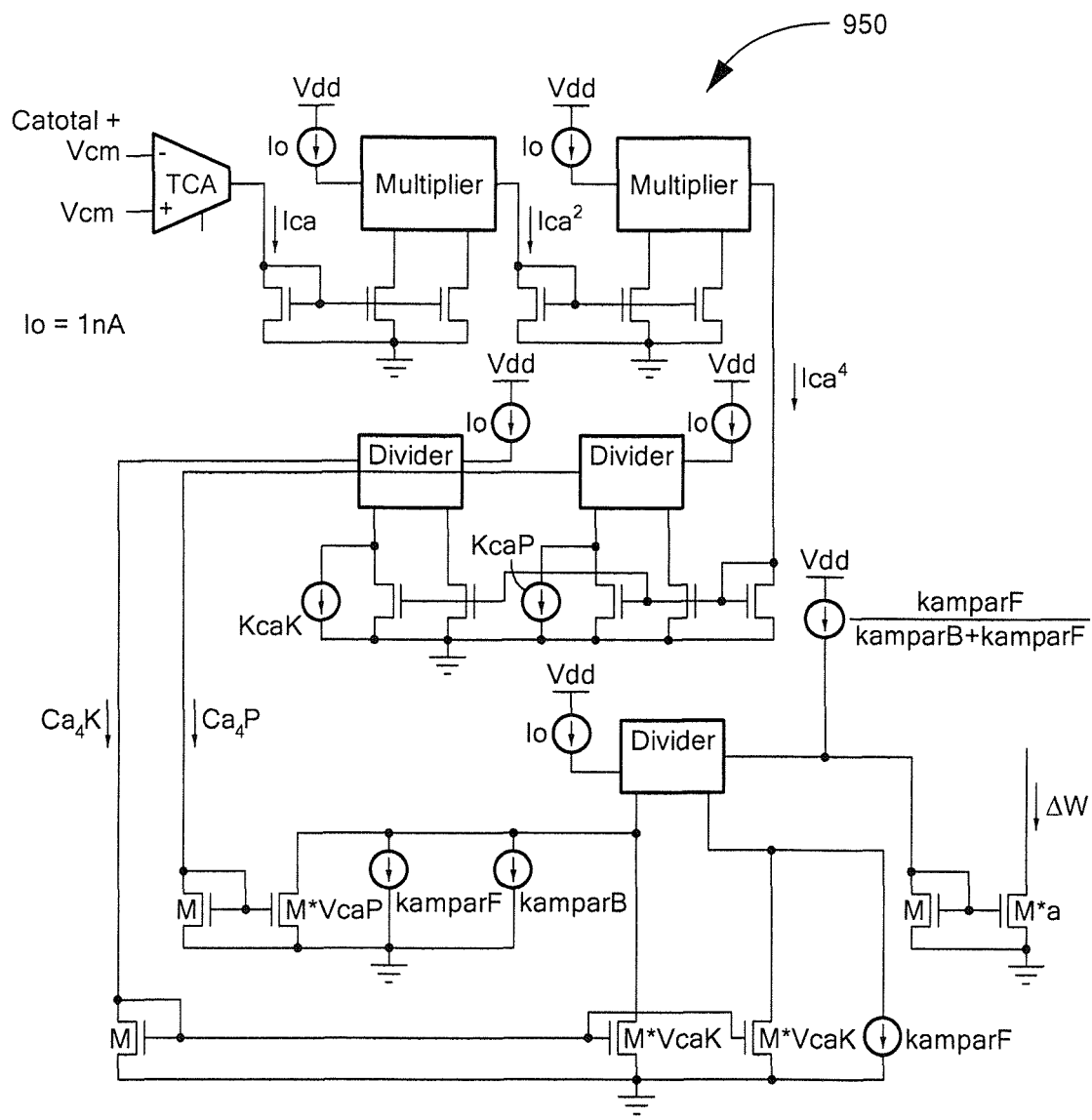
FIG. 26 is a circuit schematic of a circuit that can be used as the EPSC transduction circuit of FIG. 22.

Referring now to FIG. 26, a circuit 950 can be the same as or similar to the EPSC transduction circuit 758 of FIG. 22. The circuit 950 is coupled to receive the $Ca_{total}$ signal from the circuit 900 of FIG. 26, which is representative of a total postsynaptic calcium concentration. The circuit 950 is configured to generate a synaptic strength output signal, $\Delta W$, representative of synaptic strength, and representative of equations 1.6 above.

Equations 1.4 and 1.6 are reproduced below for convenience:

$$\frac{dCa_4 K}{dt} = k_{CaKf} \frac{Ca^4}{Ca^4 + K_{CaK}^4} - k_{CaKb} Ca_4 K = 0 \qquad (2.7)$$

$$\therefore Ca_4 K = \frac{k_{CaKf}}{k_{CaKb}} \frac{Ca^4}{Ca^4 + K_{CaK}^4}$$

$$\frac{dCa_4 P}{dt} = k_{CaPf} \frac{Ca^4}{Ca^4 + K_{CaP}^4} - k_{CaPb} Ca_4 P = 0$$

$$\therefore Ca_4 P = \frac{k_{CaPf}}{k_{CaKb}} \frac{Ca^4}{Ca^4 + K_{CaP}^4}$$

$$\Delta W \propto \frac{k_{AMPARf} + V_{CaK} Ca_4 K}{k_{AMPARb} + V_{CaP} Ca_4 P + k_{AMPARf} + V_{CaK} Ca_4 K} - \qquad (2.8)$$

$$\frac{k_{AMPARf}}{k_{AMPARb} + k_{AMPARf}}$$

where:

$Ca_4 K$ represents the binding ratio of $Ca_{total}$ with kinase, $Ca_4 P$ represents the binding ratio of $Ca_{total}$ with phosphatase, and $\Delta W$ represents the amount at which the EPSC changes after each stimulus.

The rest of the terms are constants that are specific to each type of STDP.

The equation 2.8 above suggests that we first need to create powers of the voltage signal $Ca_{total}$. Current mode multiplication can achieve this goal, therefore, the voltage signal $Ca_{total}$ is first converted to a current signal, $I_{CaT}$, which is performed using a wide linear range transconductance amplifier. Two copies of the current signal, $I_{CaT}$ are produced using a current mirror and these copies served as inputs to a current multiplier to give us $I_{CaT}^2$. Mirroring and squaring this current again gives us $I_{CaT}^4$.

Four instances of this current signal, $I_{CaT}^4$, are generated using current mirrors. These four signals are coupled to two current dividers and the corresponding constant currents, $K_{CaK}^4$ and $K_{CaP}^4$, are added to two of these instances then scaled appropriately to obtain current signals. The current signals, $Ca_4 K$ and $Ca_4 P$, are multiplied by two constants $V_{CaK}$ and $V_{CaP}$, respectively, using the scaling capability of the current mirror. Finally, using a current mirror, the resulting current is scaled by the factor $\alpha$, which is dependent to the type of STDP that is being simulated, resulting in a final output current signal of $\Delta W$.

This implementation of an EPSC transduction circuit provides an accurate representation of the biophysical processes within the synapse. However, the circuit's size and complexity are bulky and prone to mismatch and leakage problems, making it more difficult to test and debug in a chip implementation. This leads to an alternative design described below in conjunction with FIG. 28, which saves area, power, and complexity.

Figure 27:
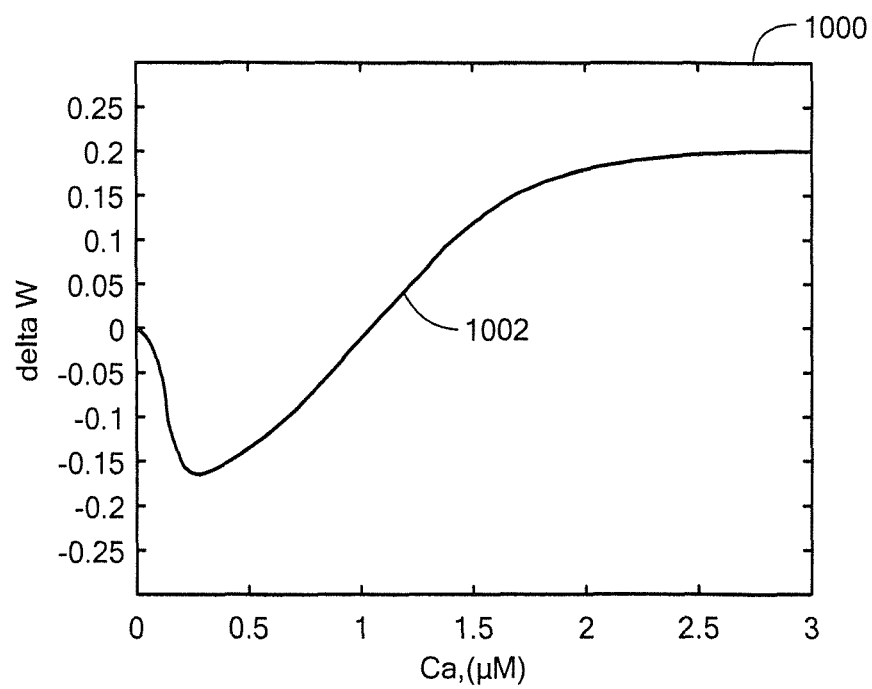
FIG. 27 is a graph showing a BCM rule curve.

Referring now to FIG. 27, a graph 100 has a horizontal axis with a scale in units of total calcium concentration in micromoles and a vertical axis with a scale in units of change in synaptic strength in percent. A curve 1002 is representative of the function 2.8 above, and is the same as or similar to the curve 262 of FIG. 9B.

The curve 1002 follows the above-described BCM rule curve. The curve 1002 can be decomposed as a sum of multiple sigmoidal functions. From FIG. 9 above, the BCM curve can be represented by a sum of two sigmoidal curves.

Figure 27A:
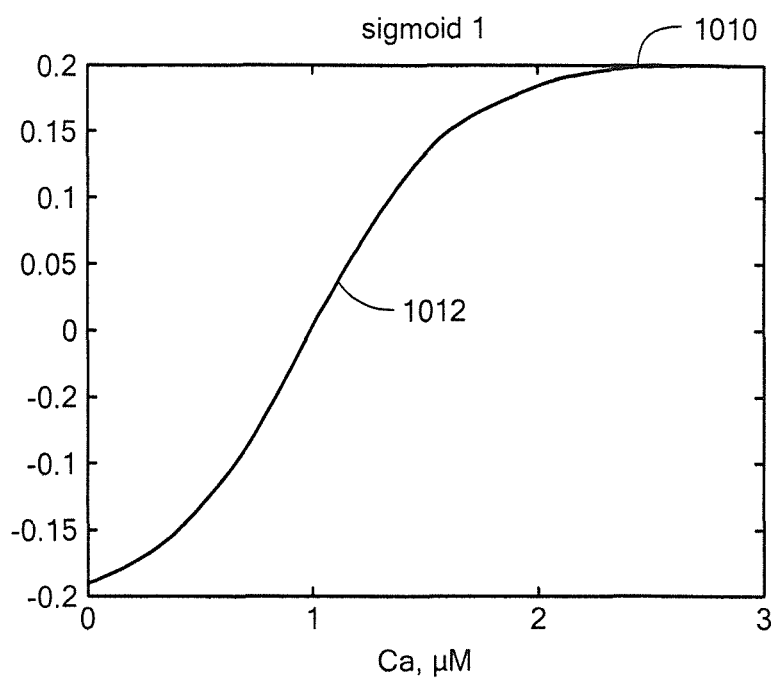
FIGS. 27A and 27B are graphs representative of sigmoidal decomposition of the graph of FIG. 27 and also representative of activity of calcium bound kinase and calcium bound phosphatase.
Figure 27B:
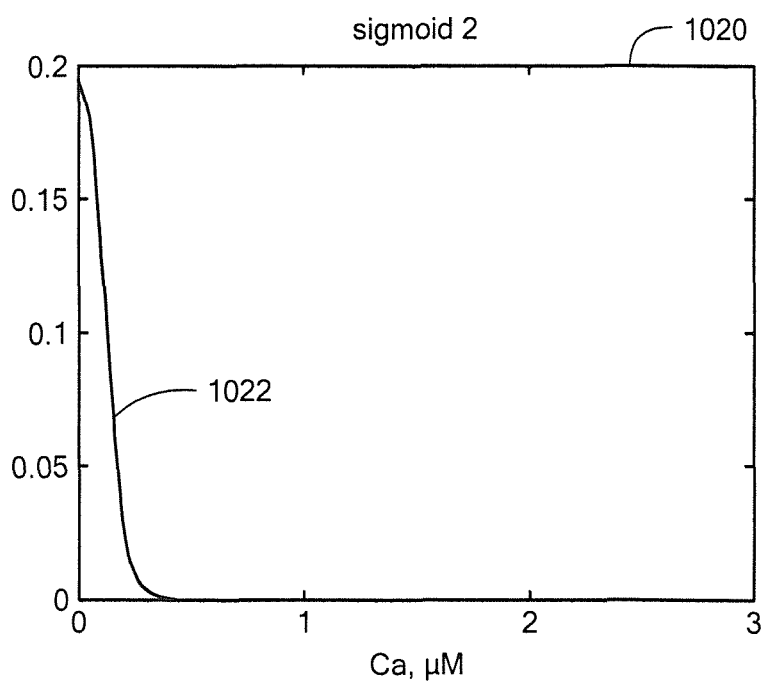

Referring now to FIGS. 27A and 27B, graphs 1010, 1020 have horizontal axes with scales in units of total calcium concentration in micromoles and vertical axes with scales in units of change of synaptic strength in percentage (e.g., 0.2=20%)

A curve 1012 is representative of a change of synaptic strength due to kinase activity and a curve 1022 is representative of a change of synaptic strength due to phosphatase activity. A sum of the curves 1012 an 1022 results in the curve 1002 of FIG. 27.

Sigmoidal decomposition of the BCM curve 1002 corresponds to the breakdown of the difference in the chemical kinetics of the binding between calcium to phosphatase and kinase. Phosphatase kinetics is faster and dominates at low $Ca_{total}$ concentrations and corresponds to a decrease in EPSC current from the AMPA channels. On the other hand, kinase kinetics is slightly delayed and slower but has the direct opposite effect of increasing the EPSC current from the AMPA channels in higher $Ca_{total}$ concentrations. Hence, the phosphatase and kinase kinetics then maps respectively to the decreasing and increasing sigmoids. To obtain the best fit shapes of the both individual sigmoidal curves, we used a least error method algorithm.

Figure 28:
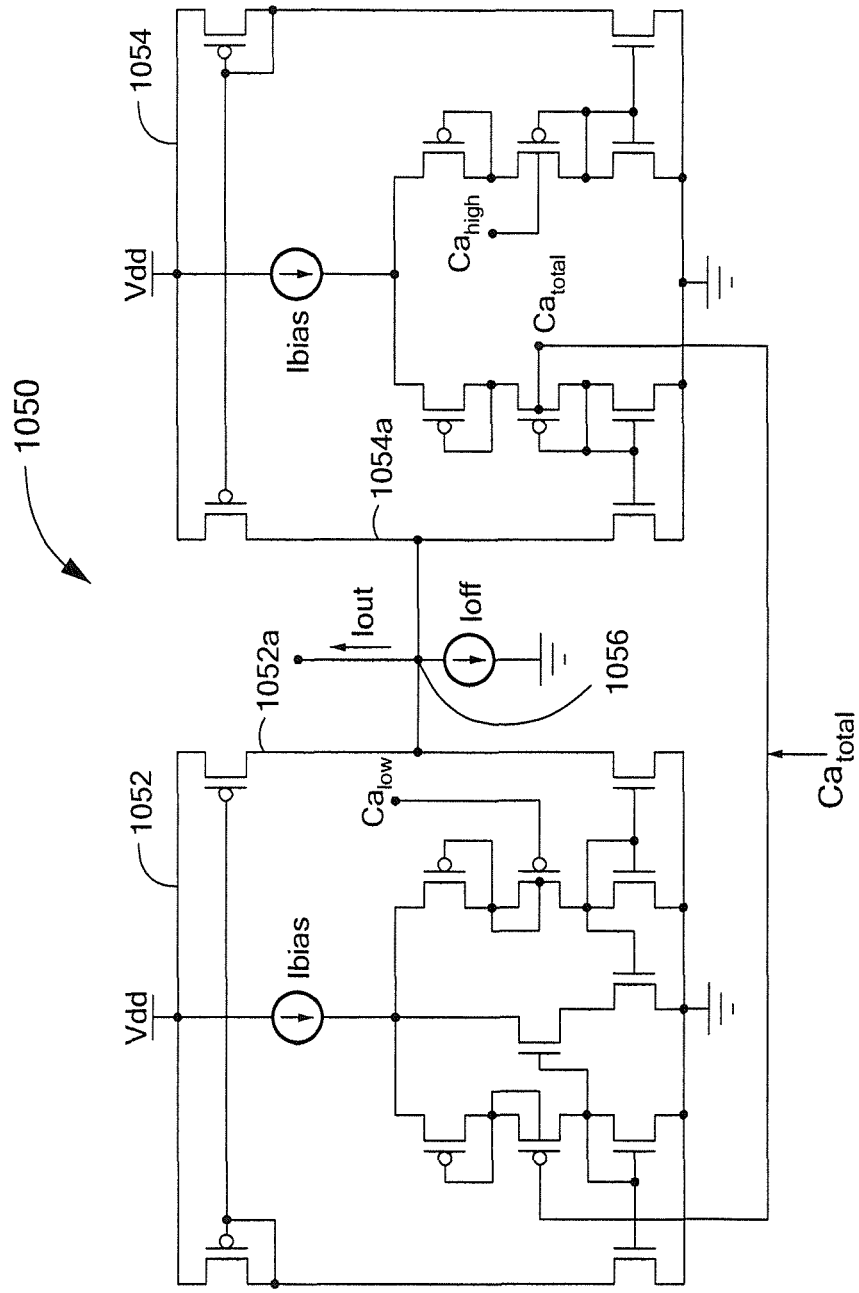
FIG. 28 is a circuit schematic of an alternate circuit that can be used as the EPSC transduction circuit of FIG. 22 in place of the circuit of FIG. 26.

Referring now to FIG. 28, an alternate design for the EPSC transduction circuit 758 of FIG. 22, that can be used in place of the circuit 950 of FIG. 26, employs sigmoidal decomposition techniques associated with FIGS. 27-27B.

Sigmoidal decomposition simplifies the hardware design for implementing equation 2.8 above. A hyperbolic tangent function accurately represents a sigmoidal curve. Two transconductance amplifiers 1052, 1054 can be used to generate the two sigmoidal curves of FIGS. 27A, 27B. Current outputs 1052*a*, 1054*a* of the two transconductance amplifiers 1052, 1054 can be added together by connecting them to a single node 1056, resulting in an output current signal, $I_{out}$, that represents the instantaneous value of the change in excitatory postsynaptic current (EPSC), which is a measure of $\Delta W$.

The first amplifier 1052 has a narrow dynamic range to simulate the fast decreasing segment of the function 1002 of FIG. 27, i.e., the curve 1012 of FIG. 27A. Notice that, the voltage inputs are obtained from the gate of the middle transistor, eliminating the increase in linear range obtained from gate degeneration in standard wide linear range amplifier. To finely tune the linear range we used bump linearization transistors.

The second amplifier 1054 was designed to have a wider dynamic range to emulate the slowly increasing segment of the function 1002 of FIG. 27, i.e., the curve 1022 of FIG. 27B. The second amplifier 1054 does not have the bump linearization transistors in order to slightly tune down the linear range.

The circuit 1050 includes four selectable inputs to facilitate minor and common changes to the shape of the BCM curve, e.g. curve 1002 of FIG. 27. A selectable current signal, $I_{bias}$, sets the maxima and minima of the BCM curve, which represents the maximum amount of potentiation and depression of the synapse. A selectable current signal, $I_{off}$ sets the vertical offset of the BCM curve. Changing this current shifts the BCM curve up or down. Two selectable voltage signals, $Ca_{low}$ and $Ca_{high}$, set the zero crossings of the BCM curve. Modifying these two values shifts the BCM curve left or right. Another selectable voltage signal, $Ca_{total}$, represents an instantaneous calcium concentration that is transduced to an appropriate change in EPSC.

Many types of STDP can be accurately modeled by the above-described neuromorphic synaptic circuits (see, e.g., FIGS. 11-15C). Curves generated by the circuits that represent total postsynaptic calcium concentration, $Ca_{total}$, and that represent change in synaptic plasticity $\Delta W$, qualitatively match the above-described biophysical model. Minor scaling non-idealities are observed in the magnitude of the two curves, but this is expected because the traces represent the overall change in $Ca_{total}$ and $\Delta W$ after continuous stimulation of the presynaptic and postsynaptic neuron, which follows the standard protocol used in generating in-vitro data for STDP. Data measured and associated with the circuit only measures the effect of a single stimulus. However, the circuits described above are able to emulate rate or frequency based plasticity and show agreement with the BCM rule.

Compared to current neuromorphic technologies (CMOS-nano or traditional CMOS neuromorphic circuits), the above-described synaptic circuit design associated with FIG. 22 is the only circuit that provides superior functional versatility as well as robustness and holds the best promise for emulating emergent cognitive functions in large-scale neural networks.

A neuromorphic circuit of a synapse should be able to emulate multiple forms of STDP (Hebbian, anti-Hebbian and symmetrical mixed LTP and LTD, STP, and STD). No prior neuromorphic circuit designs are capable of reproducing all these forms of synaptic plasticity.

Unlike other types of neuromorphic circuits, the above described neuromorphic circuits demonstrate the singularity in the transition point between potentiation and depression in the multiple forms of STDP. No previous circuit models emulate this smooth and continuous singularity. In addition, the above described neuromorphic circuits exhibit pure STDP behaviors. No other analog VLSI design has even attempted to reproduce these behaviors.

Not only do the above-described neuromorphic circuits emulate the empirical behavior of the synapse, they also capture the biophysical mechanisms that govern the process of synaptic plasticity.

The above described neuromorphic circuits can be combined to represent larger portions of a brain, for example, a cortex, a cerebellum, and/or the brain stem. A plurality of the above described neuromorphic circuits can be integrated onto a circuit die (or chip) to form a more complex architecture that mimics physiological systems, such as memory formation or respiratory control.

Potentially, actual biological systems in the central nervous systems can be replaced with artificial circuits having the above described neuromorphic circuits. For example, a person who is suffering from a chronic nervous system disease could receive an implant with a chip that allows the person to replace the diseased "neuronal network." Real machine learning can replace current supercomputer clusters that claims to implement so called neural networks, the software replicates of the process of learning.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims.

All publications and references cited herein are expressly incorporated herein by reference in their entirety.

What is claimed is:

1. A circuit to model spike timing dependent plasticity of a postsynaptic neuron, the circuit comprising:

a calcium integration circuit configured to generate a calcium integration circuit output signal (Catotal) representative of a total concentration of calcium in a postsynaptic dendrite, wherein the calcium integration circuit is responsive to first and second input signals ($V_{glu}$, $V_{dent}$), wherein the first input signal ($V_{glu}$) is representative of a glutamate concentration in the postsynaptic dendrite and wherein the second input signal is representative of a postsynaptic dendrite back potential, wherein a magnitude of the calcium integration circuit output signal ($Ca_{total}$) is influenced by a relative timing relationship between the first and second input signals, wherein the relative timing relationship is in accordance with the spike timing; and an EPSC transduction circuit coupled to receive the calcium integration circuit output signal (Catotal) and configured to generate an EPSC transduction circuit output signal (EPSC) representative of a change of synaptic strength of the postsynaptic neuron.

2. The circuit of claim 1, wherein the calcium integration circuit performs a function representative of a calcium entrapment model of the form:

$Ca \propto \int_{t_{stimuli}} I_{NMDAR} dt = \int_{t_{stimuli}} g_{NMDAR} V_{dent} dt$, wherein Ca is representative of the total concentration of calcium in the postsynaptic neuron and $g_{NMDAR}$ is representative of a conductance of NMDA receptor channels.

3. The circuit of claim 1, wherein the EPSC transduction circuit is configured to perform a function representative of a BCM relationship representative of both rate-based plasticity and spike timing dependent plasticity.

4. The circuit of claim 1, wherein the EPSC transduction is configured to perform a function representative of a BCM relationship of the form:

$$\Delta W \propto \frac{k_{AMPARf} + V_{CaK}Ca_4K}{k_{AMPARb} + V_{CaP}Ca_4P + k_{AMPARf} + V_{CaK}Ca_4K} - \frac{k_{AMPARf}}{k_{AMPARb} + k_{AMPARf}},$$

wherein $\Delta W$ is representative of the change of synaptic strength, $k_{AMPARf}$ is representative of a rate constant of AMPA receptor activation, $k_{AMPARb}$ is representative of a rate constant of AMPA receptor inactivation, $Ca_4K$ is representative of a concentration of calcium bound kinase, $Ca_4P$ is representative of a concentration of calcium bound phosphatase, $V_{CaK}$ is representative of a proportional constant associated with an impact of calcium bound kinase on AMPA receptor insertion, and $V_{CaP}$ is representative of a proportional constant associated with an impact of calcium bound phosphatase on AMPA receptor removal.

5. The circuit of claim 1, wherein the circuit comprises an analog circuit comprised of FETs.

6. The circuit of claim 5, wherein the FETs are configured to operate in subthreshold mode.

7. The circuit of claim 1, further comprising:
a glutamate receptor circuit coupled to receive the first input signal ($V_{glu}$) representative of the glutamate concentration in the postsynaptic dendrite, coupled to receive an association signal ($K_{glu}$) representative of an association constant indicative of a binding of the glutamate to NMDA receptors in the postsynaptic dendrite, and configured to generate a glutamate receptor circuit output signal (Iglunorm) representative of a ratio of bound glutamate to total glutamate in the postsynaptic dendrite;
an NMDA, channel circuit coupled to receive the glutamate receptor circuit output signal ($I_{glunorm}$), coupled to receive the second input signal ($V_{dent}$) representative of the postsynaptic dendrite back potential, configured to generate a first NMDA channel circuit output signal ($g_{nmda}$) representative of a conductance of NMDA receptors in the postsynaptic dendrite, and configured to generate a second NMDA channel circuit output signal ($I_{dent}$) representative of the postsynaptic dendrite hack potential signal ($V_{dent}$), wherein the calcium integration circuit is coupled to receive the first and second NMDA channel circuit output signals.

8. The circuit of claim 7, wherein the circuit is an analog circuit comprised of FETs.

9. The circuit of claim 8, wherein the FETs are configured to operate in subthreshold mode.

10. The circuit of claim 1, further comprising a first spiking circuit configured to generate the first input signal ($V_{glu}$).

11. The circuit of claim 10, wherein the first spiking circuit is configured to generate the first input signal ($V_{glu}$) having a shape determined in accordance with a diffusion model.

12. The circuit of claim 1, further comprising a second spiking circuit configured to generate the second input signal ($V_{dent}$).

13. The circuit of claim 12, wherein the second spiking circuit is configured to generate the second input signal ($V_{dent}$) having a shape determined in accordance with a Hodgkin-Huxley model.

14. The circuit of claim 13, wherein the second spiking circuit is configured to generate the second input signal ($V_{dent}$) having a shape also determined in accordance with a back propagation model representative of back propagation from an axon hillock to the postsynaptic dendrite.

15. The circuit of claim 14, wherein the hack propagation model is of the form $$C_{axon} \frac{dV_{axon}}{dt} = -I_{Na} - I_K - I_{Laxon} + I_{post} + I_{inter}$$

and $$C_{dent} \frac{dV_{dent}}{dt} = -I_{NMDAR} - I_{AMPAR} - I_{Ldent} - I_{inter},$$

wherein
$C_{axon}$ is representative of an membrane capacitance of an axon, $C_{dent}$ is representative of an membrane capacitance of a dendrite, $V_{axon}$ is representative of a membrane potential of an axon, $V_{dent}$ is representative of a membrane potential of a dendrite, $I_{Na}$ is representative of a calcium current, $I_K$ is representative of a potassium current, $I_{Laxon}$ is representative of a leakage current at an axon, $I_{Ldent}$ is representative of a leakage current at a dendrite, $I_{post}$ is representative of a postsynaptic stimulus current, $I_{inter}$ is representative of a current flowing between axon and dendrite, $I_{NMDAR}$ is representative of a current flowing through an NMDA receptor, $I_{AMPAR}$ is representative of a current flowing through an AMPA receptor, $I_{Ldent}$ is representative of a leakage current at a dendrite.

16. A method of simulating a spike timing dependent plasticity of a postsynaptic neuron, the method comprising:
receiving, with an analog circuit, first and second input signals ($V_{glu}, V_{dent}$), wherein the first input signal ($V_{glu}$) is representative of a glutamate concentration in a postsynaptic dendrite and wherein the second input signal is representative of a postsynaptic dendrite back potential,
generating, with the analog circuit, a calcium integration output signal ($Ca_{total}$) representative of a total concentration of calcium in the postsynaptic dendrite, wherein a magnitude of the calcium integration output signal ($Ca_{total}$) is influenced by a relative timing relationship between the first and second input signals, wherein the relative timing relationship is in accordance with the spike timing; and
generating, with the analog circuit, an EPSC transduction output signal (EPSC) representative of a change of synaptic strength of the postsynaptic neuron in response to the calcium integration output signal ($Ca_{total}$).

17. The method of claim 16, wherein the generating a calcium integration output signal ($Ca_{total}$) comprises generating the calcium integration output signal ($Ca_{total}$) with a function representative of a calcium entrapment model of the form:

$Ca \propto \int_{t_{stimuli}} I_{NMDAR} dt = \int_{t_{stimuli}} g_{NMDAR} V_{dent} dt$, wherein Ca is representative of the total concentration of calcium in the postsynaptic neuron and $g_{NMDAR}$ is representative of a conductance of NMDA receptor channels.

18. The method of claim 16, wherein the generating an EPSC transduction output signal (EPSC) comprises generating the EPSC transduction output signal (EPSC) in accordance with a function representative of a BCM relationship representative of both rate-based plasticity and spike timing dependent plasticity.

19. The method of claim 16, wherein the generating an EPSC transduction output signal (EPSC) comprises generating the EPSC transduction output signal (EPSC) with a function representative of a BCM relationship of the form:

$$\Delta W \propto \frac{k_{AMPARf} + V_{CaK}Ca_4K}{k_{AMPARb} + V_{CaP}Ca_4P + k_{AMPARf} + V_{CaK}Ca_4K} - \frac{k_{AMPARf}}{k_{AMPARb} + k_{AMPARf}},$$

wherein $\Delta W$ is representative of the change of synaptic strength, $k_{AMPARf}$ is representative of a rate constant of AMPA receptor activation $k_{AMPARb}$ is representative of a rate constant of AMPA receptor inactivation, $Ca_4K$ is representative of a concentration of calcium bound kinase, $Ca_4P$ is representative of a concentration of calcium bound phosphatase, $V_{CaK}$ is representative of a proportional constant associated with an impact of calcium bound kinase on AMPA receptor insertion, and $V_{CaP}$ is representative of a proportional constant associated with an impact of calcium bound phosphatase on AMPA receptor removal.

20. The method of claim 16, wherein the analog circuit comprises an analog circuit comprised of FETs.

21. The method of claim 20, wherein the FETs are configured to operate in subthreshold mode.

22. The method of claim 16, further comprising:
receiving, with the analog circuit, the first input signal ($V_{glu}$) representative of the glutamate concentration in the postsynaptic dendrite;
receiving, with the analog circuit, an association signal ($K_{glu}$) representative of an association constant indicative, of a binding of the glutamate to NMDA receptors in the postsynaptic dendrite;
generating, with the analog circuit, a glutamate receptor output signal ($I_{glunorm}$) representative of a ratio of bound glutamate to total glutamate in the postsynaptic dendrite;
generating, with the analog circuit, in response to the first input signal ($V_{glu}$) and in response to the postsynaptic dendrite back potential signal ($V_{dent}$), a first NMDA channel output signal (gnmda) representative of a conductance of NMDA receptors in the postsynaptic dendrite generating, with the analog circuit, in response to the postsynaptic dendrite back potential signal ($V_{dent}$), a second NMDA channel output signal ($I_{dent}$) representative of the postsynaptic dendrite back potential signal ($V_{dent}$).

23. The method of claim 22, wherein the analog circuit comprises an analog circuit comprised of FETs.

24. The method of claim 23, wherein the FETs are configured to operate in subthreshold mode.

25. The method of claim 16, further comprising generating the first input signal ($V_{glu}$) having a shape determined in accordance with a diffusion model.

26. The method of claim 16, further comprising generating the second input signal ($V_{dent}$) having a shape determined in accordance with a Hodgkin-Huxley model.

27. The method of claim 26, further comprising generating the second input signal ($V_{dent}$) having a shape also determined in accordance with a back propagation model representative of back propagation from an axon hillock to the postsynaptic dendrite.

28. The method of claim 27, wherein the back propagation model is of the form:

$$C_{axon}\frac{dV_{axon}}{dt} = -I_{Na} - I_K - I_{Laxon} + I_{post} + I_{inter}$$

and $$C_{dent}\frac{dV_{dent}}{dt} = -I_{NMDAR} - I_{AMPAR} - I_{Ldent} - I_{inter},$$

wherein
$C_{axon}$ is representative of an membrane capacitance of an axon, $C_{dent}$ is representative of an membrane capacitance of a dendrite, $V_{axon}$ is representative of a membrane potential of an axon, $V_{dent}$ is representative of a membrane potential of a dendrite, $I_{Na}$ is representative of a calcium current, $I_K$ is representative of a potassium current, $I_{Laxon}$ is representative of a leakage current at an axon, $I_{Ldent}$ is representative of a leakage current at a dendrite, $I_{post}$ is representative of a postsynaptic stimulus current, $I_{inter}$ is representative of a current flowing between axon and dendrite, $I_{NMDAR}$ is representative of a current flowing through an NMDA receptor, $I_{AMPAR}$ is representative of a current flowing through an AMPA receptor, $I_{Ldent}$ is representative of a leakage current at a dendrite.

* * * * *